(12) United States Patent
Kostic

(10) Patent No.: US 11,674,555 B2
(45) Date of Patent: Jun. 13, 2023

(54) AXIALLY OR RADIALLY ACTUATED EDDY CURRENT BRAKE WITH INTEGRATED FRICTION BRAKE

(71) Applicant: Aeroflux Braking Systems Inc., Toronto (CA)

(72) Inventor: Nikola Kostic, Toronto (CA)

(73) Assignee: AEROFLUX BRAKING SYSTEMS INC., Toronto (CA)

(*) Notice: Subject to any disclaimer, the term of this patent is extended or adjusted under 35 U.S.C. 154(b) by 432 days.

(21) Appl. No.: 16/826,260

(22) Filed: Mar. 22, 2020

(65) Prior Publication Data

US 2020/0300310 A1 Sep. 24, 2020

Related U.S. Application Data

(60) Provisional application No. 62/985,191, filed on Mar. 4, 2020, provisional application No. 62/946,286, filed
(Continued)

(51) Int. Cl.
*F16D 27/11* (2006.01)
*F16D 27/115* (2006.01)
(Continued)

(52) U.S. Cl.
CPC .............. *F16D 27/115* (2013.01); *B60L 7/28* (2013.01); *B60T 1/065* (2013.01); *B60T 13/748* (2013.01);
(Continued)

(58) Field of Classification Search
CPC ........ B60L 7/28; B60L 2200/10; B60T 1/005; B60T 1/065; B60T 13/748; F16D 27/004;
(Continued)

(56) References Cited

U.S. PATENT DOCUMENTS 7,226,018 B2 6/2007 Sullivan
8,201,774 B2 6/2012 Gieras et al.
(Continued)

FOREIGN PATENT DOCUMENTS

| CN | 110707900 A | 1/2020 |
|---|---|---|
| JP | 2016171727 A | 9/2016 |
| WO | 2016029060 A1 | 2/2016 |

OTHER PUBLICATIONS

He, Ren, et al.; Brake Performance Analysis of ABS for Eddy Current and Electrohydraulic Hybrid Brake System' Mathematical Problems in Engineering Sep. 24, 2013.
(Continued)

*Primary Examiner* — Rashad H Johnson
(74) *Attorney, Agent, or Firm* — Ridout & Maybee LLP; David J. Greer

(57) ABSTRACT

A magnetic brake assembly for use with a wheel rim is described. The brake assembly includes a rotor secured to rotate with the rim and a stator secured to be rotationally stationary relative to the rotor. One of the rotor and stator has an electrically conductive body and the other of the rotor and stator has a magnetic array including a plurality of magnets configured to generate a magnetic flux. An actuator is connected to at least one of the electrically conductive body and magnetic array to selectively effect a brake mode and a non-brake mode. In the brake mode, the magnetic array induces eddy currents in the electrically conductive body to generate a magnetic braking force when the rim rotates above a threshold speed and in the non-brake mode, the induced eddy currents cause a negligible or no magnetic braking force as the rim rotates above the threshold speed.

18 Claims, 36 Drawing Sheets

Related U.S. Application Data on Dec. 10, 2019, provisional application No. 62/822,502, filed on Mar. 22, 2019.

(51) Int. Cl.
  *B60T 1/06* (2006.01)
  *B60T 13/74* (2006.01)
  *F16D 27/00* (2006.01)
  *B60L 7/28* (2006.01)
  *H02K 49/04* (2006.01)
  *H02K 49/00* (2006.01)
  *H02K 49/10* (2006.01)
  *F16D 65/097* (2006.01)
  *B60T 1/00* (2006.01)

(52) U.S. Cl.
  CPC ............ *F16D 27/004* (2013.01); *H02K 49/00* (2013.01); *H02K 49/04* (2013.01); *H02K 49/043* (2013.01); *H02K 49/046* (2013.01); *H02K 49/10* (2013.01); *B60L 2200/10* (2013.01); *B60T 1/005* (2013.01); *F16D 65/0972* (2013.01)

(58) Field of Classification Search
  CPC ... F16D 27/115; F16D 65/0972; H02K 49/00; H02K 49/04; H02K 49/043; H02K 49/046; H02K 49/10
  USPC ........................ 310/92, 93, 96, 103, 105, 109
  See application file for complete search history.

(56) References Cited

U.S. PATENT DOCUMENTS

| 9,638,273 | B2 | 5/2017 | Schmidt |
| 10,454,341 | B1 | 10/2019 | Grundman et al. |
| 2008/0105503 | A1 | 5/2008 | Pribonic |
| 2009/0186535 | A1* | 7/2009 | Sullivan ................ B60F 3/0007 440/12.66 |
| 2015/0204399 | A1* | 7/2015 | Schmidt .................. F16D 49/00 188/161 |
| 2015/0300432 | A1* | 10/2015 | Yamaguchi .......... H02K 49/043 188/71.6 |
| 2018/0278134 | A1* | 9/2018 | Hunstable ............ H02K 21/029 |
| 2019/0135115 | A1* | 5/2019 | Savoie-Lavigueur ...................... F16D 65/22 |
| 2020/0220439 | A1* | 7/2020 | Sigmar .................. H02K 11/33 |
| 2021/0067001 | A1* | 3/2021 | Wissing ............... H02K 7/1846 |

OTHER PUBLICATIONS

Gay, S., et al.; Analysis and Experimental Testing of a Permanent Magnet Eddy-Current Brake 2005.
Gay, S. et al.; Parametric Analysis of Eddy-Current Brake Performance by 3-D Finite-Element Analysis Feb. 2006.
Gulbahce, M. O., et al.; Finite elements analysis of a small power eddy current brake Jan. 2012.
Gulbahce, M.O., et al.; Determination of the Effect of Conductive Disk Thickness on Braking Torque for a Low Power Eddy Current Brake May 2013.
Axial Retarders; Ateco Equipment; As early as Jul. 17, 2020, https://www.atecoequipment.com.au/products/telma/axial-retarders/; 4 pages 2020.
Telma Retarders; Ateco Equipment; As early as Jul. 17, 2020, https://www.atecoequipment.com.au/products/telma/; 9 pages 2020.
Focal Retarders; Ateco Equipment; As early as Jul. 17, 2020, https://www.atecoequipment.com.au/products/telma/focal-retarders/; 5 pages 2020.
Telma USA; As early as Jul. 17, 2020, https://www.telmausa.com/products/operating-principle; 2 pages 2020.

* cited by examiner

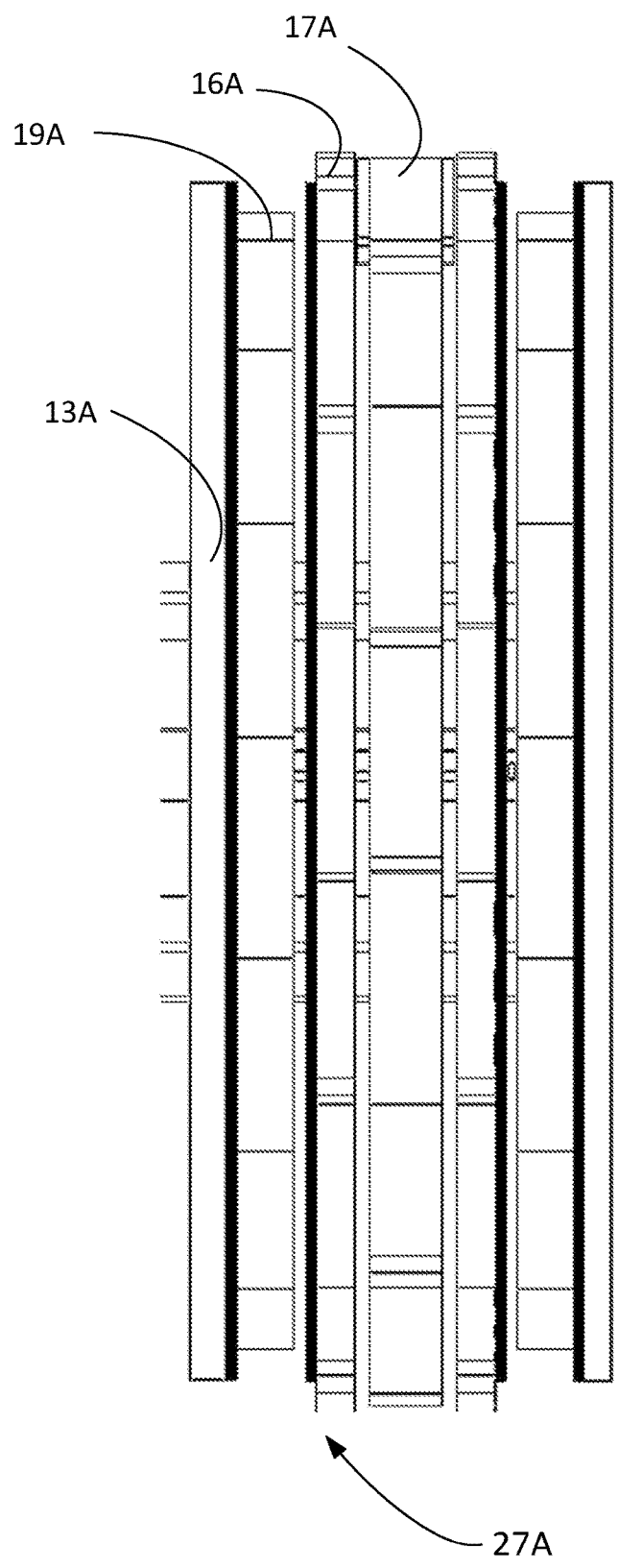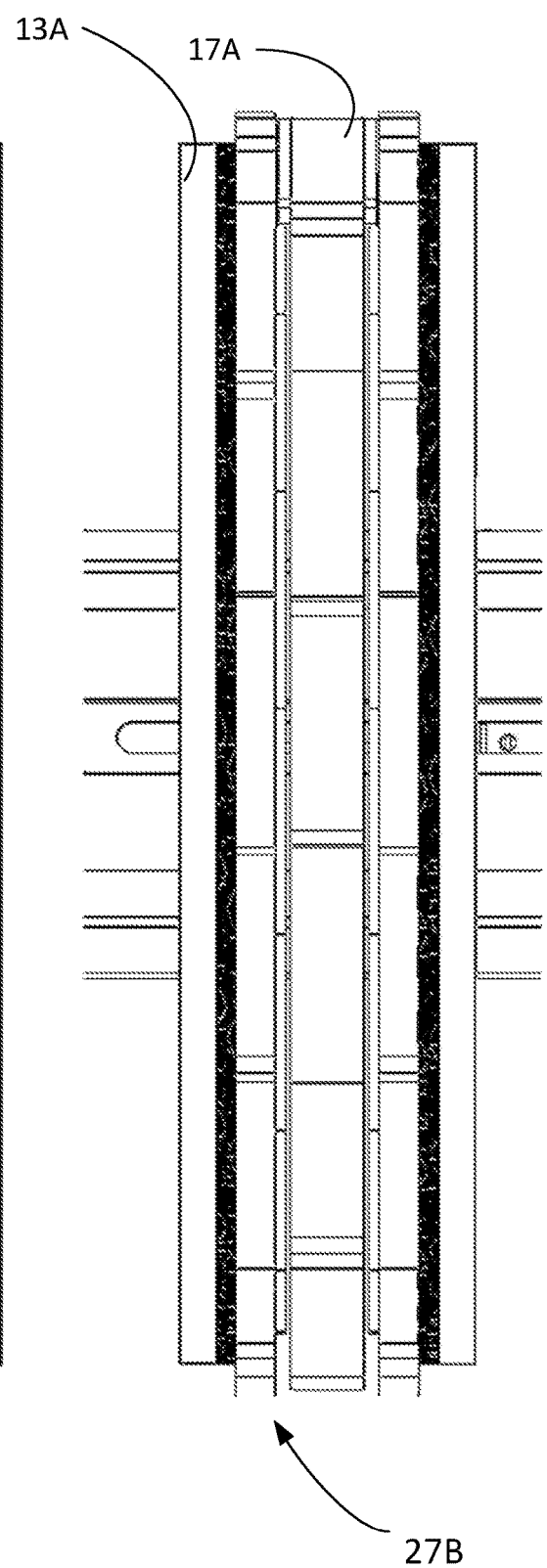
FIG. 18A  FIG. 18B

AXIALLY OR RADIALLY ACTUATED EDDY CURRENT BRAKE WITH INTEGRATED FRICTION BRAKE

CROSS-REFERENCE TO RELATED APPLICATION(S)

The present disclosure claims the benefit of and priority to U.S. Provisional Patent Application Ser. No. 62/822,502, filed on Mar. 22, 2019, titled "Permanent Magnet Eddy Current Brake", U.S. Provisional Patent Application Ser. No. 62/946,286, filed on Dec. 10, 2019, titled "Actuated Permanent Magnet Eddy Current Brake with Integrated Friction Brake", and U.S. Provisional Patent Application Ser. No. 62/985,191, filed on Mar. 4, 2020, titled "Permanent Magnet Eddy Current Brake" the disclosures of which are incorporated by reference in their entirety herein.

FIELD OF THE INVENTION

The present disclosure relates generally to braking systems, and more specifically to an axially or radially actuated hybrid permanent magnet—electromagnetic eddy current brake.

BACKGROUND

Brakes have two primary functions: 1) to decelerate a rotating or sliding member and 2) to keep the member stationary when not in motion. In some cases, the brakes may also be used to steer a vehicle on the ground by applying differential braking. Conventional brakes work by converting kinetic energy into heat energy through friction generated between brake pads. Subsequently, the brake pads wear over time and require maintenance or replacement.

Carbon disc brakes are a subset of conventional friction brakes that decelerate a vehicle through high-force contact between several carbon discs. As a result of the high-force contact, carbon disc brakes often wear quickly, require regular maintenance, and have limited safe service lives. The elimination of carbon disc brakes could improve brake life and decrease material consumption, lower brake maintenance costs, and possibly eliminate the emission of carbon dust from brakes. Carbon dust is detrimental to the health of people, especially personnel working near or maintaining such brakes, if/when inhaled.

Most aircraft have carbon disc brakes on each of the main landing gear wheels. Light aircraft brakes typically comprise a single disc attached to each wheel. Brakes on large aircraft may comprise multiple discs attached to each wheel. The disc can be keyed or bolted to the wheel assembly, or can be produced as an integral part of the wheel. The disc rotates with the wheel while brake pads are squeezed against one or both sides of the disc. The braking torque is resisted by a non-rotating caliper or torque tube fixed to the landing gear structure.

Aerospace manufacturers worldwide have committed to reducing aviation $CO_2$ emissions by 50% from 2005 levels by 2050. One of the most wasteful systems on a modern aircraft is the brake. Conventional aircraft brakes rely on friction between one or more brake pads and a corresponding rotor to stop the wheels from turning. However, friction also results in wear and degradation of the brakes over time. Their high wear rate means that an aircraft's brakes must be replaced relatively frequently. The production of replacement brake pads results in additional $CO_2$ emissions and the subsequent maintenance procedure to replace the brakes is time consuming, labor intensive, and requires the aircraft to be grounded.

As per federal aviation regulations, brake system maintenance on certified light aircraft is not a legal owner maintenance task as it is not considered a preventive maintenance item. Work on the brake system must therefore be completed under the supervision of an authorized airframe and powerplant (A&P) mechanic. This further complicates the brake maintenance procedure and results in additional logistical and scheduling delays. Private owners of light aircraft often prefer to perform preventive maintenance on their own aircraft. This requirement therefore represents a significant obstacle to having their aircraft in a ready-to-fly state at all times.

In commercial aircraft, brake system maintenance is one of the only on-condition maintenance tasks. This means that there is no set schedule to when brakes need to be replaced. Instead, it depends on the degree of use, predominant weather conditions during use, and even how hard the pilots apply the brakes during each landing. This makes it difficult to predict and therefore very difficult to bundle with other regular maintenance tasks as a means of lowering maintenance costs and preventing schedule disruption. Furthermore, aircraft brake maintenance occurs much more frequently and unpredictably than other major aircraft subsystems. The high frequency and relative unpredictability of brake replacement in commercial aircraft imposes a significant financial, logistical, and safety burden on aircraft operators and airlines.

Therefore a need exists for a low wear rate brake capable of replacing conventional friction brakes.

SUMMARY

According to a first aspect of the present disclosure, a magnetic brake assembly for use with a wheel rim is described. The magnetic brake assembly includes a rotor secured to rotate with the wheel rim and a stator secured to be rotationally stationary relative to the rotor. One of the rotor and stator comprises an electrically conductive body and the other of the rotor and stator comprises a magnetic array including a plurality of magnets configured to generate a magnetic flux. An actuator is operably connected to at least one of the electrically conductive body and the magnetic array to selectively effect a brake mode and a non-brake mode, wherein in the brake mode the magnetic array induces eddy currents in the electrically conductive body to cause a magnetic braking force therein when the rotor rotates above a threshold speed and in the non-brake mode the induced eddy currents cause a negligible or no magnetic braking force as the rotor rotates above the threshold speed.

In some example embodiments, the magnetic brake assembly further includes a friction brake that is actuatable to apply a friction braking force on the rotor. In some examples, the friction brake is actuated by the actuator to apply the friction braking force after the magnetic braking force is applied on the rotor.

In some example embodiments, the plurality of magnets comprises a plurality of permanent magnets and a plurality of electromagnets, and the actuator comprises an electrical relay that turns on the plurality of electromagnets in the brake mode and turns off the plurality of electromagnets in the non-brake mode. In some examples, the plurality of electromagnets and the plurality of permanent magnets are arranged circumferentially in a circular Halbach array such that the magnetic flux of the magnetic array is substantially one-sided and in a direction substantially perpendicular to the magnetic array when at least some of the plurality of electromagnets are turned on. The placement and configuration of the plurality of electromagnets within the magnetic array is such that the polarity of at least some of the plurality of electromagnets when turned on determines which side of the magnetic array experiences a substantially greater magnetic flux.

In some example embodiments, the actuator comprises a mechanical actuator that is configured to effect the brake mode and the non-brake mode by changing a relative position of the magnetic array and the electrically conductive body by positioning the magnetic array and the electrically conductive body closer together to increase the amount of induced eddy currents to effect the brake mode and positioning them further apart to decrease the amount of induced eddy currents to effect the non-brake mode.

In some example embodiments, the mechanical actuator is configured to move the stator axially towards the rotor along the rotational axis of the wheel rim to effect the brake mode and axially away from the rotor to effect the non-brake mode.

In some example embodiments of the first aspect, the magnetic brake assembly includes a non-rotating base, wherein the rotor comprises the electrically conductive body, the stator comprises the magnetic array, and the stator is slidably mounted on the non-rotating base, the mechanical actuator being configured to move the stator relative to the rotor along the non-rotating base to vary the magnetic braking force effected on the rotor. In some examples, the mechanical actuator comprises at least one linear displacer operably connected with the stator for axially moving the stator along the non-rotating base.

In some example embodiments, the non-rotating base comprises a member having a circular cross-section and the stator has a central hole sized to fit on the member of the non-rotating base, the non-rotating base and the stator having mateable splines such that the stator is capable of resisting a torque applied about the rotational axis of the wheel rim.

In some example embodiments, the plurality of magnets comprises a plurality of permanent magnets, and the plurality of permanent magnets are arranged circumferentially in a circular Halbach array such that the magnetic flux of the magnetic array is substantially one-sided and in a direction substantially perpendicular to the magnetic array.

In some example embodiments, the magnetic brake assembly includes a first friction element connected with the rotor and a second friction element connected with the stator and configured to mutually engage to effect a friction braking force on the rotor when the actuator moves the stator within a predetermined distance of the rotor.

In some example embodiments of the first aspect, the rotor comprises the electrically conductive body, the stator comprises the magnetic array, and the magnetic array comprises a plurality of magnets that are movable in a radial direction with respect to the rotational axis, the mechanical actuator being configured to move the each of the plurality of magnets radially from an outer radial position to an inner radial position to effect the brake mode. A distance between each of the plurality of magnets and the rotor is greater at the outer radial position than at the inner radial position. In some examples, each of the plurality of magnets is flexibly biased in the outer radial position and are moved to the inner radial position by action of the mechanical actuator.

In some example embodiments, the magnetic brake assembly includes a non-rotating base having an elongate portion, the elongate portion being cylindrical and having a helical spline on a surface thereof. The assembly also includes a sleeve slidable along the elongate portion and having an internal helical groove sized and shaped to mate with the helical spline on the elongate portion for causing the sleeve to rotate around an axis of the elongate portion when sliding axially therelong. In some examples, the mechanical actuator is configured to move the sleeve axially along the elongate portion between a deactivated state and an activated state, and the plurality of magnets are connected with the sleeve and are movable between the outer radial position and the inner radial position with the rotation of the sleeve around the axis of the elongate portion by means of a plurality of members connecting the plurality of magnets to the sleeve.

In some example embodiments, the magnetic brake assembly has a rotor with at least one brake pad attached thereto, the sleeve has a circular disc at an end thereof, and in the activated state, the circular disc frictionally engages the brake pad for producing a frictional braking effect therewith.

In some example embodiments, the magnetic brake assembly includes multiple sets of stators and rotors actuatable between the brake mode and the non-brake mode, wherein for each set, one of the rotor and stator comprises an electrically conductive body and the other of the rotor and stator comprises a magnetic array comprising a plurality of magnets configured to generate a magnetic flux.

In some example embodiments, the electrically conductive body is embedded with one or more ferromagnetic cores configured to increase the magnetic flux through the electrically conductive body when the brake mode is effected.

According to another aspect of the present disclosure is an aircraft landing gear assembly comprising a nose gear and a main landing gear comprising a wheel rotatable about a rotational axis, and fitted with the magnetic brake assembly of the first example aspect.

According to a further example aspect of the present disclosure is a method of braking a rotating wheel rim using a magnetic brake assembly. The magnetic brake assembly includes a rotor secured to rotate with the wheel rim, a stator secured to be rotationally stationary relative to the rotor, wherein one of the rotor and stator comprises an electrically conductive body and the other of the rotor and stator comprises a magnetic array configured to generate a magnetic flux. The method involves causing the magnetic array to induce eddy currents in the electrically conductive body to effect a magnetic braking force on the rotor as the wheel rim rotates. In some examples, causing the magnetic array to induce eddy currents in the electrically conductive body is accomplished by reducing a distance between the magnetic array and the electrically conductive body, wherein the magnetic array comprises a plurality of magnetics arranged circumferentially in a Halbach array.

BRIEF DESCRIPTION OF THE DRAWINGS

Some embodiments of the present disclosure are illustrated as an example and are not limited by the figures of the accompanying drawings, in which like references may indicate similar elements, parts, assemblies, or concepts.

FIG. 18A is a close-up side view of an axially actuated permanent magnet eddy current brake featuring a single rotor and two stators in the fully disengaged position, in accordance with an embodiment of the present disclosure.

FIG. 18B is a close-up side view of the single rotor and two stators of FIG. 18B, but in the fully engaged position.

DETAILED DESCRIPTION OF THE EMBODIMENTS

Figure 1:
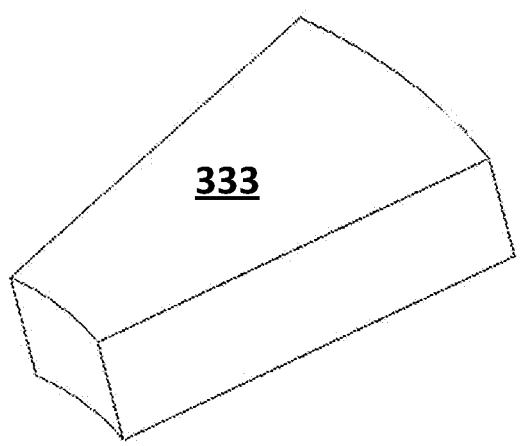
FIG. 1 is a perspective view of an individual permanent arc magnet.

The terminology used herein is for the purpose of describing particular embodiments only and is not intended to be limiting of the disclosure. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising" and/or "may be", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In this disclosure, the terms "magnetic brake", "magnetic brake assembly", "eddy current brake", and "eddy current magnetic brake" are used interchangeably. All refer to a brake assembly that utilizes magnets to induce eddy currents in an electrically conductive body, which in example embodiments may be a rotor.

In this disclosure, the terms "deactivated state", "disengaged position", "disengaged mode", "brake off", "off configuration", and "non-brake mode" all refer to a mode of operation of the magnetic brake in which the magnets or electromagnets induce little or no eddy currents in an electrically conductive body.

In this disclosure, the terms "activated state", "engaged position", "engaged mode", "brake on", "on configuration", and "brake mode" all refer to a mode of operation of the magnetic brake in which the magnets or electromagnets induce significant eddy currents in an electrically conductive body so as to produce a magnetic braking force on the electrically conductive body.

Eddy current braking systems for aircraft are discussed herein. In the following description, for purposes of explanation, some specific details are set forth in order to provide as thorough an understanding of the present disclosure as possible. It will be evident, however, to one skilled in the art that the present disclosure may be practiced without these specific details.

The present disclosure relates to the application of Halbach permanent magnetic arrays to eddy current braking systems. The present disclosure also relates to the application of electromagnets within Halbach permanent magnetic arrays in order to achieve brake control. More specifically, the present disclosure relates to the use and method of actuation of permanent magnetic arrays or hybrid permanent magnet—electromagnetic arrays in an eddy current braking system with an integrated friction brake actuated by the same means. The present disclosure presents example embodiments that may be specific to certain applications, however it will be clear to one skilled in the art that the disclosure may also be practiced in other applications.

The present disclosure is to be considered as an exemplification of the invention, and is not intended to limit the invention to the specific embodiments illustrated by the figures or descriptions below.

The present disclosure will now be described by general explanation and by referencing the appended figures representing preferred embodiments. Some figures are labelled while some figures are described holistically with reference to self-evident components or assemblies shown in the figures. For all non-labelled figures, the components or assemblies shown in the figures will have been labelled in previous figures of the same components or assemblies and will be immediately obvious. For all other figures, the components or assemblies discussed will be evident to one skilled in the art.

Figure 2:
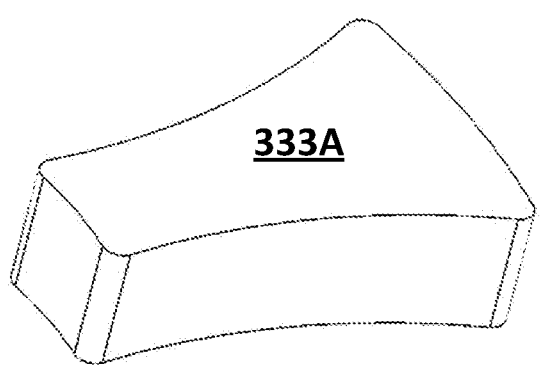
FIG. 2 is a perspective view of an irregularly shaped concave permanent magnet.
Figure 3:
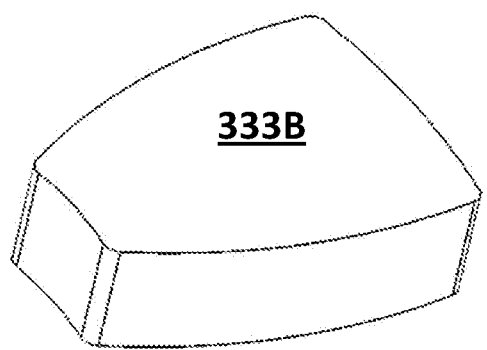
FIG. 3 is a perspective view of an irregularly shaped convex permanent magnet.
Figure 4:
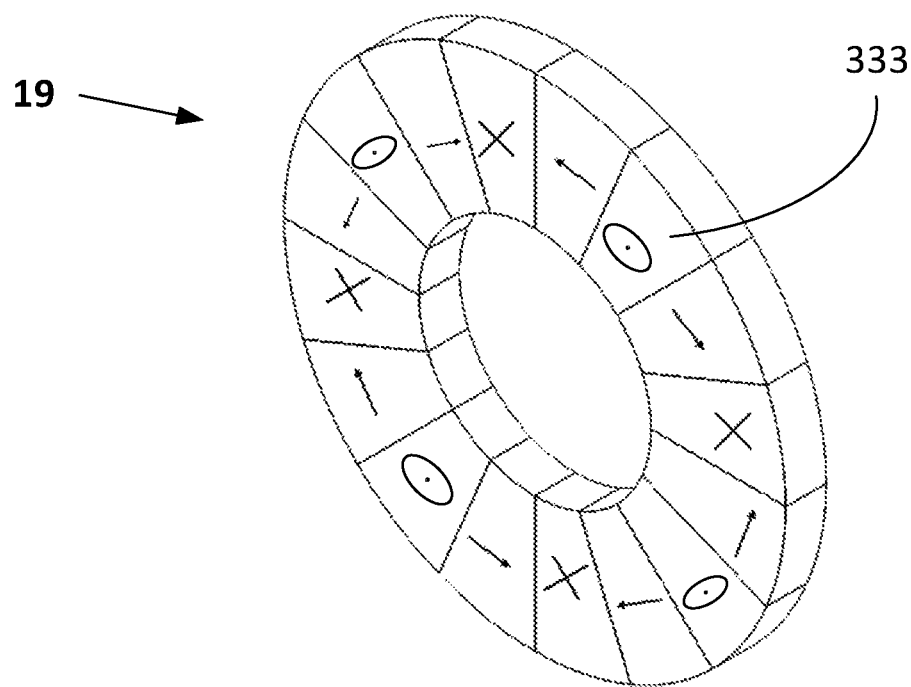
FIG. 4 depicts a radial permanent magnetic array comprised of a plurality of arc magnets such as the one shown in FIG. 1, arranged in a circumferential Halbach configuration such that the magnetic flux of the magnetic array is substantially one-sided towards a corresponding rotor, the magnetic field orientation of each individual magnet labelled, in accordance with an embodiment of the present disclosure.

FIG. 1 depicts an arc magnet 333 which is a neodymium iron boron (NdFeB) N42 grade high-strength arc magnet, for use in some embodiments of the present disclosure. In some embodiments of the present disclosure, the permanent magnets used may be cubes, rectangular prisms, cylinders, discs, or they may be irregularly shaped. With reference to FIG. 2, the magnet 333A shown is an irregularly shaped concave permanent magnet. With reference to FIG. 3, the magnet 333B is an irregularly shaped convex permanent magnet. The permanent magnets 333, 333A and 333B may be arranged in radial Halbach magnetic arrays (hereinafter "magnetic arrays"). For example, with reference to FIG. 4, there is shown a magnetic array 19 comprised of 16 of the permanent arc magnets 333 of FIG. 1. The magnets in a Halbach array are arranged in a circle with their magnetic flux oriented in a particular way to produce a strong magnetic flux on one side of the magnetic array. In FIG. 4, magnets marked with an "X" have their flux into the page, magnets marked with an "O" have their flux coming out of the page, and other magnets have an arrow showing the direction of their flux. This arrangement produces a strong magnetic flux on one side of the magnetic array 19. The magnetic array 19 may be used as part of a stator assembly of a magnetic brake as will be explained below.

Figure 5:
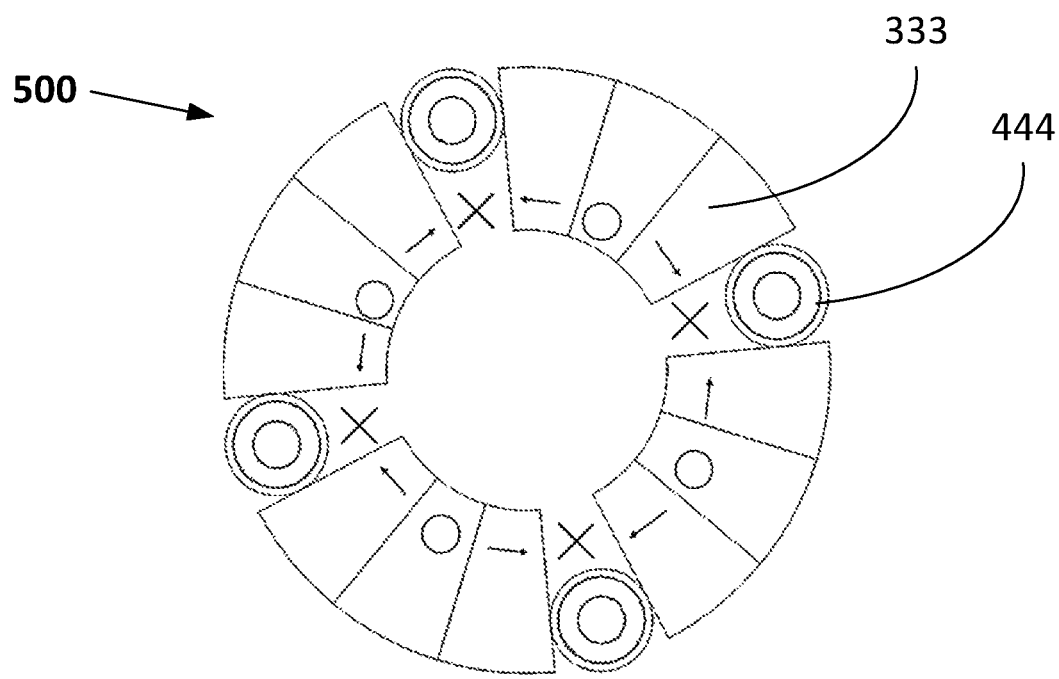
FIG. 5 depicts a hybrid permanent magnet—electromagnetic radial array comprised of a combination of permanent arc magnets and electromagnets, arranged in a circumferential Halbach configuration such that the polarity of the electromagnets when turned on determines which side of the magnetic array will experience a substantially greater magnetic flux, in accordance with another embodiment of the present disclosure.

FIG. 5 shows a magnetic array 500 comprised similar to magnetic array 19 but some of the permanent magnets 333 have been replaced by electromagnets 444, thus forming hybrid permanent magnet—electromagnetic array 500. In the preferred embodiment of the present disclosure, electromagnets 444 replace the permanent magnets 333 at the array indices shown in FIG. 5. The electromagnets 444 are in the positions that correspond to a magnetization direction substantially through an adjacent rotor. In the configuration shown in FIG. 10, the electromagnets 444 complete the Halbach array pattern when turned on and thereby cause the magnetic flux of the resultant array 500 to be substantially one-sided with little magnetic flux on the opposite side of the array. In some embodiments of the present disclosure, this may enable a fast response time between the brake on and brake off states, allowing for implementation of anti-lock braking systems.

In other embodiments of the present disclosure, the pole projection areas of the electromagnets 444 may be arcs, squares, ovals, or other irregular shapes. In the preferred embodiment of the present disclosure, the shape of the electromagnets 444 is an arc and is as similar as possible to the shape of the permanent magnets 333 in the same array 500. This may allow for greater interaction between the electromagnets 444 and the two adjacent permanent magnets 333.

Figure 6:
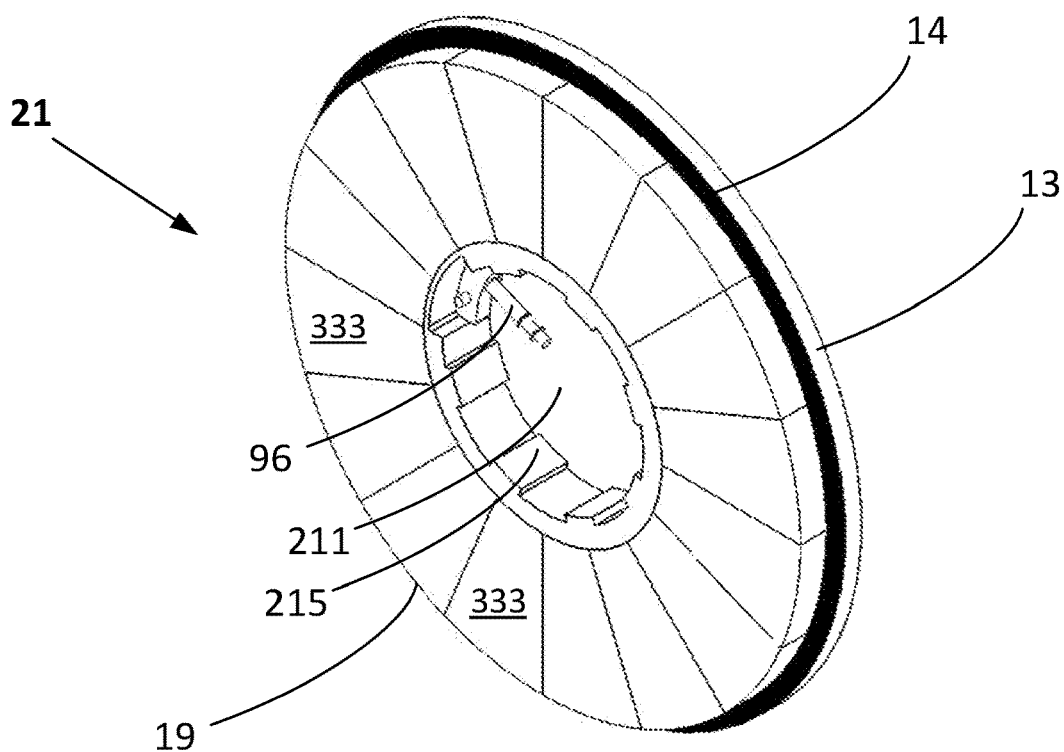
FIG. 6 is an isometric view of a stator assembly including the radial permanent magnetic array of FIG. 4, in accordance with an embodiment of the present disclosure.
Figure 7:
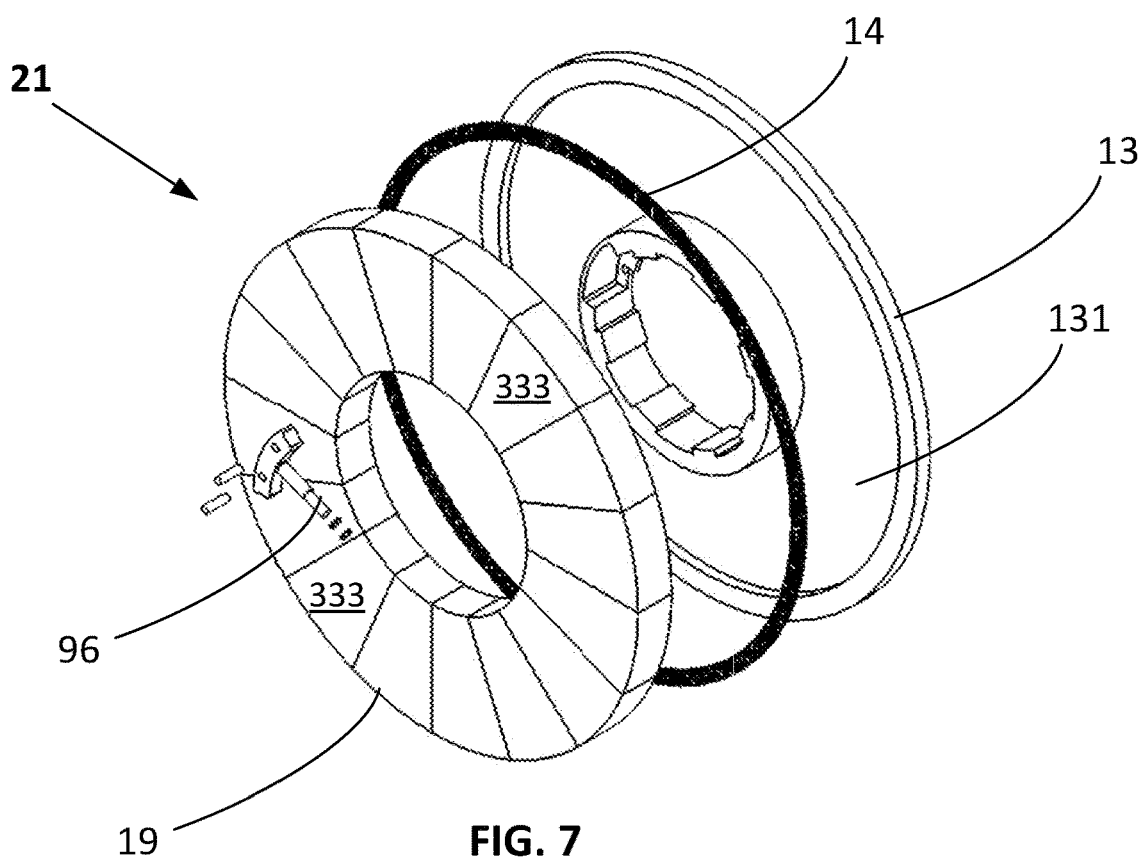
FIG. 7 is an exploded isometric view of the stator assembly of FIG. 6.

FIGS. 6 and 7 depict a stator assembly 21 ("stator") for use in the magnetic braking system disclosed herein. In one embodiment, the stator assembly 21 comprises a stator base 13, a magnetic array 19 such as the one shown in FIG. 4, and a stator friction ring 14.

The stator base 13 shown is in the form of a circular disc having a rotor-facing side 131 and a circular hole 211 provided with a plurality of splines 215. The hole 211 is sized to fit on a base member, and the splines 215 are arranged to mate with corresponding splines of the base member when the stator 21 is mounted thereon.

The magnetic array 19 is attached to the rotor-facing side 131 of each stator base 13. In one embodiment, the magnets 333 of magnetic array 19 are secured to the stator base 13 in tight grooves cut into the body of the stator base 13. In some embodiments, the magnetic array 19 may be coated with a thin layer of thermal insulative material to protect its surface from scratching, heat, and other environmental conditions. In other embodiments, the magnetic array 19 may be covered with another protective or securing component. In some embodiments, the magnets 333 may be inserted from the outer side of the stator base 13 into hollow openings precut into the stator base 13 such that their surfaces are partly or entirely contained within the stator base 13. The Halbach pattern of each magnetic array 19 is such that it concentrates the magnetic flux produced by the magnets 333 on the exposed face of the magnetic array 19, directed towards a corresponding rotor A stator friction ring 14 is disposed on the outer circumference of the stator base 13 on the rotor-facing side 131, surrounds the magnetic array 19 and is concentric therewith. In one embodiment, the stator friction ring 14 is a ring of carbon friction material placed immediately at the outer radius of the magnetic array 19.

A connection member 96 extends from the stator base 13 and is suitable for engaging an actuator. In the embodiment shown the connection member 96 is radially oriented and extends into the circular hole 211 in substantially the same plane as the stator 21. In the example shown, the connection member 96 features a cylindrical rod, but may be any other shape or configuration.

Figure 8:
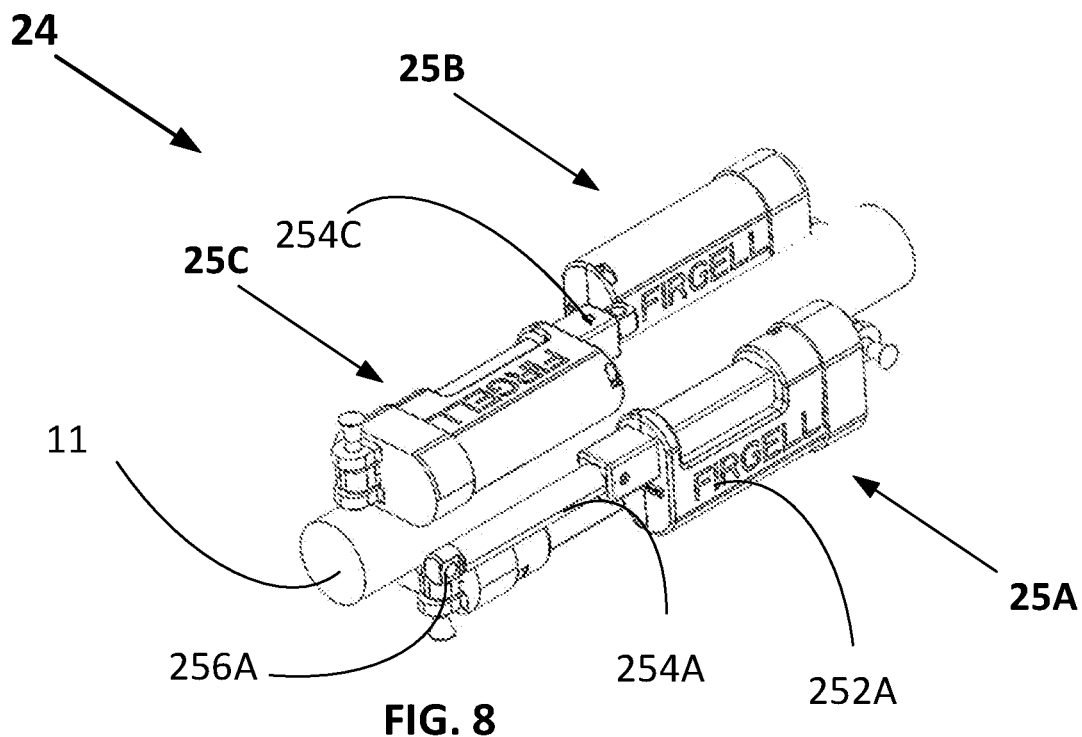
FIG. 8 is an isometric view of a configuration of four electric linear actuators arranged around a shaft, in accordance with an embodiment of the present disclosure.

FIG. 8 shows a mechanical actuator configuration 24. The mechanical actuator configuration 24 is comprised of four electrically or hydraulically powered linear actuators of which three actuators 25A, 25B and 25C (collectively linear actuators "25") are visible. The actuators are shown connected with an axle 11. Each of the linear actuators has an actuation member, an actuation rod, and a connection tip. For example, linear actuator 25A has an actuating member 252A, an actuation rod 254A, and a connection tip 256A. The actuation member converts electrical energy to a linear displacement of the actuation rod. Accordingly, the linear actuators may also be referred to as "linear displacers". For example, the actuation member may extend or retract a corresponding actuation rod. The operation of the actuation member is known in the art and will not be described in detail in this disclosure. The linear actuator 25A is shown in extended mode with the actuation rod 254A extended away from the actuation member 252A. Conversely the linear actuator 25C is show in retracted mode. Each actuation rod ends with a connection tip. For example, the actuation rod 254A of linear actuator 25A ends with the connection tip 256A. When activated linear actuators 25 can move their corresponding connection tip axially parallel to the axle 11.

Figure 9:
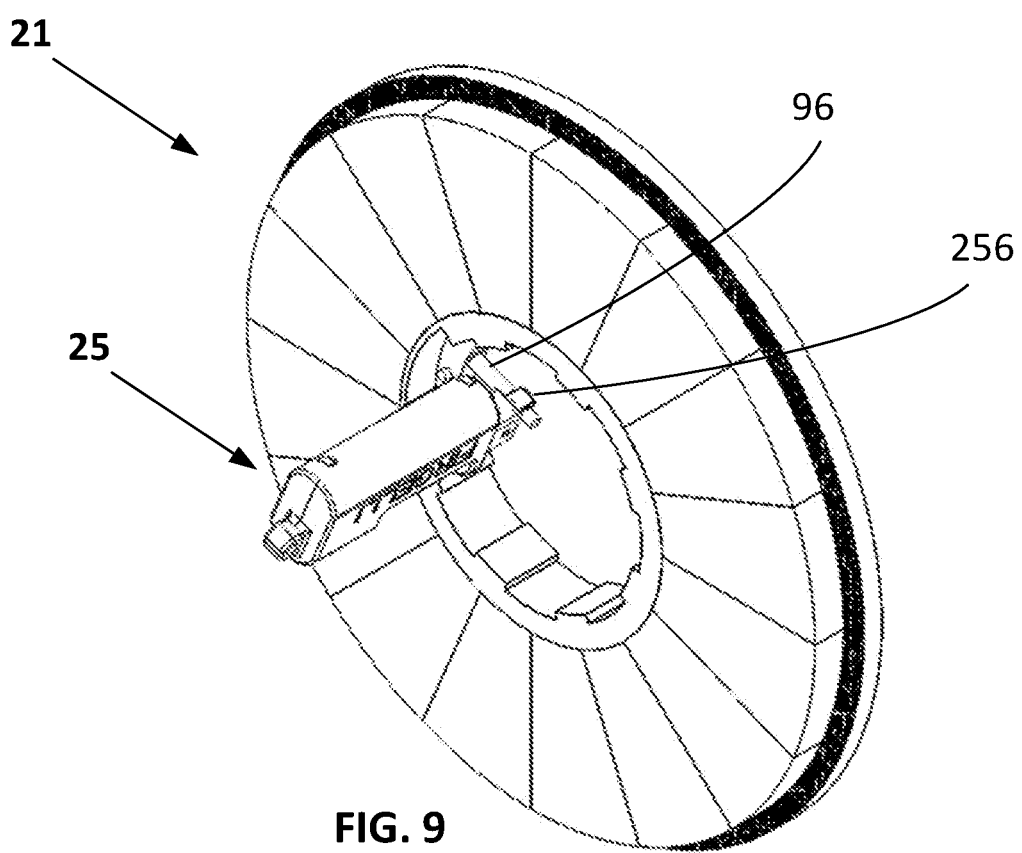
FIG. 9 is an isometric view of the stator assembly of FIG. 6 operably connected to an electric linear actuator in a retracted configuration, in accordance with an embodiment of the present disclosure.

FIG. 9 shows a single electrical linear actuator 25 having its connection tip 256 connected with connection member 96 of stator assembly 21. Accordingly activating the linear actuator 25 may move the stator 21 axially towards or away from the linear actuator 25. Hence, FIG. 8 shows a linear actuator configuration 24 suitable for engaging four stators.

Figure 10:
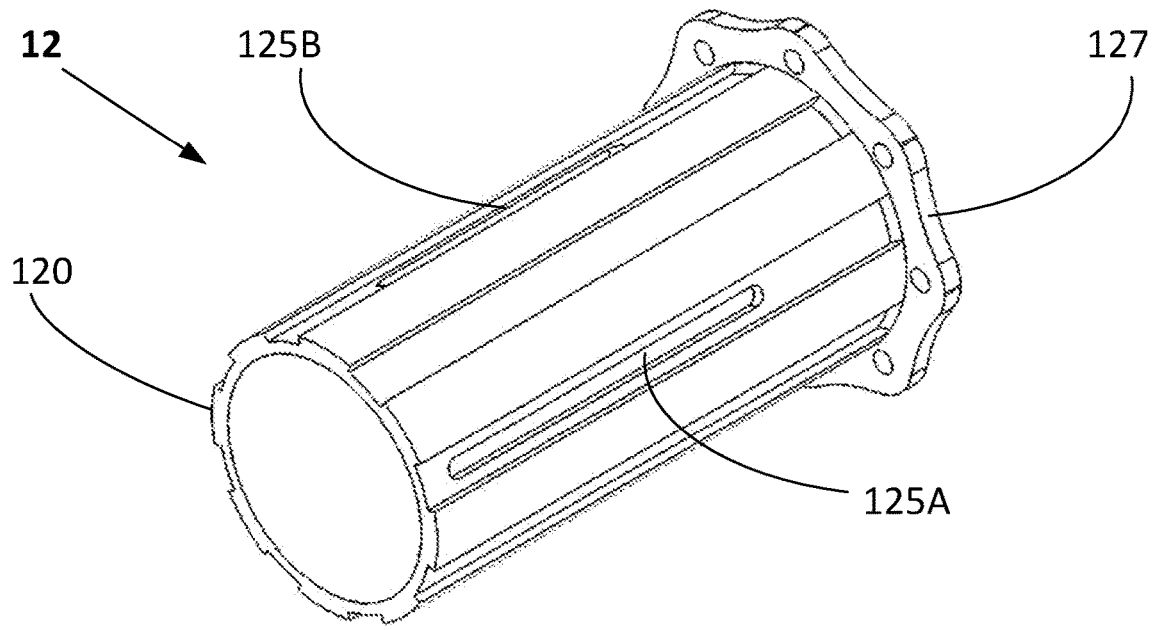
FIG. 10 is an isometric view of a non-rotating base portion, in accordance with an embodiment of the present disclosure.
Figure 11:
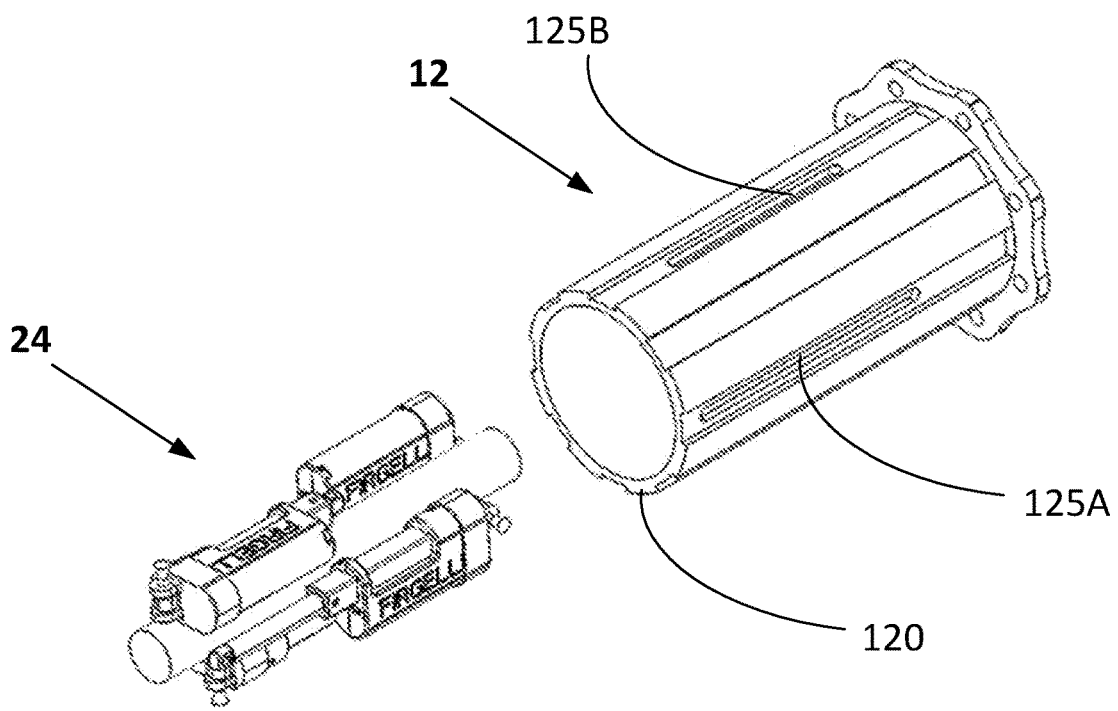
FIG. 11 is an exploded isometric view of the non-rotating base portion of FIG. 10 in conjunction with the configuration of electric linear actuators of FIG. 8, in accordance with an embodiment of the present disclosure.
Figure 12:
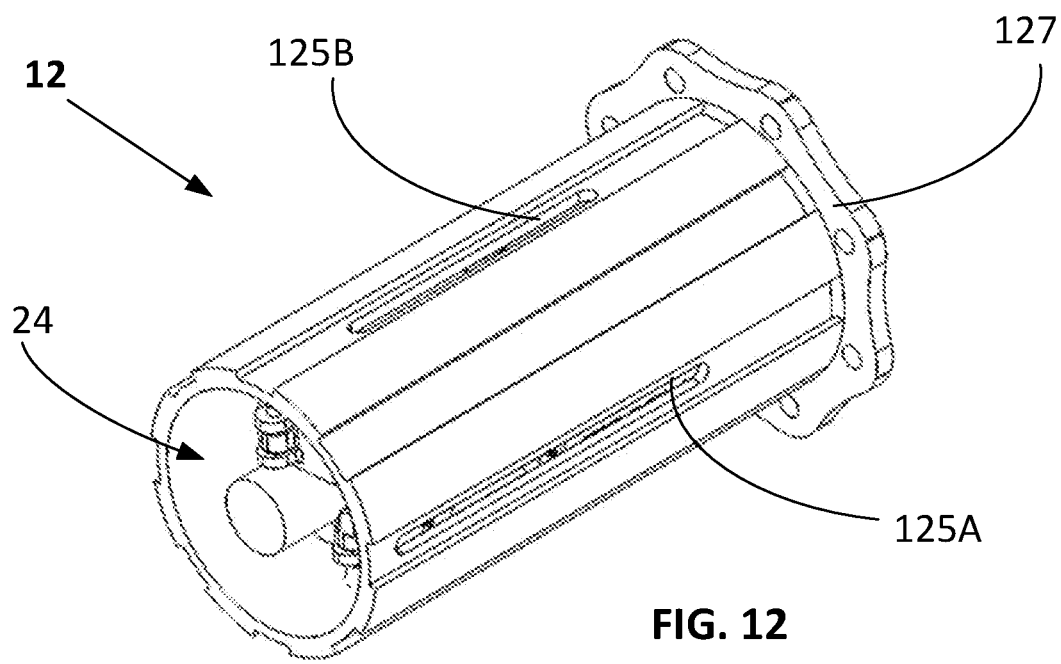
FIG. 12 is an isometric view of the non-rotating base portion of FIG. 10 with each of the electric linear actuators of the configuration shown in FIG. 8 operably connected to the non-rotating base portion and housed therein, in accordance with an embodiment of the present disclosure.

With reference to FIGS. 10-12 a non-rotating base portion 12 for use in the magnetic brake assembly is shown. In one embodiment, the non-rotating portion 12 is bolted to a non-rotating part of the vehicle's structure. The non-rotating portion 12 comprises a tubular cylindrical member which features a plurality of splines 120 and a flange 127. The splines 120 are for receiving and allowing a plurality of stators having a central circular hole with mating splines to slide axially along the length of the non-rotating base portion 12. The mating of the splines 120 with corresponding splines on stators such as stator assembly 21 resists any torque applied to the stators 21. In one embodiment, the non-rotating base portion 12 features slots 125 (only slots 125A and 125B are visible). The slots 125 permit air flow, but may have other purposes as will be described below. The non-rotating base portion 12 may end with a flange 127 at one end thereof. The flange 127 may help retain stators mounted on the base portion 12.

The electric linear actuators of the linear actuator configuration 24 may be compactly nested inside of the non-rotating base portion 12, between the inner wall and the axle 11. The electric linear actuators may be secured in holders, which are in turn fixed to the inside of the non-rotating base portion 12. The example configuration shown allows for a space efficient and compact design that fits within an existing brake envelope of a vehicle. In one embodiment, the connecting tip of each of the four linear actuators is aligned with a corresponding slot 125. Accordingly, a stator 21 may be inserted over the non-rotating portion 12 such that the connection member 96 of the stator 21 engages the connection tip 256 of the linear actuator (as shown earlier in FIG. 9) through a corresponding slot 125. As a result, the actuator 25 may slide the stator 21 axially along the non-rotating portion 12.

Figure 13:
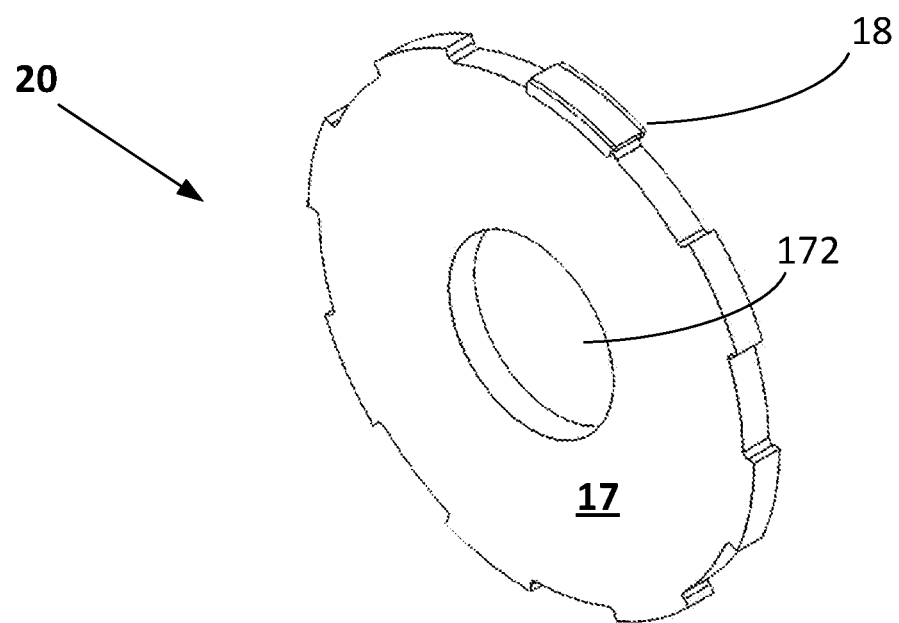
FIG. 13 is an isometric view of a rotor assembly, in accordance with an embodiment of the present disclosure.
Figure 14:
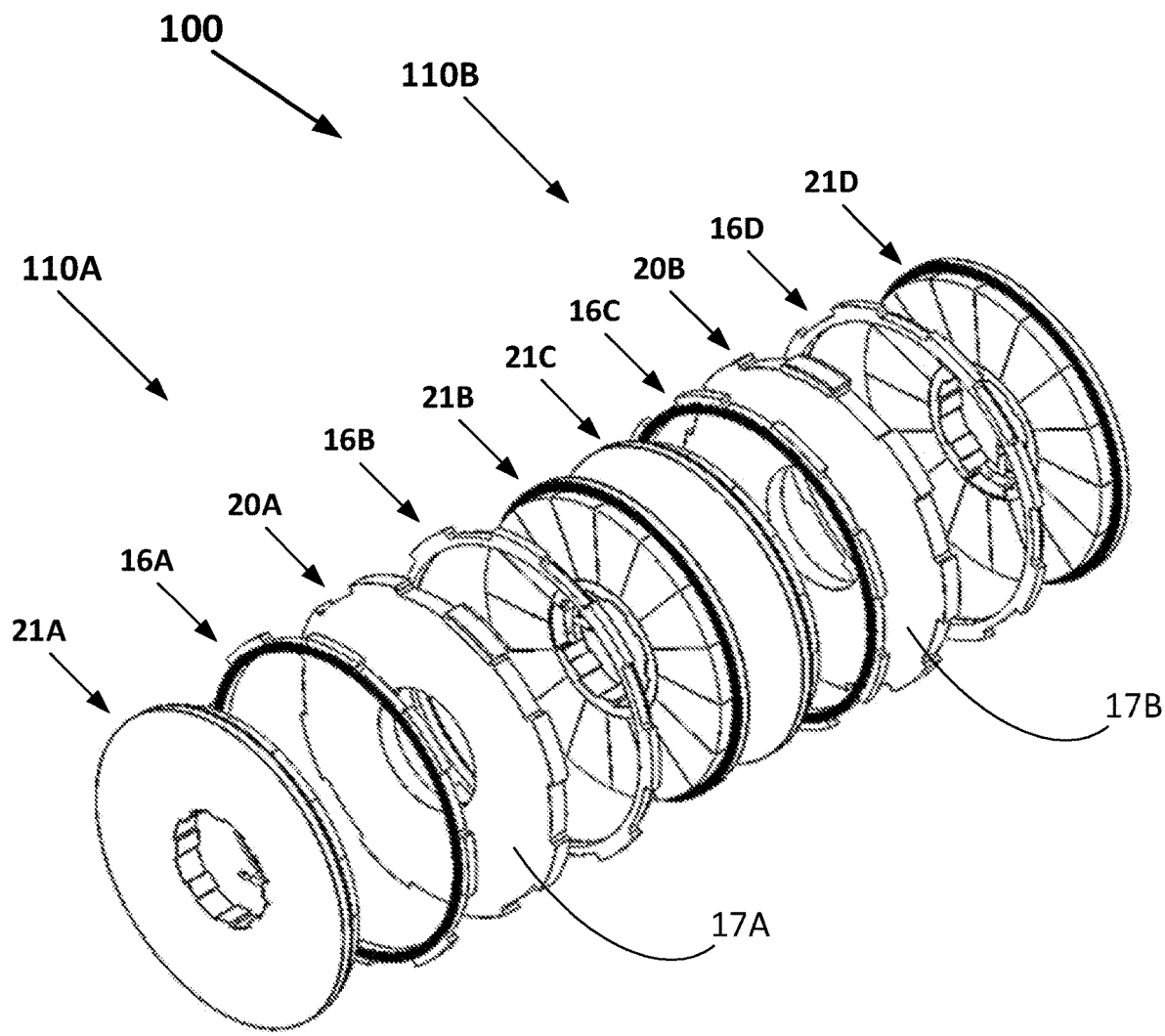
FIG. 14 is an exploded isometric view of an axially actuated permanent magnet eddy current brake assembly, in accordance with an embodiment of the present disclosure.
Figure 15:
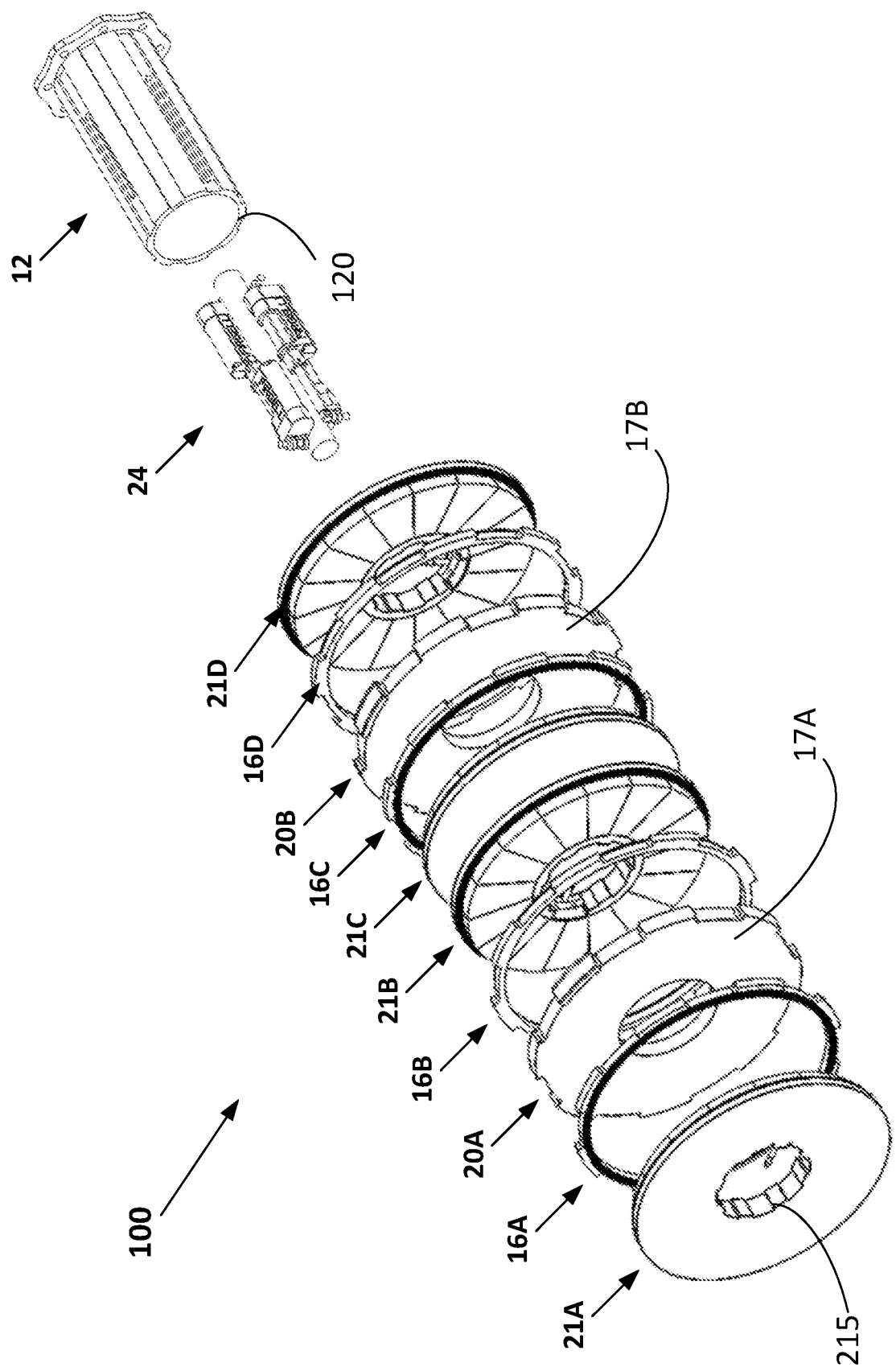
FIG. 15 is an exploded isometric view of the brake assembly of FIG. 14 shown in conjunction with the configuration of electric linear actuators of FIG. 8 and the non-rotating base portion of FIG. 10, in accordance with an embodiment of the present disclosure.

FIG. 13 shows a rotor assembly 20, in accordance with an embodiment of the present disclosure. The rotor assembly 20 is comprised of a rotor 17 and one or more sacrificial anodes 18. The rotor 17 is in the form of a circular disc having a central circular hole 172. In example embodiments, the rotor 17 comprises an electrically conductive body. For the example the rotor 17 may be formed from a highly electrically conductive material. The circumference of the rotor 17 has one or more keys 174. High temperature sacrificial anodes 18 may be attached to one or both sides of one or more keys 174 on the rotors 17 for protecting the rotors against corrosion. In the embodiment shown, there are two sacrificial anodes 18 affixed to both side of a key 174. The sacrificial anodes 18 may be replaced in the event of wear, corrosion, etc. The rotor 17 is configured to be keyed into the rim of a wheel and rotates with the tire. The electrically conductive body of rotor 17 may be made partly or entirely from copper, aluminum, beryllium, or alloys or composites thereof, or any other high electric conductivity, high heat capacity material.

With reference to FIGS. 14-15, 16A-16C, and 17A-17C there is shown an axially actuated magnetic brake assembly 100. The magnetic brake assembly 100 shown is comprised of two identical magnetic brake sub-assemblies 110A and 110B (collectively "110"). Each of the magnetic brake sub-assemblies 110 is comprised of a rotor assembly, two stators, and two friction rims. For example, brake sub-assembly 110A is comprised of the rotor assembly 20A including the rotor 17A, the two magnet carrying stators 21A and 21B, and the two friction rims 16A and 16B. The magnetic brake sub-assembly 110B has a similar structure and is comprised of the rotor assembly 20B including rotor 17B, the two magnet carrying stators 21C and 21D, and the two friction rims 16C and 16D. The brake sub-assemblies 110A and 110B are mounted on the non-rotating base portion 12 in which the linear actuator configuration 24 has been inserted. The non-rotating base portion 12 is in turn fixedly attached to a non-rotating part of a vehicle's structure. In some embodiments, the non-rotating base portion is fixed to a static anchor point such as a floor or another non-rotating support structure. The magnetic brake assembly 100 is shown in conjunction with an axle 11, which is not part of the magnetic brake assembly 100. In one embodiment, the axle 11 is a vehicle wheel axle. In other embodiments of the present disclosure, the axle 11 may be the drive shaft of a vehicle. In other embodiments of the present disclosure, the axle 11 may be a rotating shaft belonging to a piece of machinery or other industrial equipment.

The two rotors 17A and 17B (collectively "17") are configured to each spin with a wheel, such as an airplane wheel. The central holes of the rotors 17 are large enough that the rotors 17 may spin freely while mounted on the non-rotating base portion 12. In some embodiments, the rotors are keyed to the inside of the wheel rim such that they spin at the same speed as the wheel. The rotors preferably are thick enough to collectively absorb the entirety of the vehicle's kinetic energy without increasing their temperature to a high enough point that the electric conductivity of their constitutive material is excessively reduced.

The four stators 21A, 21B, 21C, and 21D (collectively "21") mounted on the non-rotating base portion 12 such that the splines 215 formed in the central hole of the stators 21 mate with the splines 120 of the non-rotating base portion thus preventing the stators from rotating even under a torque force. The stators 21 are oriented such that the corresponding magnetic array directs its flux towards a rotor. For example, stator 21A is oriented such that the magnetic array mounted thereon faces the rotor 17A and directs its flux towards the rotor 17A. Similarly, the stator 21B is oriented such that the magnetic array mounted thereon faces the rotor 17A and directs its flux towards the rotor 17A. The stators 21 are operably connected to corresponding linear actuators of the actuator configuration 24 such that each of the four stators 21 is axially slidable along the non-rotating base portion 12 under action of the corresponding linear actuator so that brake assembly can be switched from a disengaged position to an engaged position and vice versa. The connection between each linear actuator and its corresponding stator is made through slots formed in the non-rotating base portion as discussed earlier. The linear actuators may each be activated by a controller through connections therebetween.

Figure 16A:
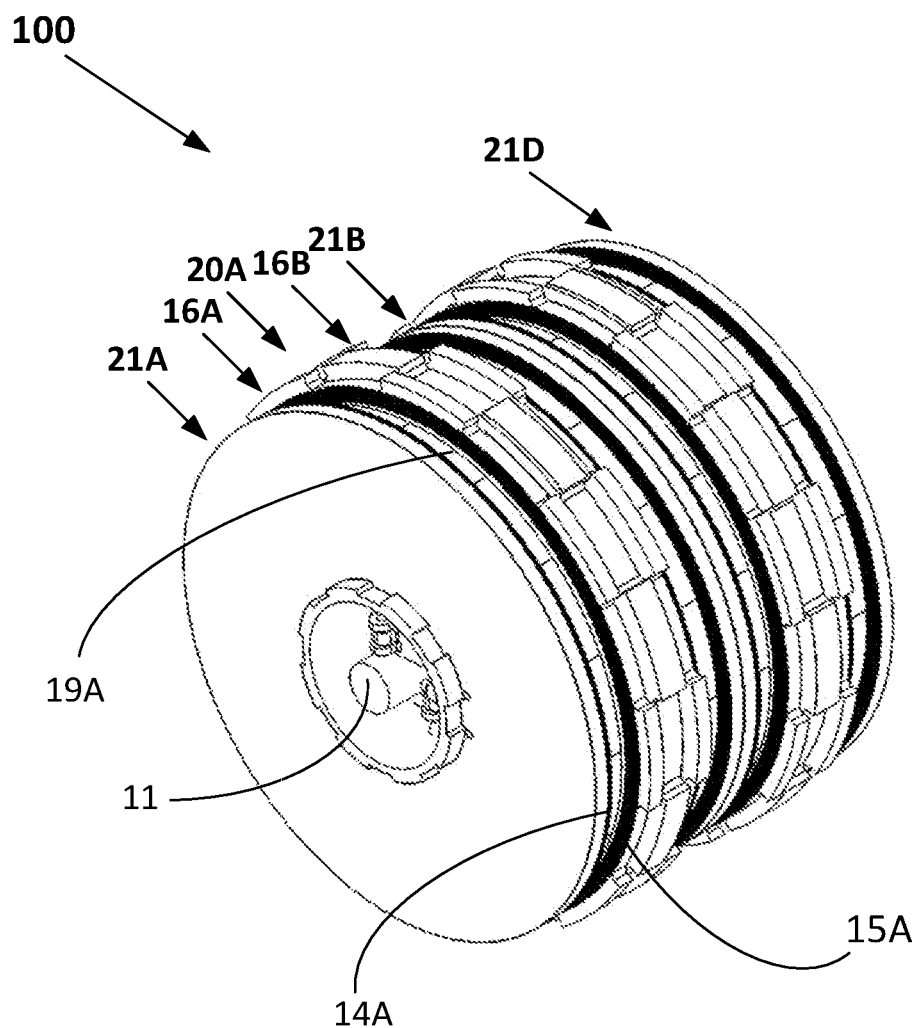
FIG. 16A is an isometric view of an axially actuated permanent magnet eddy current brake in the fully disengaged position, in accordance with an embodiment of the present disclosure.
Figure 16B:
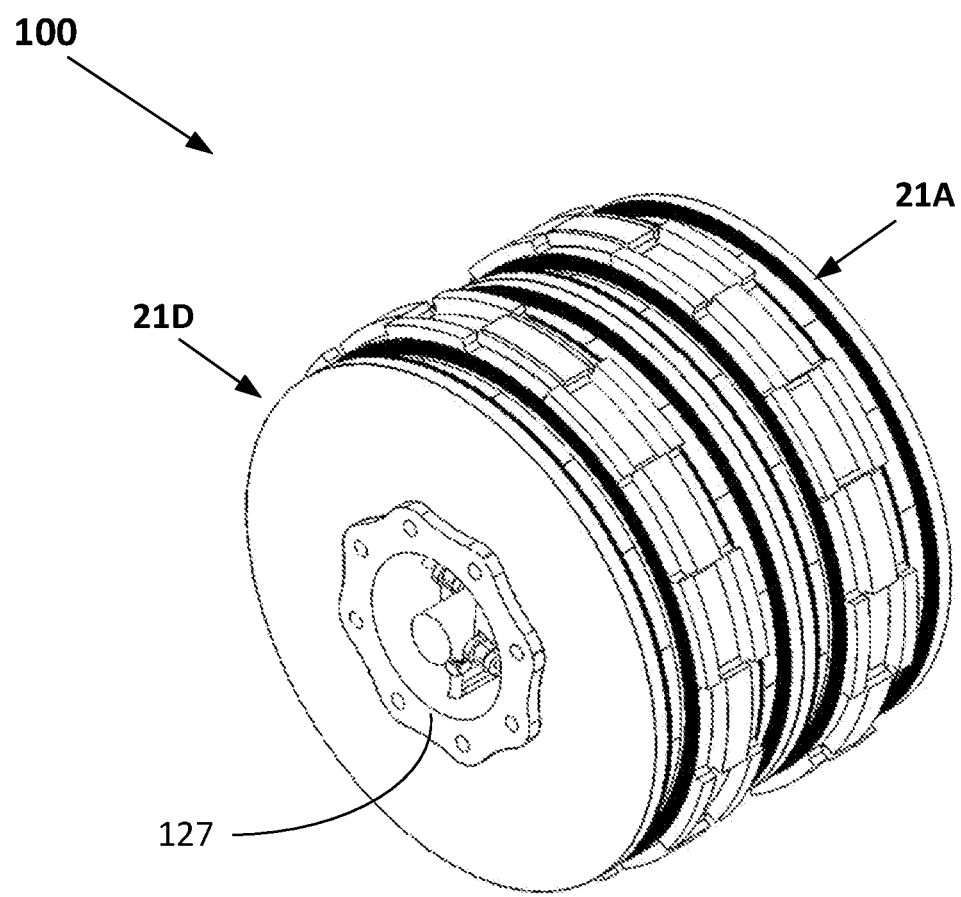
FIG. 16B is an isometric view of the other side of the brake of FIG. 16A in the fully disengaged position.
Figure 16C:
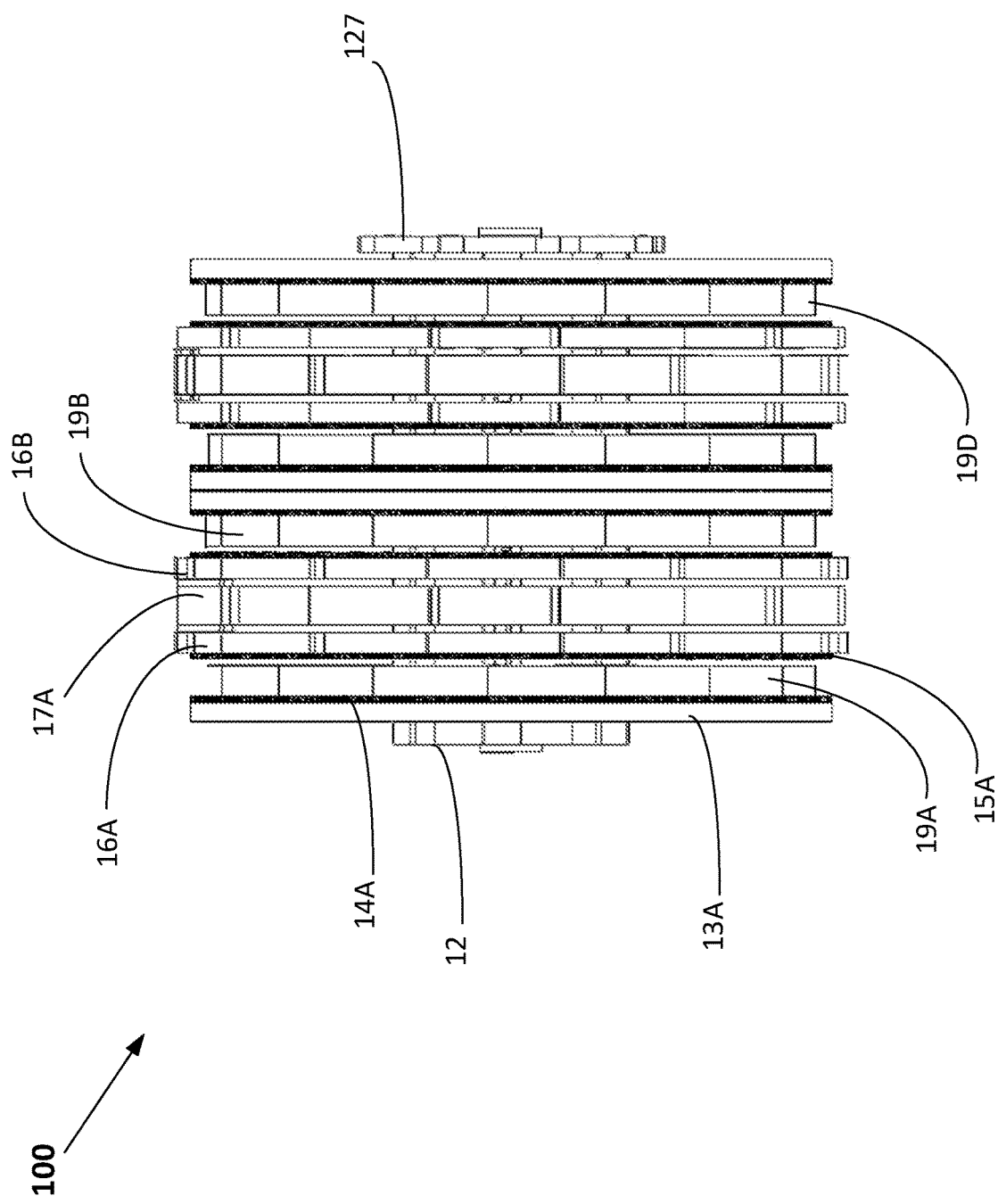
FIG. 16C is a close-up side view of the brake of FIG. 16A in the fully disengaged position.
Figure 17A:
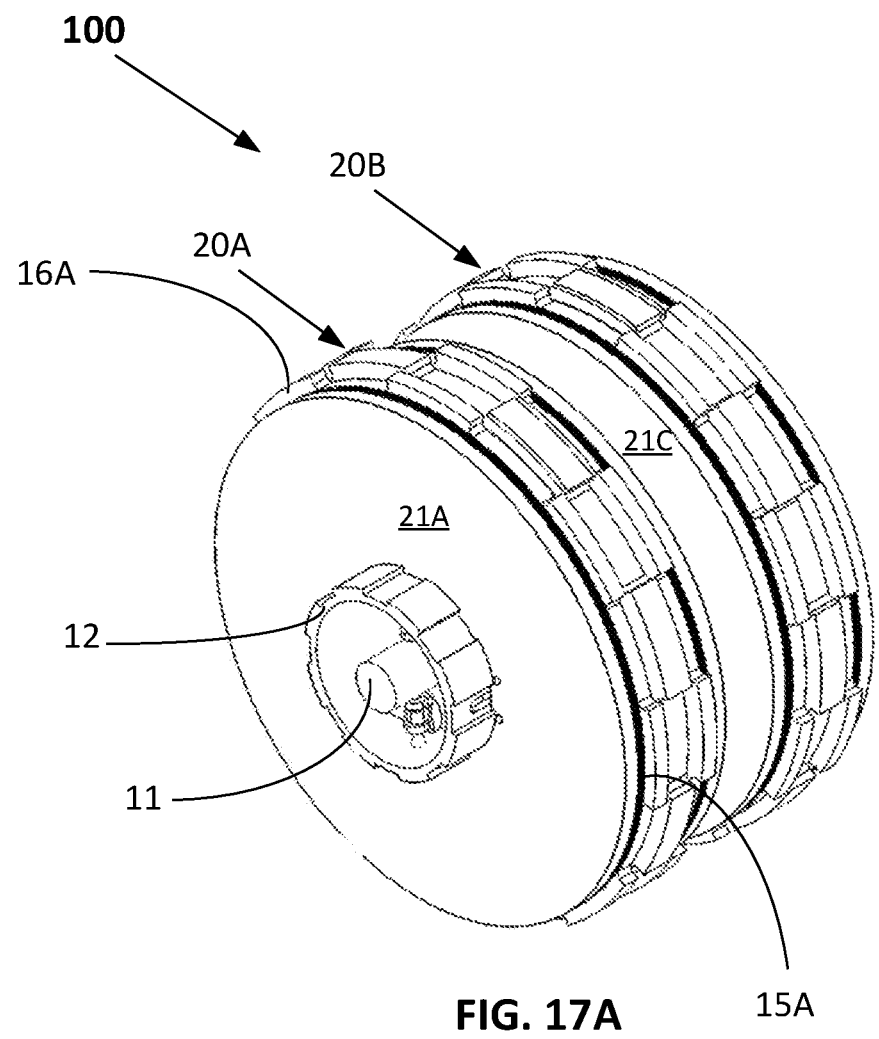
FIG. 17A is an isometric view of the axially actuated permanent magnet eddy current brake of FIGS. 16A-16C, but in the fully engaged position, in accordance with an embodiment of the present disclosure.
Figure 17B:
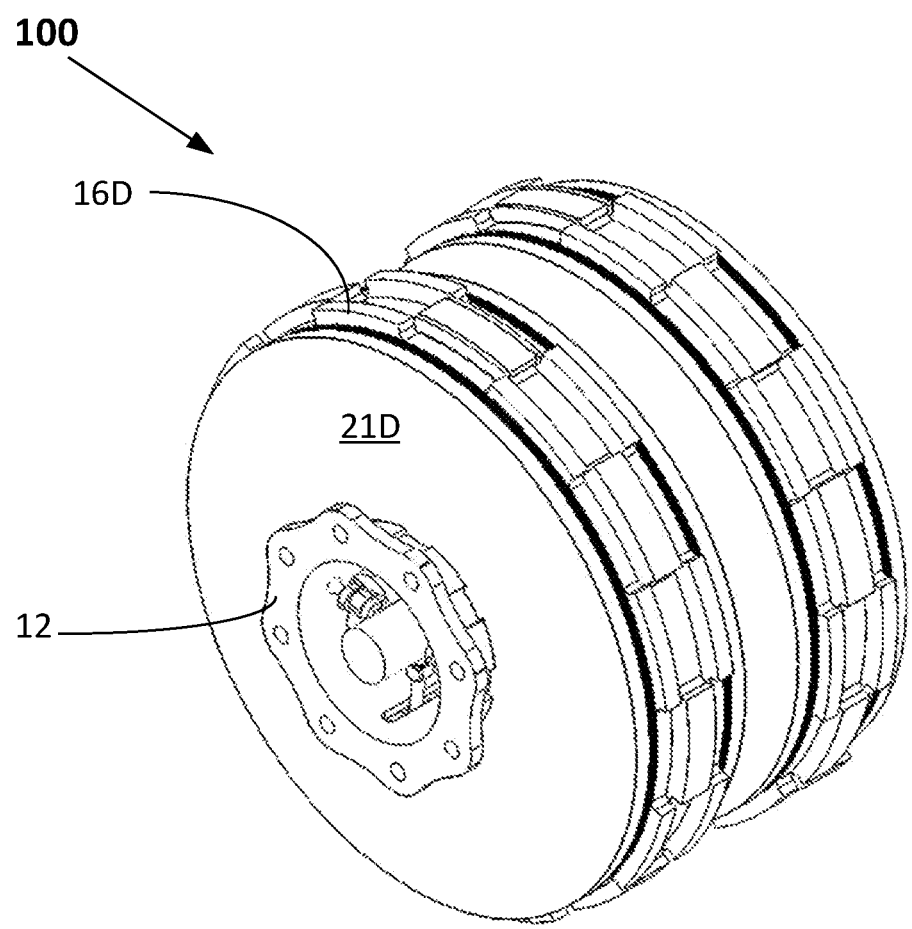
FIG. 17B is an isometric view of the other side of the brake of FIG. 17A in the fully engaged position.
Figure 17C:
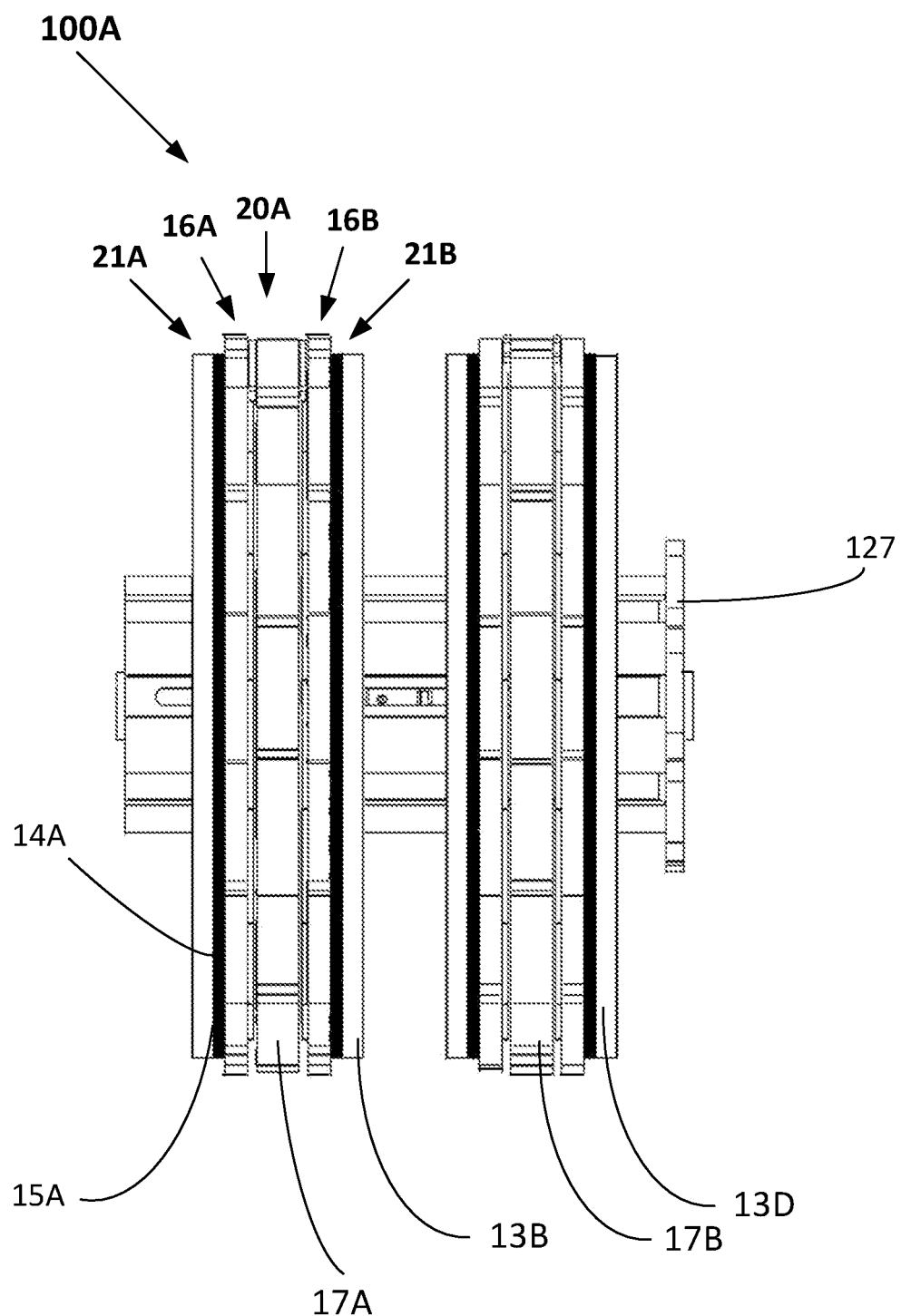
FIG. 17C is a close-up side view the brake of FIG. 17A in the fully engaged position.

The stators 21A and 21B can each slide towards the rotor 17A or slide away from it under the control of the linear actuator. In a disengaged position for the magnetic brake sub-assembly 110A, the stator 21A and 21B are slid away from the rotor 17A, as shown in FIGS. 16A-16C. In the disengaged position, as the rotor 17A spins the magnetic flux directed towards the rotor 17A by the stators 21A and 21B is too weak to induce sufficient eddy currents in the rotor 17A. Thus no magnetic braking effect or force is experienced by the rotor 17A. This disengaged position corresponds to a non-brake mode of the brake sub-assembly. To engage the brake sub-assembly 110A, the stators 21A and 21B are each slid axially towards the rotor 17A. Since the rotor has an electrically conductive body made of an electrically conducting material, the passage of the rotor 17A through the magnetic field induce eddy currents in the rotor 17A. The induced eddy currents in turn each produces a magnetic field that is in opposition to the magnetic field formed by the magnetic arrays. The interaction between the two opposing magnetic fields produces a braking torque. The braking torque produced by the brake is controlled by varying the distance between the magnetic arrays 19A and 19B and the associated rotor 17A. Decreasing the distance between each of magnetic array 19A and magnetic array 19B and the rotor 17A results in greater braking force, while increasing the distance between each of magnetic array 19A and magnetic array 19B and the rotor 17A reduces the braking force. To fully disengage the brake, the distance between the magnetic arrays 19A and 19B, and the corresponding rotor 17A is increased until the magnetic flux felt by the rotor 17A is negligible and there are almost no eddy currents generated in the rotor 17A. The same operation described herein with respect to the brake sub-assembly 110A also applies to the brake sub-assembly 110B.

Accordingly, the actuator 25 is operably connected to the magnetic array 19A to selectively effect a brake mode and a non-brake mode, wherein in the brake mode the magnetic array 19A induces eddy currents in the electrically conductive body of the rotor 17A to apply a magnetic braking force when the rotor 17A rotates above a threshold speed and in the non-brake mode the induced eddy currents result in a negligible or no braking force, even when the rotor 17A rotates above the threshold speed. Below the threshold speed the induced eddy currents will not be sufficient to result in a non-negligible magnetic braking force. The threshold speed will depend on the dimensions and configuration of the components of the brake assembly and can be readily determined•magnetic arraymagnetic array In some embodiments of the present disclosure, to ensure adequate braking performance at low velocities where eddy current generation is minimal, a complementary friction brake may be integrated into the magnetic permanent magnet eddy current brake. The friction brake may supplement the performance of the non-contact magnetic brake at low velocities. In this embodiment of the present disclosure, friction braking may be performed using the same electric linear actuators used to engage and disengage eddy current braking. The friction brake may be implemented using aluminum friction rims, with one placed on either side of one or more rotors. For example, with reference to the brake sub-assembly 110A, the friction rim 16A is placed between the rotor assembly 20A and the stator assembly 21A. Similarly, the friction rim 16B is placed between the rotor assembly 20A and the stator assembly 21B. In the depicted embodiment, the rims 16A and 16B (collectively "16") are keyed into the wheel and rotate with the tire. In another embodiment (not shown), the friction rims may be attached to the rotor 17A or integral therewith. In yet another embodiment, the rotor may be coated with friction material at an outer circumference thereof. In the depicted embodiment, each rim 16 is padded with a layer of carbon friction material 15 on the side facing away from the corresponding rotor 17. As best seen in the side views 16C and 17C, the carbon friction material 15A and 15B of the friction rings 16A and 16B align with the stator friction rings 14A and 14B of stators 21A and 21B. In the engaged mode, the carbon friction material 15A of friction rim 16A engages the stator friction ring 14A of the stator 21A. Similarly, the carbon friction material 15B of the friction rim 16B engages the stator friction ring 14B of the stator 21B. This generates a contact pressure between the two frictional surfaces 14 and 15, thus creating a frictional force to slow the rotation of the wheel. In this embodiment of the present disclosure, the magnets 333 never come into contact with the rotors 17.

As can be appreciated, in some embodiments of the present disclosure, magnetic braking commences as the stators 17 move axially towards the rotors 21. Friction braking only takes effect when the stators 17 are in contact with the friction rims 16, at the point where magnetic braking is in the fully activated state. Accordingly, the slowing down of the rotors 21 by magnetic braking takes place before friction braking occurs. The application of magnetic braking and friction braking may overlap, but as rotational speed decreases the friction braking effect will become proportionally larger than the magnetic braking effect.

In an example embodiment of the present invention, there are 16 neodymium arc magnets 333 in each magnetic array 19 on each stator 21. The shape of the magnets 333A and 333B may influence the generation and distribution of eddy currents within the rotor 17 and may improve braking performance. In other embodiments of the present disclosure, the magnets 333 may be of a different or non-uniform thickness, or the magnetic array 19 may comprise magnets 333 of varying thicknesses.

In one embodiment, the linear electric actuators 25 may be of adequate positioning accuracy and precision, such that the braking force produced can be tightly controlled by operator input and/or a braking control system. The linear electric actuators 25 may allow for control even where the distances between the magnetic arrays 19 and the corresponding rotors 17 are small.

FIGS. 18A-18B illustrate an example of a configuration of an embodiment of the present disclosure in which there is a single rotor 17, two friction rims, and two stators. In FIG. 18A, the distance between rotor and stators is greatest, and is represented by gap 27A. In FIG. 18B, the distance is smallest and shown as gap 27B.

In some embodiments (not shown) of the present disclosure, the magnetic brake may be disengaged by inserting a ferromagnetic screen between each magnetic array and the corresponding rotor. The screens preferably are thin and flexible and made of a ferromagnetic material. The ferromagnetic screens may guide magnetic flux emanating from the magnetic arrays away from the rotors, and may assist in disengaging the magnetic brake.

As discussed earlier, the hybrid permanent magnet—electromagnetic array 500 shown in FIG. 5 may be used instead of the magnetic array of FIG. 4. In some embodiments (not shown) of the present disclosure, the hybrid permanent magnet—electromagnetic arrays 500 are moved by means of linear actuators while the individual electromagnets 444 are controlled by the flow of electrical current. In other embodiments of the present disclosure, the hybrid permanent magnet—electromagnetic arrays 500 are static with respect to the non-rotating base portion 12, and engaged or disengaged primarily by the flow of electrical current to the electromagnets 444

In other embodiments of the present disclosure, the electric linear actuators 25 may be arranged circumferentially around the non-rotating base portion 12 on the outside and placed at the end of the non-rotating base portion 12 as is done in conventional carbon disc friction brakes common in the art.

In some embodiments of the present disclosure (not shown), the magnetic array may be coated with a friction material and used as the primary friction surface against the rotor. In yet other embodiments, the complementary friction brake may be implemented using a separate single disc or drum friction brake or one or more conventional carbon disc brakes common in the art. In an example embodiment, the complementary friction brake may comprise conventional carbon disc brakes mounted in the nose landing gear of an aircraft.

The example embodiment for the complementary friction brake shown allows the same electric linear actuators to be used both for controlling primary eddy current braking functions and for supplementary friction braking at low speeds as well as for a parking brake function when the vehicle is fully stopped, or in other applications, for locking a rotating shaft in place. This embodiment of the present disclosure may ensure good frictional contact while maintaining a minimum distance between the magnets 333 and the rotors 17, thus preventing any potential damage or wear to the magnets 333.

Further embodiments of the magnetic permanent magnet eddy current brake described herein include using impact absorbing material to pad the magnets 333 and stators 21 to prevent shock-based demagnetization, using selective thermal insulation to protect the magnets 333 from heat, and increasing forced convection air flow through the use of active fans and other cooling systems integrated in the non-rotating base portion 12.

Figure 19A:
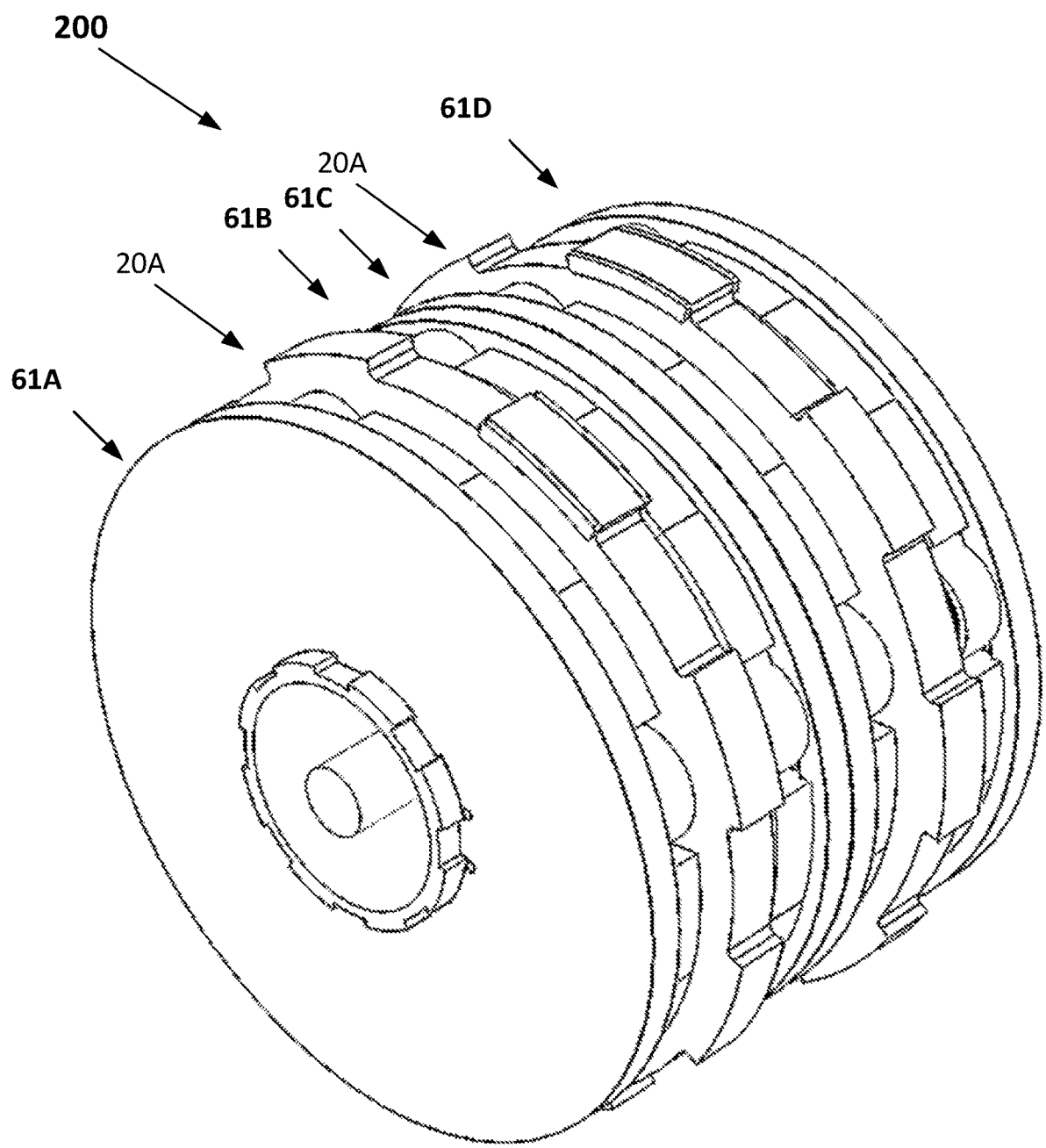
FIG. 19A is an isometric view of a hybrid permanent magnet—electromagnetic eddy current brake assembly featuring the circumferential Halbach array comprised of both permanent magnets and electromagnets of FIG. 5, in accordance with an embodiment of the present disclosure.
Figure 19B:
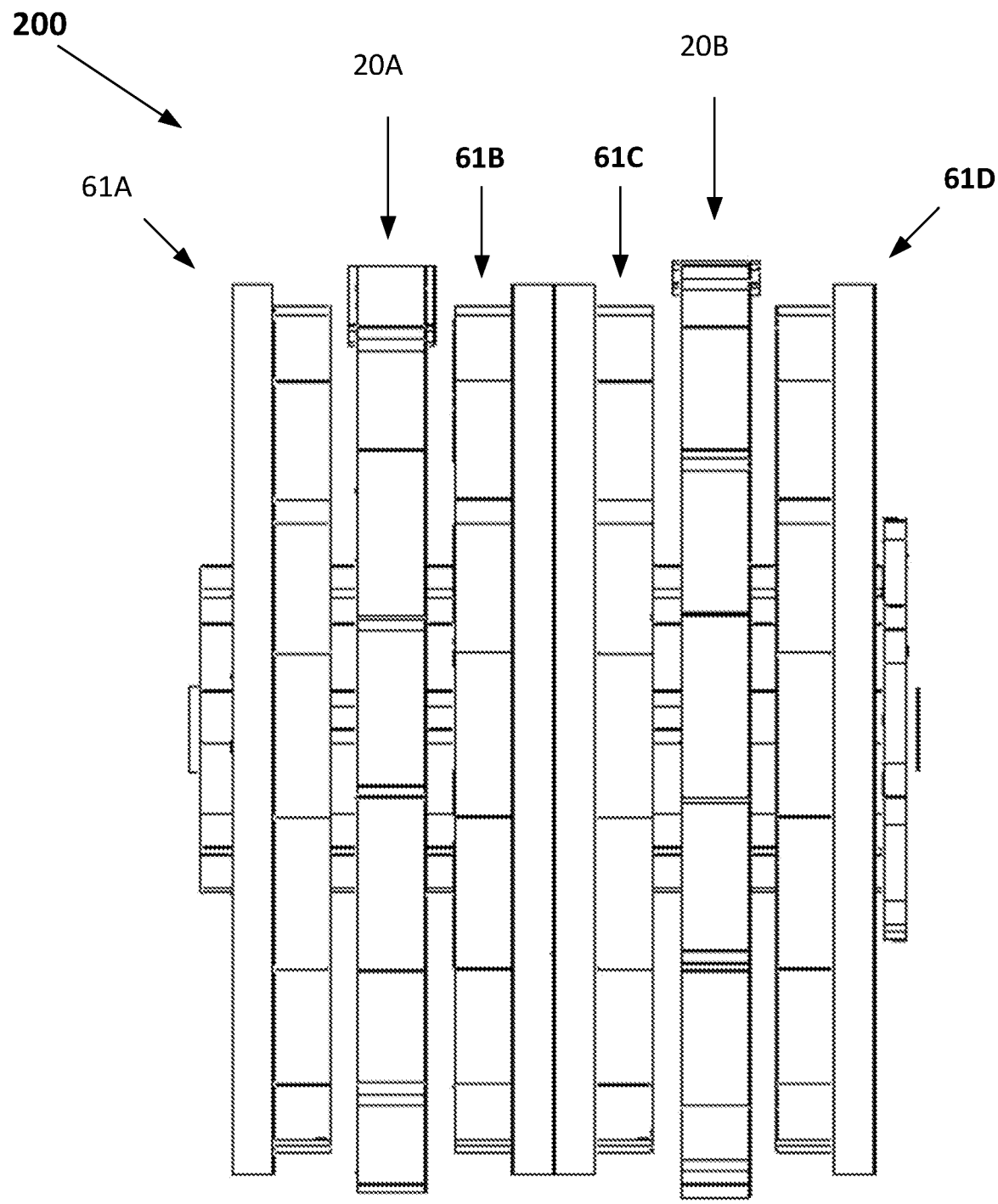
FIG. 19B is a side view of the hybrid permanent magnet—electromagnetic eddy current brake assembly of FIG. 19A.

FIGS. 19A and 19B depict an eddy current magnetic brake assembly in accordance with yet another embodiment of the present disclosure. A brake assembly 200 is comprised of a rotor assembly 20A and a rotor assembly 20B which both have the same structure as described above. On opposite sides of each rotor, two stators are positioned. For example, stators 61A and 61B are disposed on the opposite sides of the rotor assembly 20A. Similarly, the stators 61C and 61D are disposed on the opposite sides of the rotor assembly 20B. The structure of the stators 61A, 61B, 61C and 61D (collectively "61") is similar to that of the stators 21 discussed above with reference to FIG. 7, with the exception that they each use a magnetic array similar to the magnetic array 500 shown in FIG. 5 and are not axially movable relative to the rotors. When the electromagnets of the magnetic array are not enabled, the magnetic field produced by the magnetic array of a stator 61 is not directed towards the corresponding rotor 20. In this mode, the magnetic brake is in a disengaged state. Upon powering up the electromagnets (444 in FIG. 5), the Halbach pattern is complete and the magnetic flux produced by the magnetic array of a stator 61 is directed towards a corresponding rotor assembly 20 which induces eddy currents therein. The eddy currents produce a braking effect on the rotor assembly 20 when the rotor is rotating with a sufficiently high speed.

Figure 20:
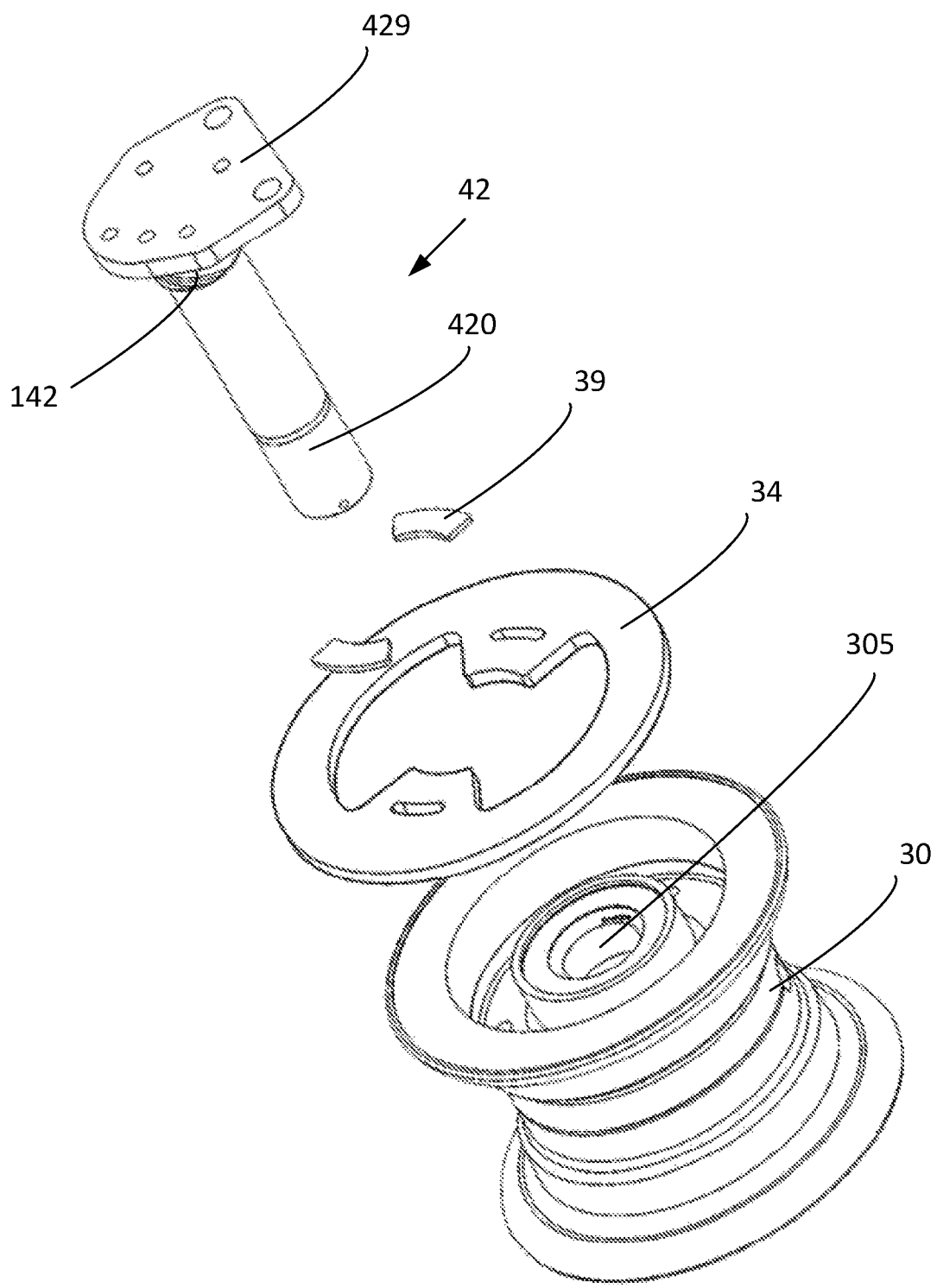
FIG. 20 is an exploded isometric view of a rotor attached to an aircraft wheel rim with the axle passing through the wheel, in accordance with an embodiment of the present disclosure.
Figure 21:
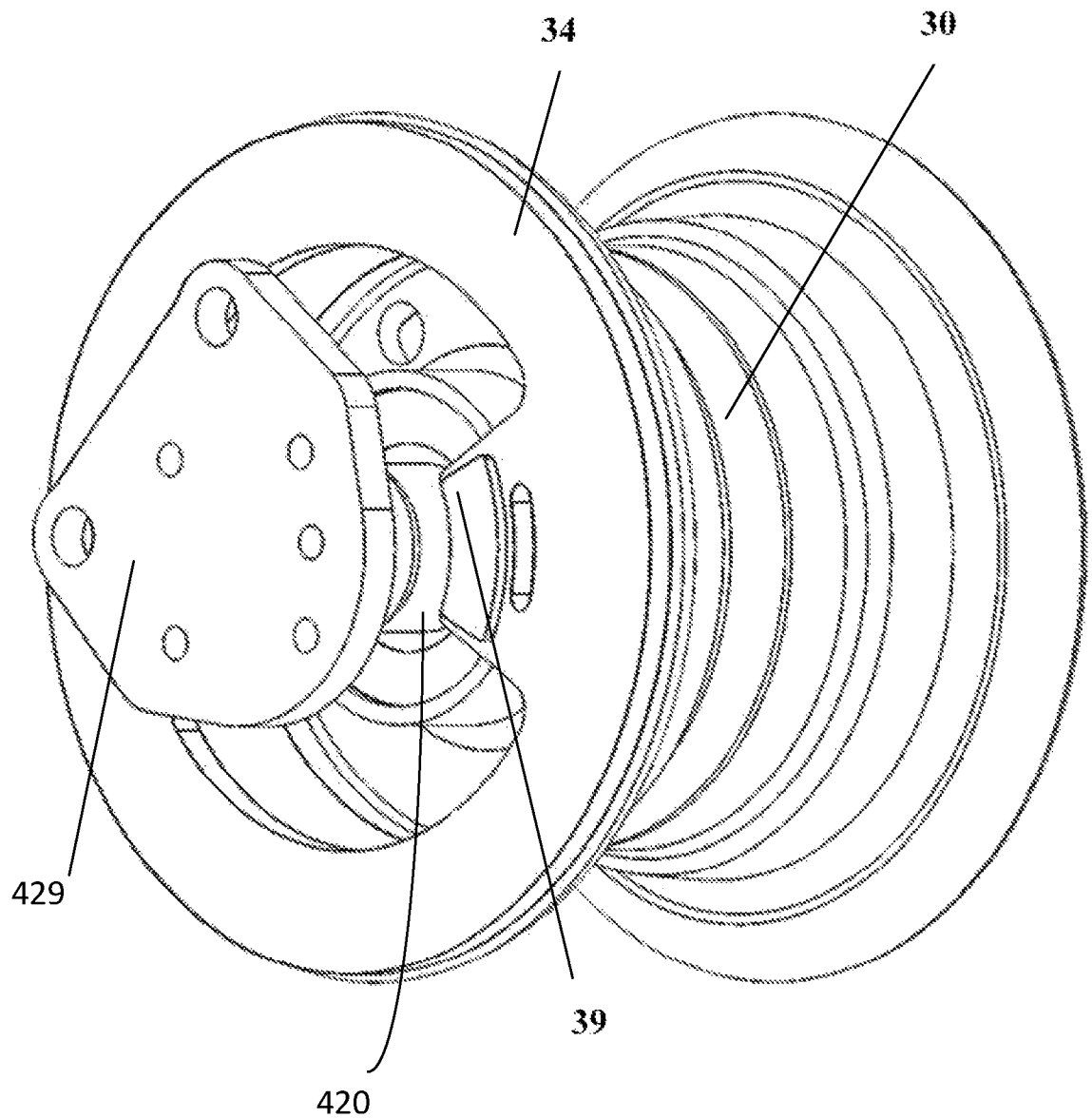
FIG. 21 is a side perspective view of the embodiment of FIG. 20.
Figure 22:
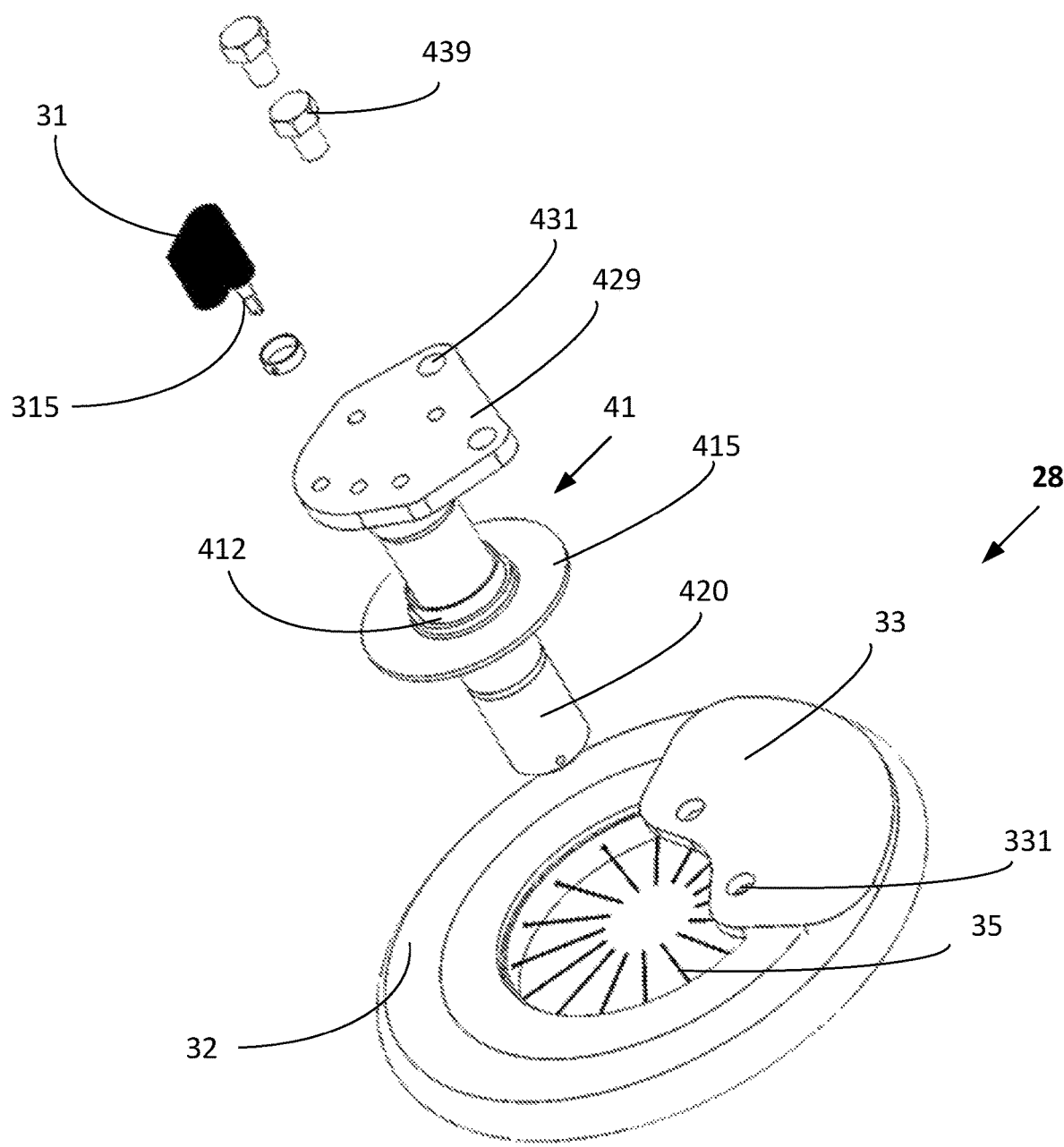
FIG. 22 is an exploded isometric view of a radially actuated permanent magnet eddy current brake assembly, shown separate from the rotor and aircraft wheel rim of FIG. 20, in accordance with an embodiment of the present disclosure.
Figure 23:
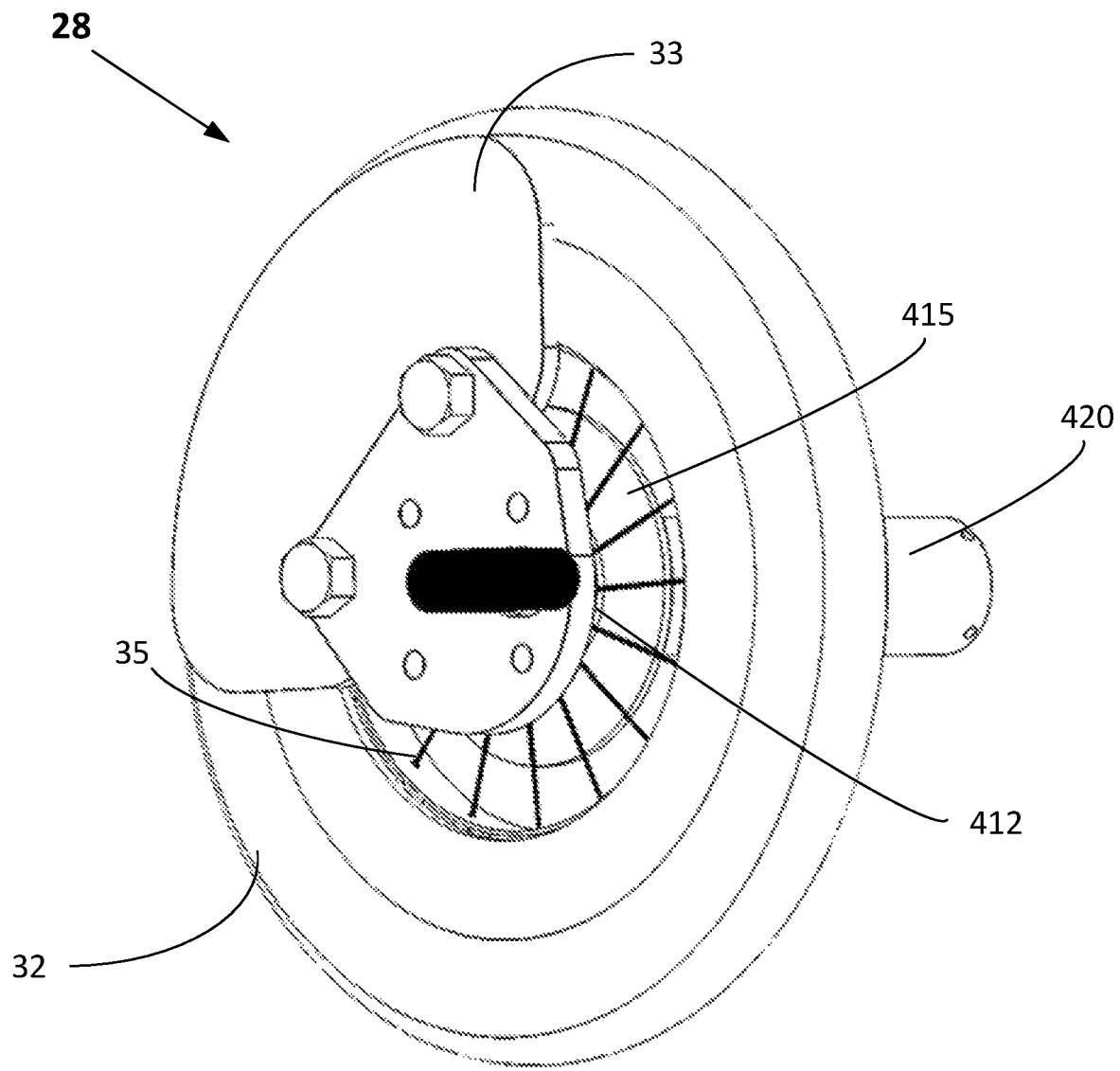
FIG. 23 is a front perspective view of the radially actuated permanent magnet eddy current brake assembly of FIG. 22 in the fully disengaged position, in accordance with an embodiment of the present disclosure.
Figure 24:
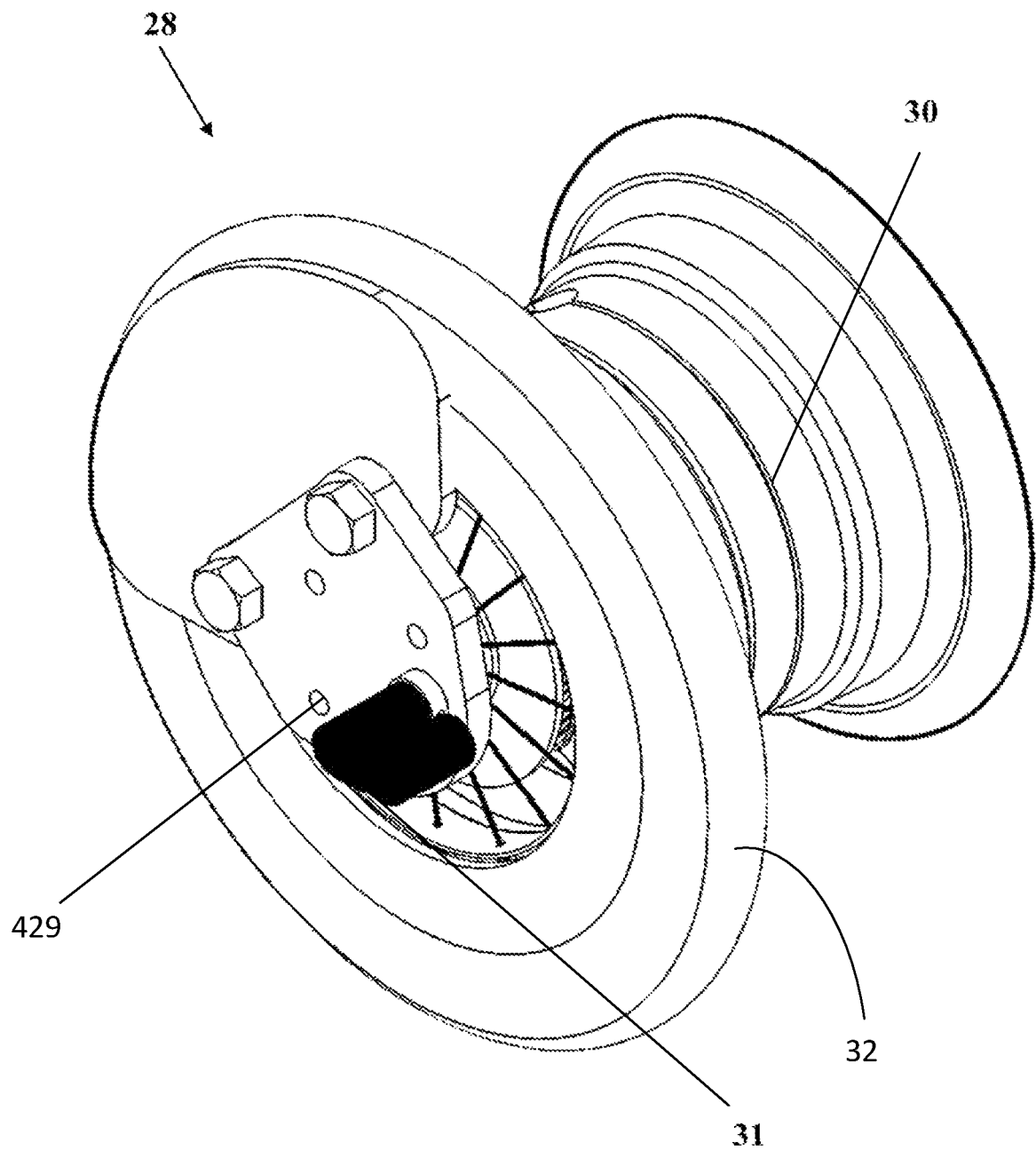
FIG. 24 is an isometric view of the radially actuated permanent magnet eddy current brake assembly of FIG. 22 shown operably connected to an aircraft wheel and in the fully disengaged position, in accordance with an embodiment of the present disclosure.
Figure 25:
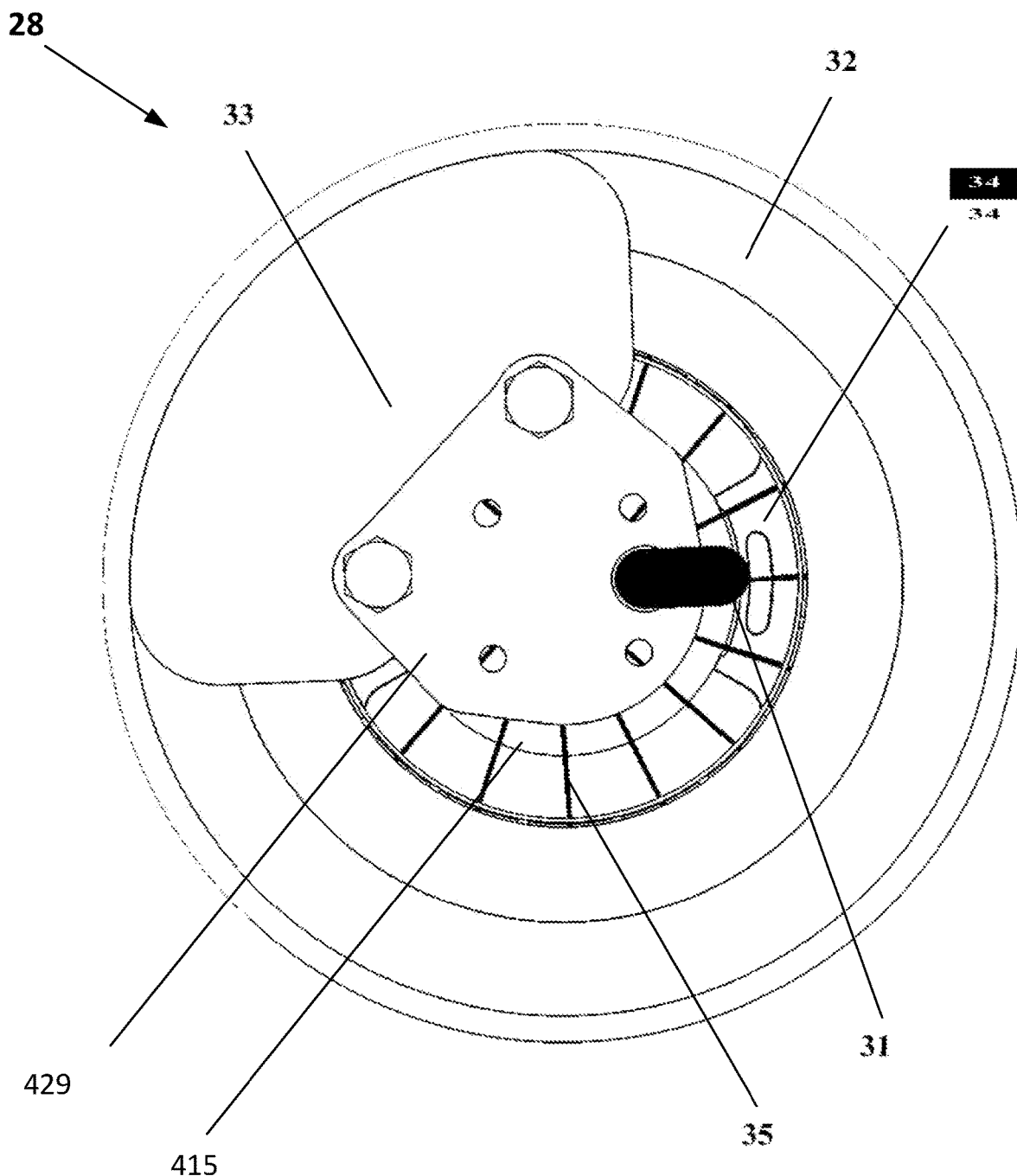
FIG. 25 is a front view of the radially actuated permanent magnet eddy current brake of FIG. 24 in the fully disengaged position, in accordance with an embodiment of the present disclosure.

FIGS. 20-21 show a wheel rim and an associated rotor assembly. The wheel rim 30 has a central cylindrical bore 305. A rotor 34 is attached to the inside of the wheel rim 30. The rotor 34 is permanently attached to the rim 30 and therefore rotates at the same angular velocity as the wheel. A number of brake pads 39 are attached on the rotor face that faces away from the wheel rim 30. A non-rotating base portion 42 is comprised of a cylindrical portion 420 having an external helical spline 142 formed on a portion thereof. The spline 142 is suitable for meshing with a groove of a sleeve which fits on the non-rotating base portion. Additionally, the spline 142 resists torque applied to the sleeve 41 during braking. At one end of the cylindrical portion, the non-rotating base portion has an end plate 429. When assembled together, the cylindrical portion 420 of the base portion 42 is inserted into the bore 305 of the rim 30. The wheel rim 30 is not part of the brake assembly, but is shown for clarity.

Figure 34:
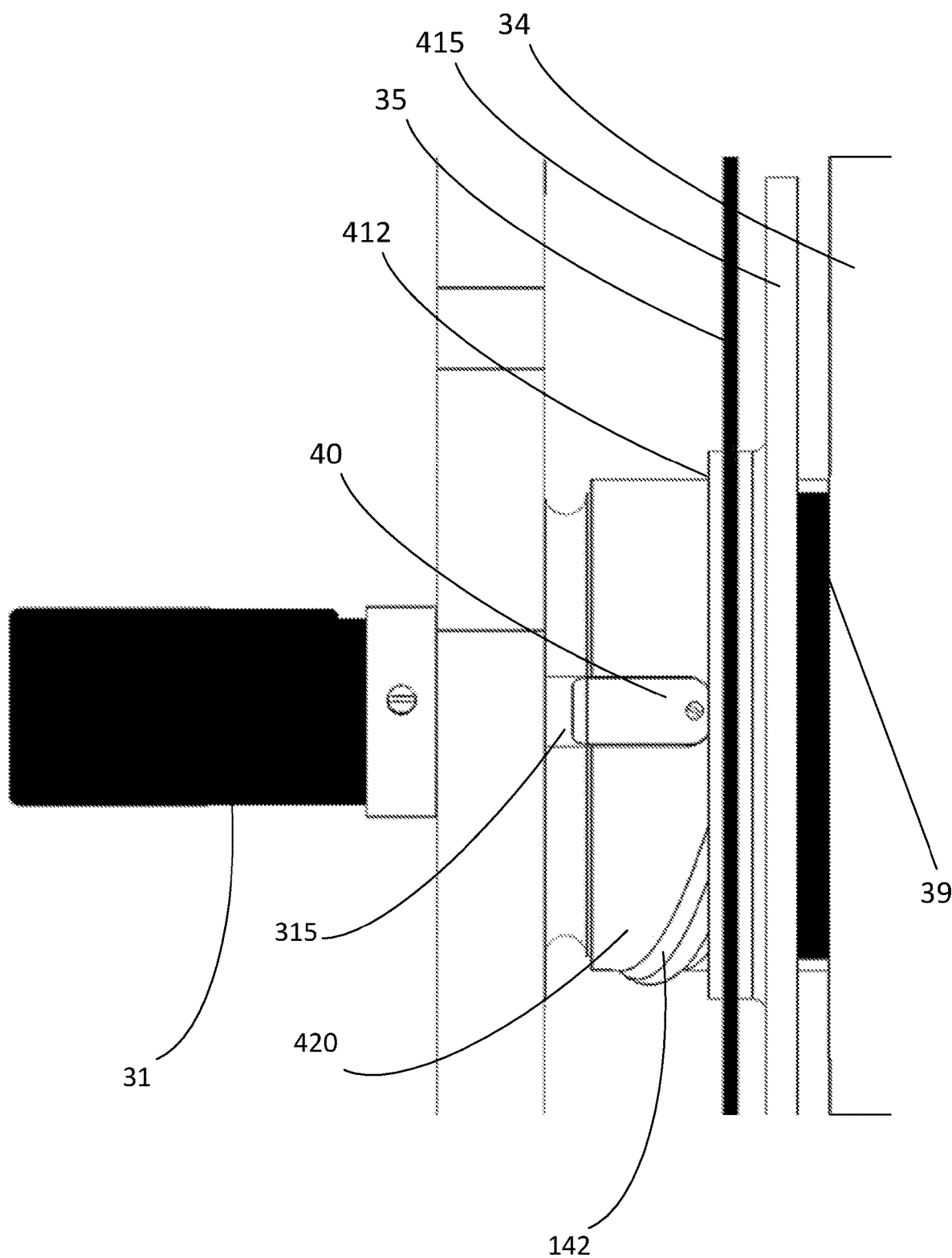
FIG. 34 is a close-up side view of part of the actuation mechanism to the radially actuated permanent magnet eddy current brake of FIG. 24 in the fully engaged position, in accordance with an embodiment of the present disclosure.

FIGS. 22-34 depict a radially actuated magnetic brake assembly 28 in accordance with embodiments of the present disclosure. A sleeve 41 is comprised of a tubular portion 412 and a disc portion 415. The sleeve 41 includes an internal helical groove formed on the inner walls of a central bore thereof. The helical groove of the sleeve 41 is sized and shaped to mesh with the external helical spline 142 of the non-rotating base portion 42. The sleeve 41 is mounted on the non-rotating portion 42 such that the spline 142 is meshed with the internal groove of the sleeve 41. The brake assembly includes as housing 32 and a connector plate 33 connected thereto. The housing 32 is annular in shape and is sized to fit on the wheel rim 30 thus covering the rotor 34. The brake housing 32 has a radius greater than that of the rotor 34. The connector plate has fastener holes 331 formed thereon. The end plate 429 of the non-rotating base portion 42 also features fastener holes 431. A plurality of fasteners 439 pass through the holes 431 and engage the holes 331 to connect the non-rotating portion 42 to the plate 33, thus connecting the non-rotating portion 42 to the brake housing 32. A linear electric actuator 31 is connected to the end plate 429 and has a connecting member 315 passing through one of the holes 431. As best seen in FIG. 34, the connecting member 315 is connected to an actuator rod 40 which in turn abuts, but is not connected to, the tubular member 412 of sleeve 41. This positioning of the actuator rod 40 and the sleeve 41 allows for relative rotation between the actuator 31 and sleeve 41 as will be described below. Accordingly, the actuator 31 is configured to axially move the sleeve 41 along the non-rotating base portion 42.

A plurality of magnets 36 are radially positioned in the housing 32. The magnets are arranged in a circular Halbach array as described earlier. A plurality of radially oriented cables 35 each connects a corresponding one of the plurality of magnets 36 with the tubular member 412 of sleeve 41. A plurality of tension springs 37 are each connected to a corresponding magnet 36 to bias the magnet into an outer position best seen in FIG. 26. In one embodiment, the one end of a spring 37 is fixedly connected to the inside of the housing 32 and the other end is connected to a corresponding magnet 36.

In a disengaged position of the magnetic brake assembly, the plurality of magnets 36 are positioned in the outer position being flexibly biased into that position by the plurality of corresponding tension springs 37. In this embodiment of the present disclosure, the magnets 36 are positioned such that there is adequate clearance between them and the rotor 34, so that the magnets 36 may move freely in front of the rotor 34 with no interference or contact. The magnets 36 are contained in the non-ferromagnetic housing 32. Within the housing 32 are a plurality of guiding tracks 38, which serve to properly align the magnets 36 during brake actuation. In this embodiment of the present disclosure, the housing 32 is rigidly connected with the axle end plate 429, which is in turn bolted to the landing gear structure.

Figure 26:
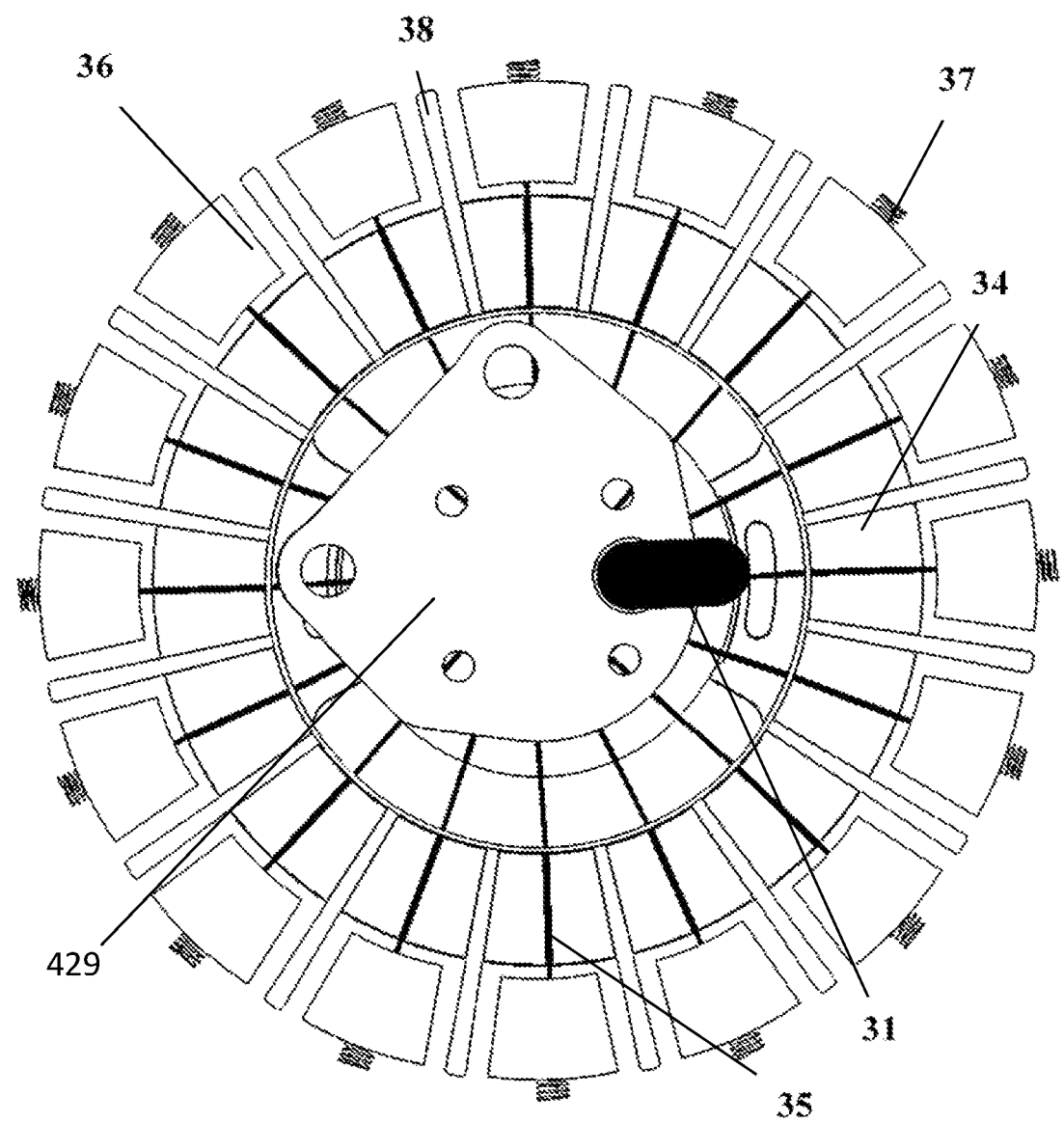
FIG. 26 is a front view of the radially actuated permanent magnet eddy current brake of FIG. 24 in the fully disengaged position and with the external brake housing removed.
Figure 27:
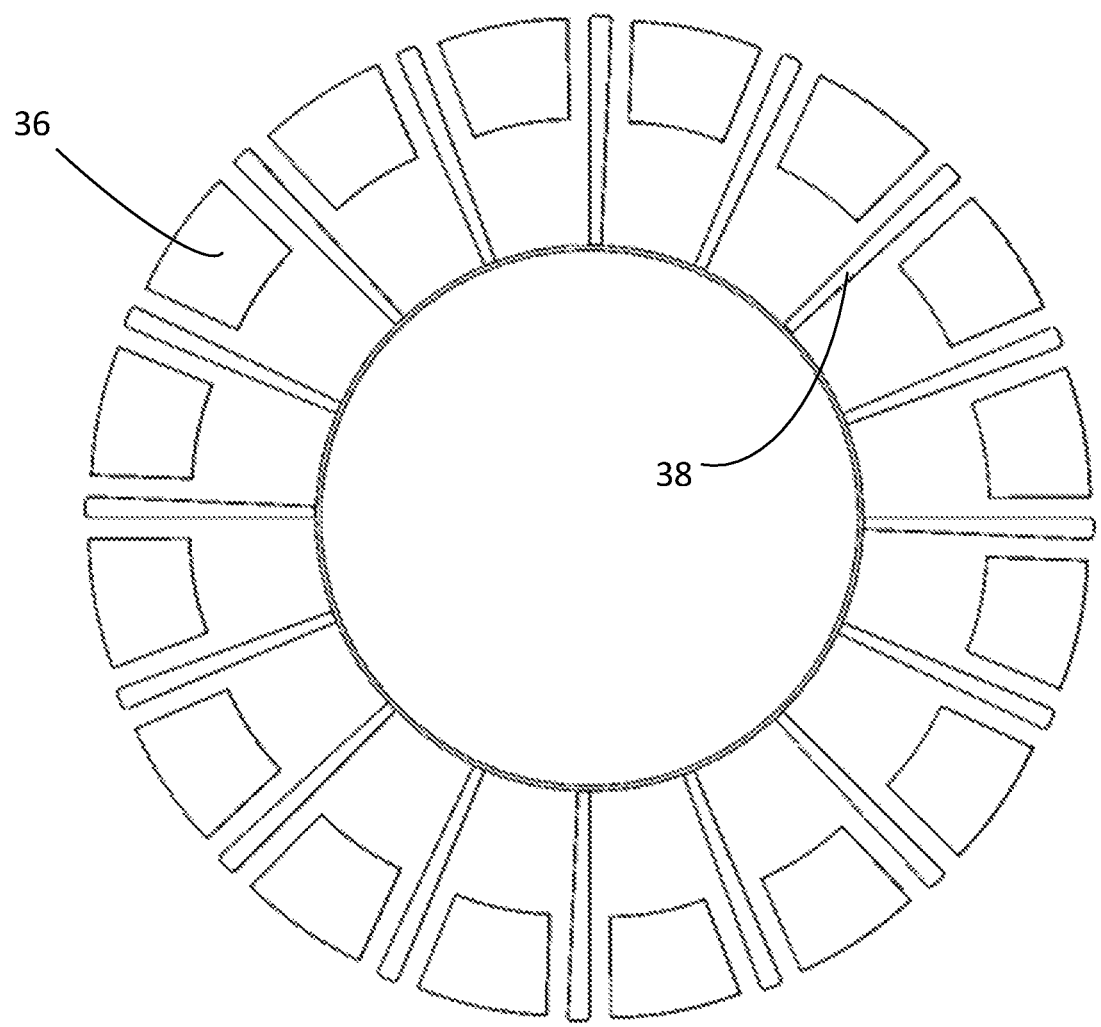
FIG. 27 is a front view of the configuration of magnets used in the radially actuated permanent magnet eddy current brake of FIG. 24 in the fully disengaged position and with the external braking housing and other components removed.
Figure 28:
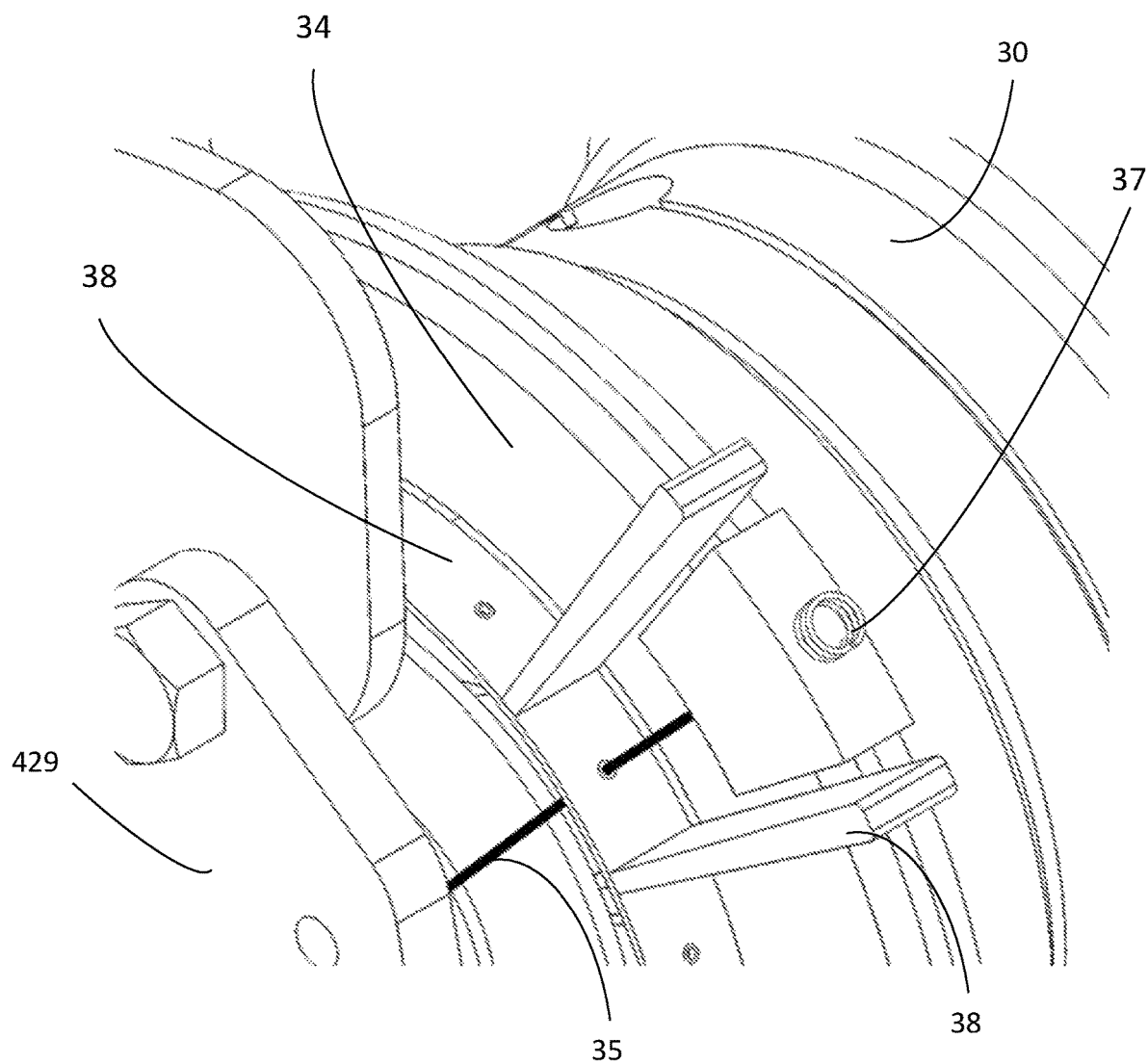
FIG. 28 is a close-up isometric view of a spring-magnet assembly attached to an actuation cable in the fully disengaged position, the assembly being part of the radially actuated permanent eddy current brake of FIG. 24, in accordance with an embodiment of the present disclosure.
Figure 29:
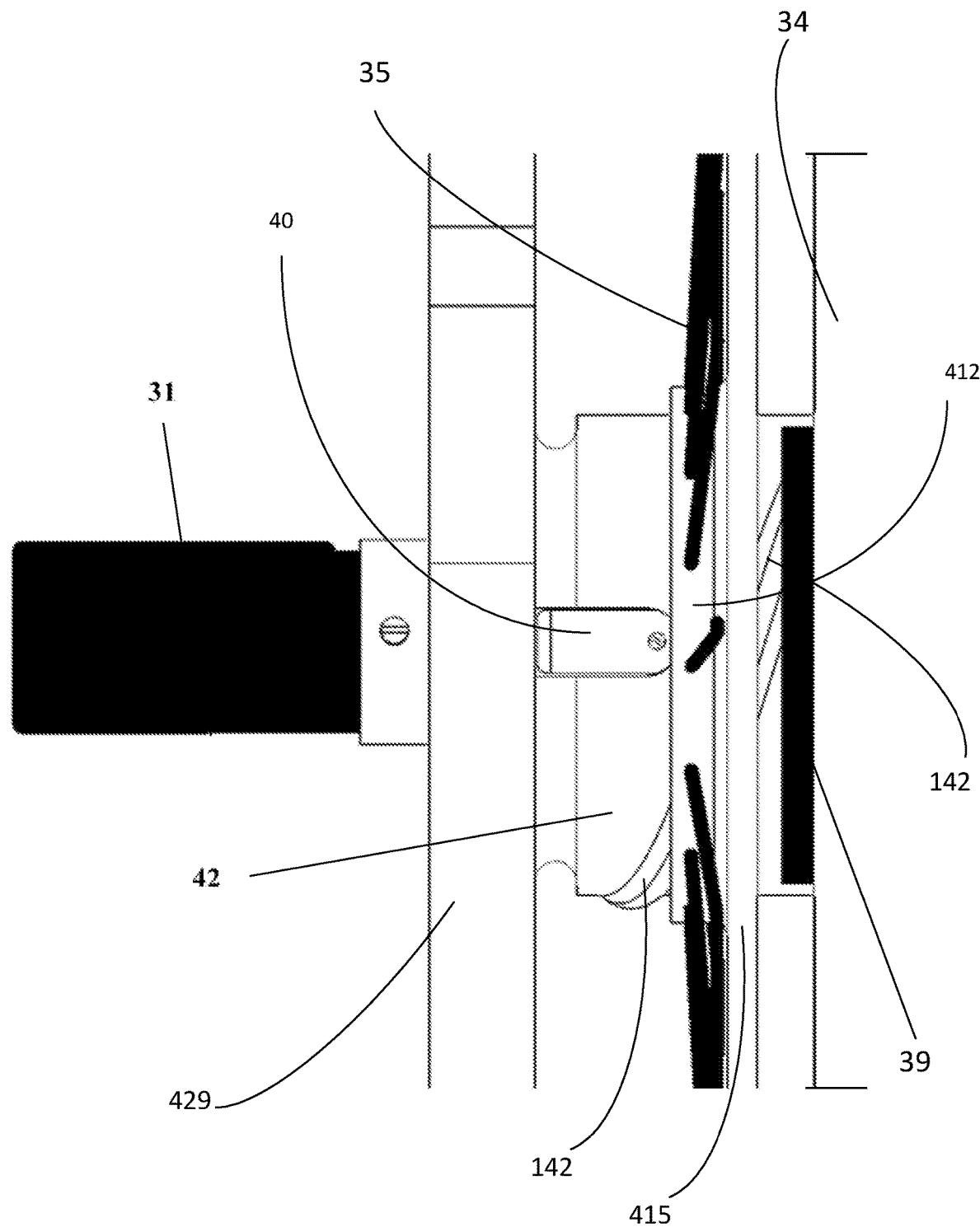
FIG. 29 is a close-up side view of part of the actuation mechanism to the radially actuated permanent magnet eddy current brake of FIG. 24 in the fully disengaged position, in accordance with an embodiment of the present disclosure.
Figure 30:
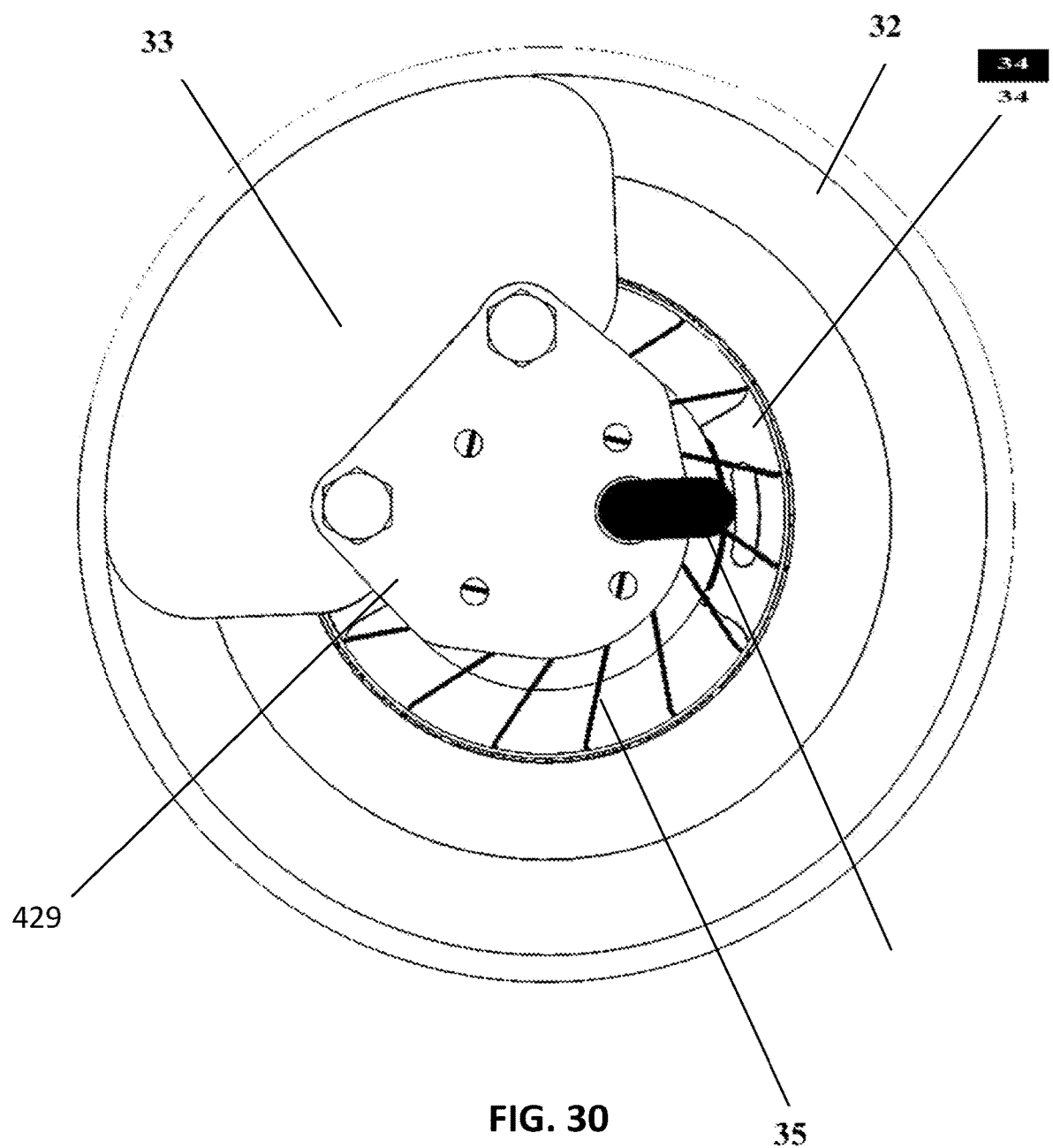
FIG. 30 is a front view of the radially actuated permanent magnet eddy current brake of FIG. 24 in the fully engaged position, in accordance with an embodiment of the present disclosure.

As best seen in FIG. 26, the magnets 36 form a circumferential Halbach magnetic array that is larger in radius than the rotor 34. Accordingly, although the magnetic flux produced by the magnetic array is directed towards the rotor 34, the magnetic flux has a larger circumference and does not substantially overlap with the rotor 34. Accordingly, little to no eddy currents are induced in the rotor 34. Accordingly, little to no magnetic braking takes place with respect to the rotor 34. Furthermore, as best seen in FIG. 29, the sleeve 41 is positioned with respect to the non-rotating portion such that the disc portion 415 thereof does not engage the brake pads 39 of the rotor 34. Accordingly, no friction braking takes place in the disengaged mode.

Figure 31:
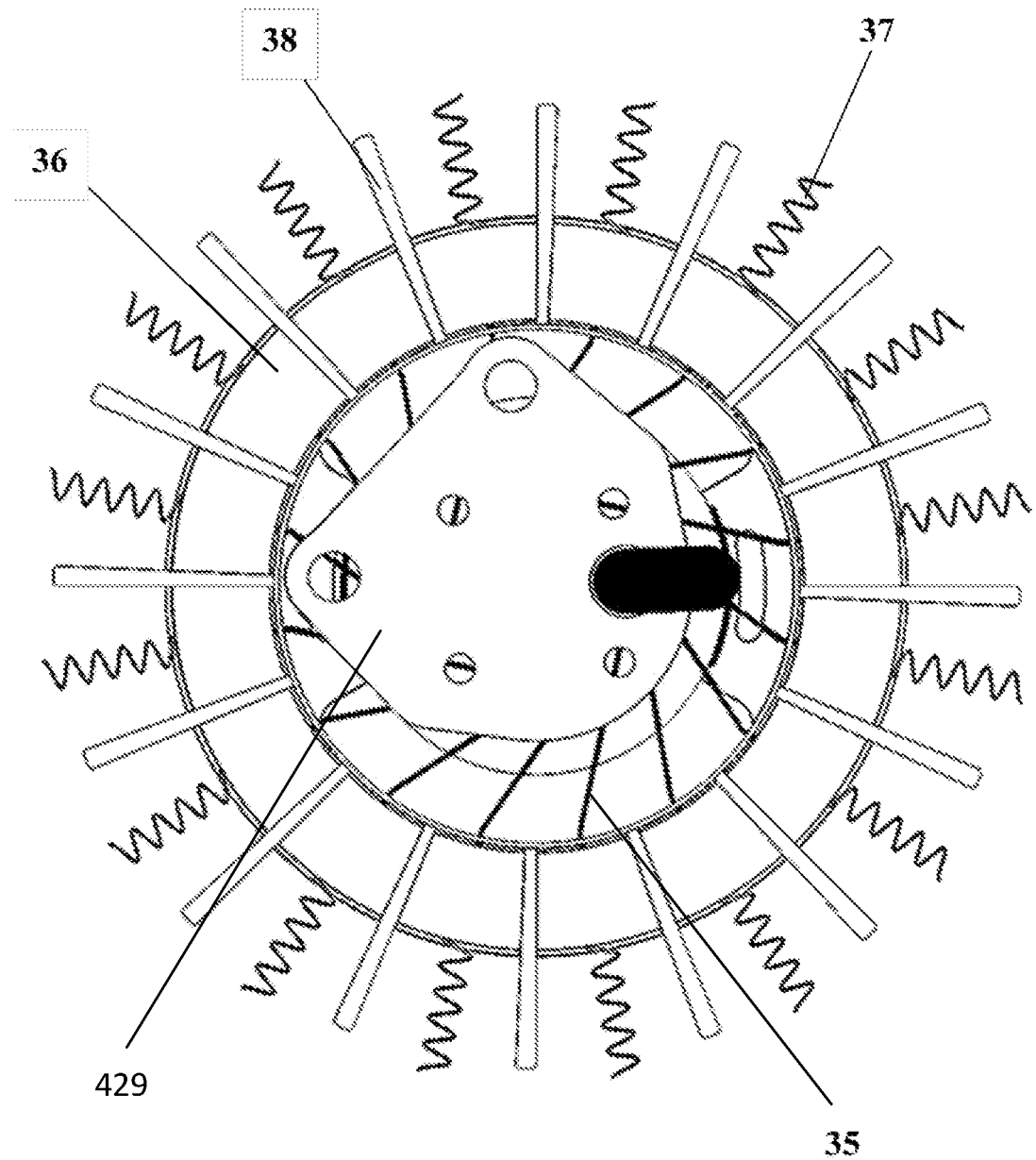
FIG. 31 is a front view of the radially actuated permanent magnet eddy current brake of FIG. 24 in the fully engaged position and with the external brake housing removed.
Figure 32:
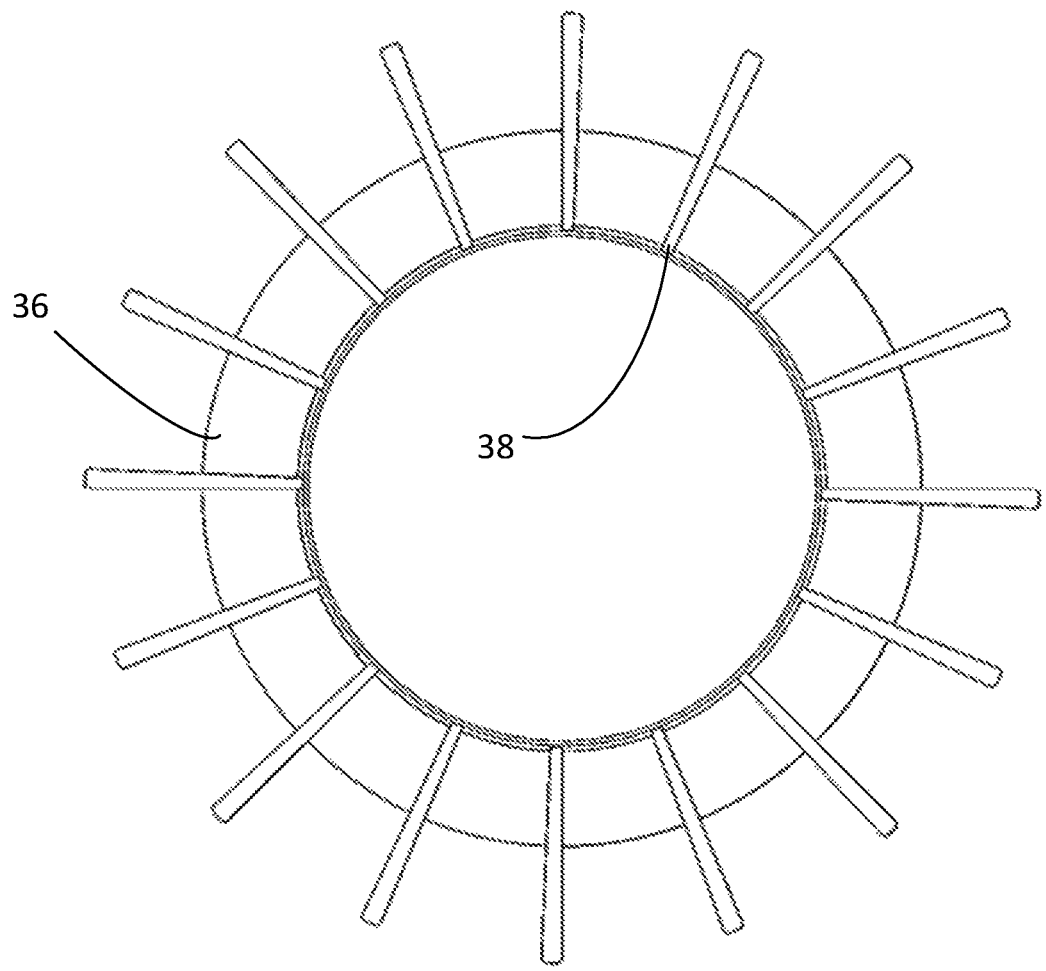
FIG. 32 is a front view of the configuration of magnets used in the radially actuated permanent magnet eddy current brake of FIG. 24 in the fully engaged position and with the external braking housing and other components removed.
Figure 33:
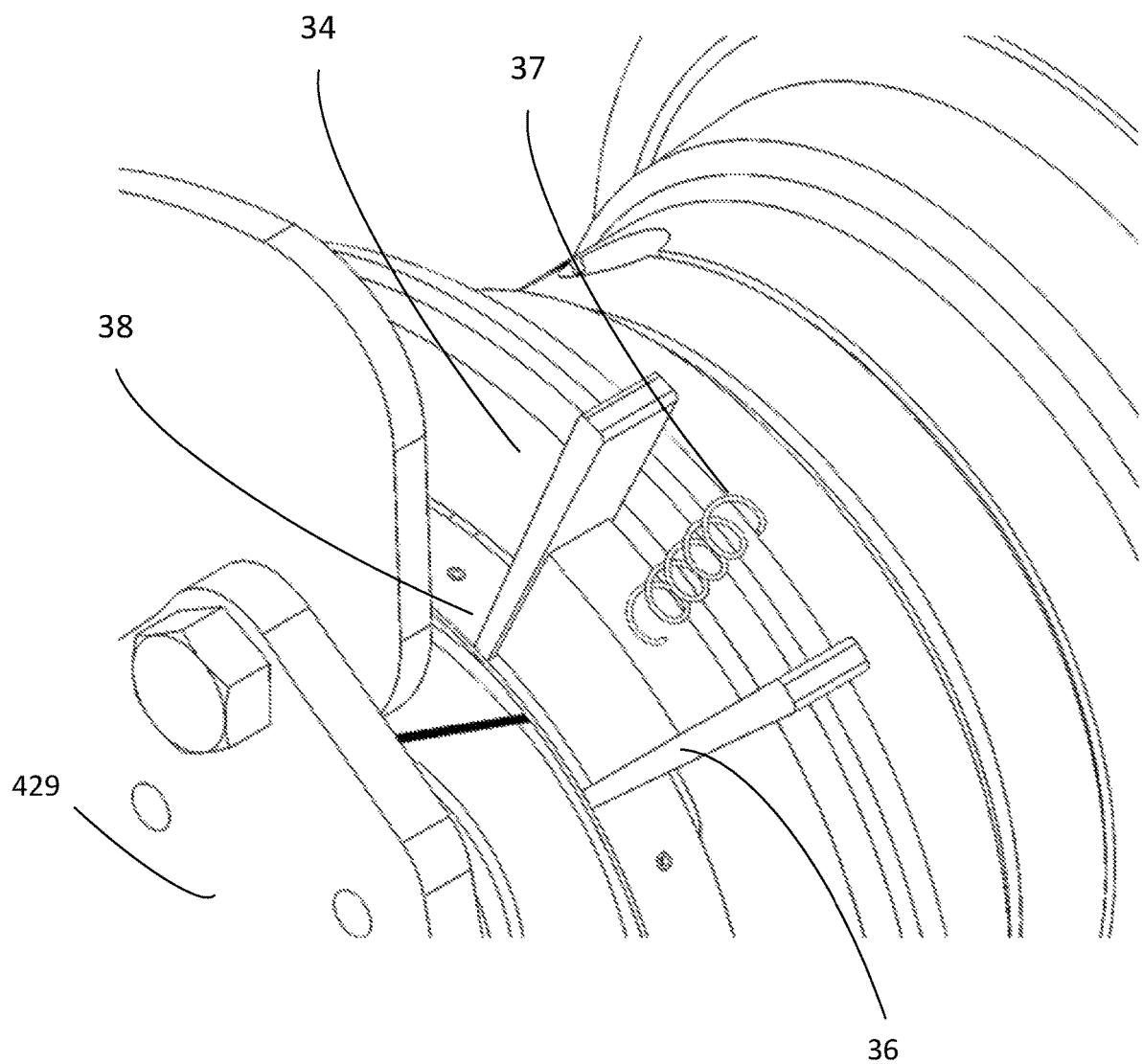
FIG. 33 is a close-up isometric view of a spring-magnet assembly attached to an actuation cable in the fully engaged position, the assembly being part of the radially actuated permanent eddy current brake of FIG. 24, in accordance with an embodiment of the present disclosure.

To engage the brake, the electric linear actuator 31 is activated. The actuator 31 moves its connecting member 315 and the actuator rod 40 axially towards the sleeve 41. The actuator rod 40 transfers the axial movement of the connecting member 315 to the sleeve 41. Accordingly, the sleeve 41 is moved axially towards the rotor 34. Due to the meshing between the helical groove of the sleeve 41 and the helical spline 142 of the non-rotating base portion 42, the sleeve 41 rotates as it is being moved axially by action of the linear actuator. The rotation of the sleeve 41 and more particularly the tubular portion 412 of the sleeve 41, causes the cables 35 to wrap around the tubular portion 412. As the cables 35 wrap around the tubular portion 412 their effective length is shortened. As a result, the magnets 36 are pulled by the cables 35 and moved radially inwards to an inner radial position thereof, guided by the tracks 38. As the radial position of the magnets 36 is decreased they start overlapping radially with the rotor 34, inducing some eddy currents therein and accordingly some braking torque is produced. Eventually, the magnets 36 are guided by the tracks 38 to their inner radial position. At that point, the brake is in the fully engaged position. As best seen in FIG. 31, in their inner radial positon the magnets 36 are aligned and fully overlap with the face of the rotor 34. Accordingly, the magnetic flux produced by the magnets 36 induces significant eddy currents in the rotor 34 when the rotor is rotating with a sufficient rotational speed. The induced eddy currents in the rotor 34 produces a braking effect as explained above. As best seen in FIG. 34, in the engaged mode, the disc portion 415 of the sleeve 41 frictionally engages the brake pad 39 thus producing a friction braking effect in addition to the magnetic braking.

To disengage the brake, the magnetic linear actuator 31 retracts the connecting member 315 towards the end plate 429. When the actuator 31 retracts its connecting member 315, the actuator rod 40 is moved axially away from the sleeve 41. Accordingly, the sleeve 41 is no longer biased axially towards the rotor by the actuator rod 40. The tension springs 37 pull the magnets radially outwardly towards the outer radial position, the cables 35 are tensioned under the action of the tension springs 37. The tension in the cables 35 causes the cables 35 to apply a tangential force on the tubular portion 412 causing the sleeve 41 to rotate in an opposite direction than the one it did when it was moved axially towards the rotor 34. Because of the meshing between the helical groove of the sleeve 41 and the helical spline 142 of the non-rotating portion 42, as the sleeve 41 rotates it slides along the non-rotating base portion in a direction away from the rotor 34. As best seen in FIG. 26, the magnets 36 are biased to their outer radial position by action of the tension springs 37.

In one embodiment, the connector plate 33 is welded to the brake housing 32 and bolted to the axle end plate 429. In other embodiments of the present disclosure, the connector plate 33 may be an integral part of the brake housing 32, and may be machined from the same stock or forged as one part. In yet other embodiments of the present disclosure, the non-rotating base portion end plate 429 may be made larger and bolted directly to a flat portion of the brake housing 32, with no intermediate connector plate.

In the depicted embodiment the rotor 34 is directly attached to the wheel rim 30 with no clearance therebetween. In other embodiments of the present disclosure, the rotor 34 may be attached to the wheel rim 30 at a discrete number of points around the circumference of the wheel. In the aforementioned embodiments, the rotor 34 may be elevated from the surface of the wheel rim 30, such that contact between the components is reduced and therefore the amount of heat conducted from the rotor 34 to the wheel and tire during braking is decreased. In some embodiments of the present disclosure, a layer of insulative material may be placed between the rotor 34 and the wheel rim 30 to further reduce heat conduction. The rotor 34 may be made partly or entirely from copper, aluminum, beryllium, or alloys or composites thereof, or any other high electric conductivity, high heat capacity material. The rotors 34 preferably are thick enough to collectively absorb the entirety of the aircraft's kinetic energy without increasing their temperature to a high enough point that the electric conductivity or mechanical strength of their constitutive material is excessively reduced. For most aircraft types to which this type of braking system is well suited, there is one brake unit per wheel.

In some embodiments (not shown), an iron backplate may be placed behind the rotor 34 on the opposite side to that facing the magnets 36. The backplate may help guide the magnetic field lines from the magnets 36 into the rotor 34, thus improving braking performance. In some embodiments of the present disclosure, the backplate may be a solid disc while in other embodiments, it may be perforated at regular intervals around the circumference for material and weight savings. In an example embodiment of the present disclosure, the backplate may be attached to the wheel rim 30 and the rotor 34 may in turn be attached to the backplate, forming a rotor-backplate assembly.

Figure 35:
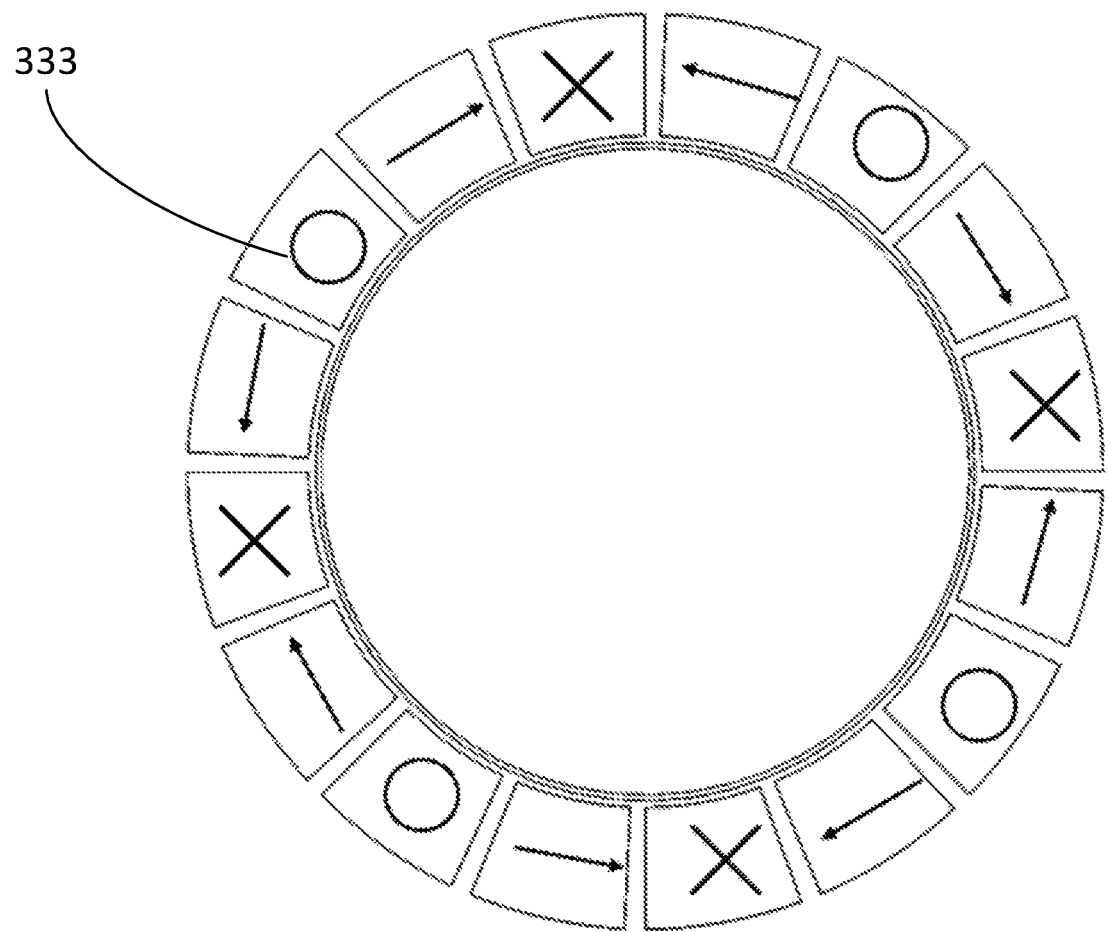
FIG. 35 is a front view of an arrangement of arc magnets in a circumferential Halbach array such that the magnetic flux of the magnetic array is substantially one-sided towards a corresponding rotor, with the external housing and other components removed and the magnetic field orientation of each individual magnet labelled, in accordance with an embodiment of the present disclosure.

In one embodiment of the present disclosure, there are sixteen arc magnets 36 arranged around the perimeter of and in front of the rotor 34. In some embodiments of the present disclosure, the magnets 36 comprise high-strength neodymium iron boron (NdFeB) permanent arc magnets. The magnets 36 may be arranged in special patterns such as a circumferential Halbach array with magnet orientations as shown in FIG. 35. The Halbach pattern of the magnetic array is such that it concentrates the magnetic flux produced by the magnets 36 towards the rotor 34. In some embodiments of the present disclosure, the magnets 36 or the housing 32 may be coated with a layer of insulative material to protect the magnets 36 from scratching, heat, and impact loads. In some embodiments of the present disclosure, the magnets 36 may be tightly fit into the guiding track 38 such that there is minimal vibration or movement of each magnet 36 under the influence of the other magnets' magnetic fields.

In other embodiments of the present disclosure, the NdFeB permanent magnets may be cubes, rectangular prisms, cylinders, discs, or they may be arcs with curved side walls. In some embodiments of the present disclosure, the magnets may be of a different thickness relative to each other, or the magnetic array may comprise magnets of varying or non-uniform thicknesses.

The braking torque produced by the brake is controlled by varying the radial position of the magnets 36 with respect to the center of the rotor 34. Decreasing the radial position of the magnets 36 relative to the rotor 34 results in greater braking torque, while increasing the radial position of the magnets 36 relative to the rotor 34 results in lower braking torque. To fully disengage the brake, the radial position of the magnets 36 is increased until they are located at a radial distance greater than the outer radius of the rotor 34 such that the magnetic flux passing through the rotor 34 is minimal, thus producing little or no eddy currents.

In other embodiments of the present disclosure, the magnets 36 may be actuated by separate actuators connected to each magnet.

In some embodiments (not shown) of the present disclosure, there may be two sets of magnets 36 arranged on either side of the rotor 34. The second set of magnets may be aligned with the first set of magnets 36 such that the polarities of the magnets in the second set are a mirror reflection of those in the first set. Alternatively, the second set of magnets may be offset relative to the first set of magnets 36 such that the polarities of the magnets in the first set are reflected across the plane of the rotor 34 and then rotated clockwise or counterclockwise by a certain angle to define the polarities of the magnets in the second set. Offsetting the polarities of the magnets in the second set relative to the first set of magnets 36 may result in a change in the amount of magnetic flux passing through the rotor 34 for a given configuration. In this embodiment of the present disclosure, the brake housing 32 is modified to accommodate the second set of magnets 36 and is extended to reach the other side of the rotor 34. The actuation mechanism comprising sleeve 41, cables 35, and springs 37 is also modified such that there exists a parallel cables-springs configuration to actuate the second set of magnets 36. The sleeve 41 is connected to both sets of actuation mechanisms. This embodiment of the present disclosure may provide increased braking torque by increasing the number of magnets 36 used to activate eddy current braking.

Figure 36:
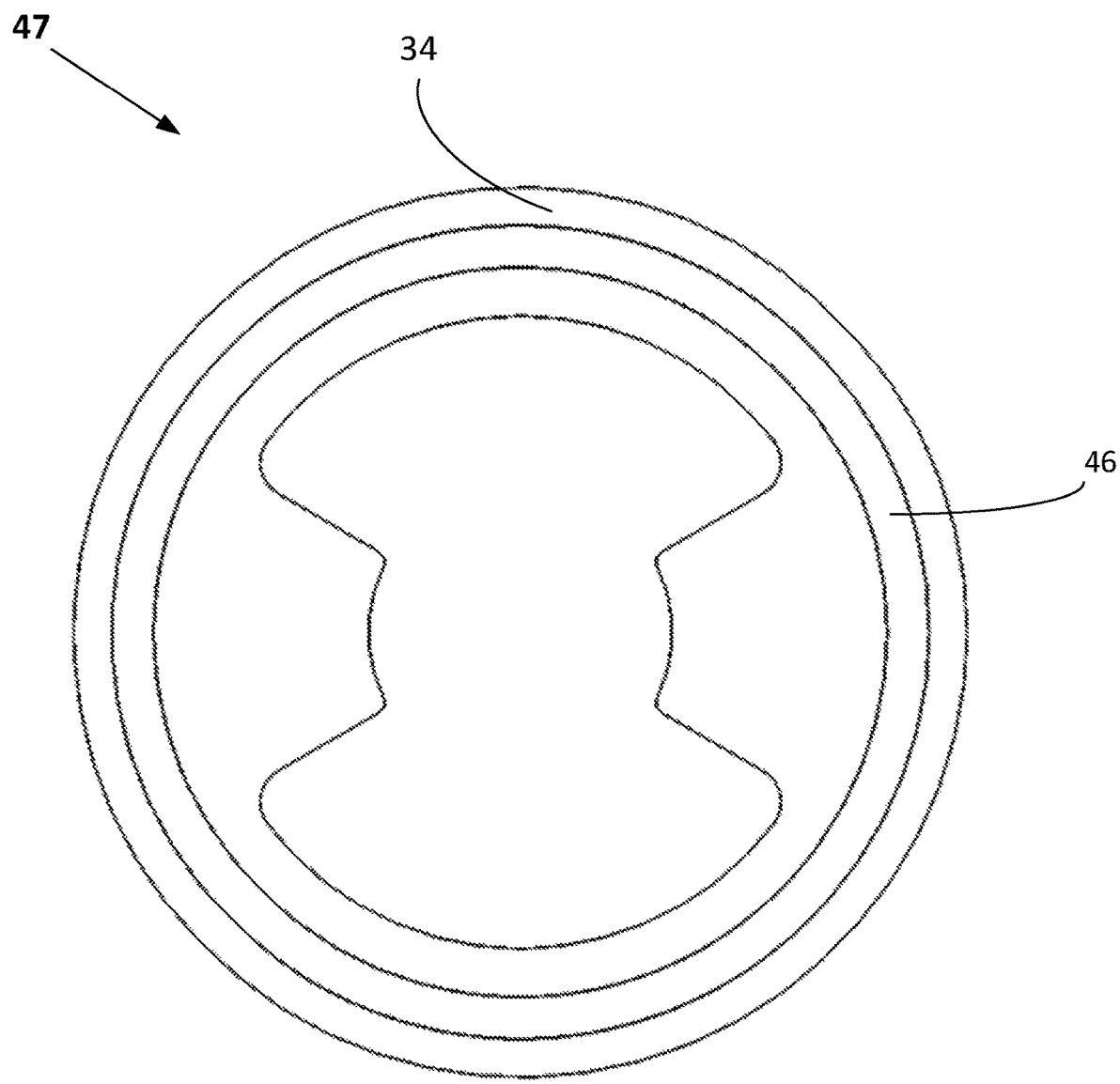
FIG. 36 is a rear view of a rotor assembly comprising a rotor with an embedded ferromagnetic core, in accordance with an embodiment of the present disclosure.

In other embodiments of the present disclosure, the backplate may be an integral part of the rotor 34, implemented as an iron core with a copper disc 46 around the core to form a rotor assembly 47, as shown in FIG. 36. The ferromagnetic core 46 may increase the magnetic flux through the surface of the rotor 34 by altering the magnetic circuit from the magnets 36 across the air gap and through the rotor assembly 47. The ferromagnetic core 46 may comprise a disc or ring, or it may comprise discrete parts of a regular or irregular geometry interspersed around the circumference of the rotor 34, for example bars or spheres. The ferromagnetic core 46 may be made from iron, or it may be made from another ferromagnetic material or alloy. The size and shape of the ferromagnetic core may be altered in order to control the amount and distribution of magnetic flux through the rotor

Figure 37:
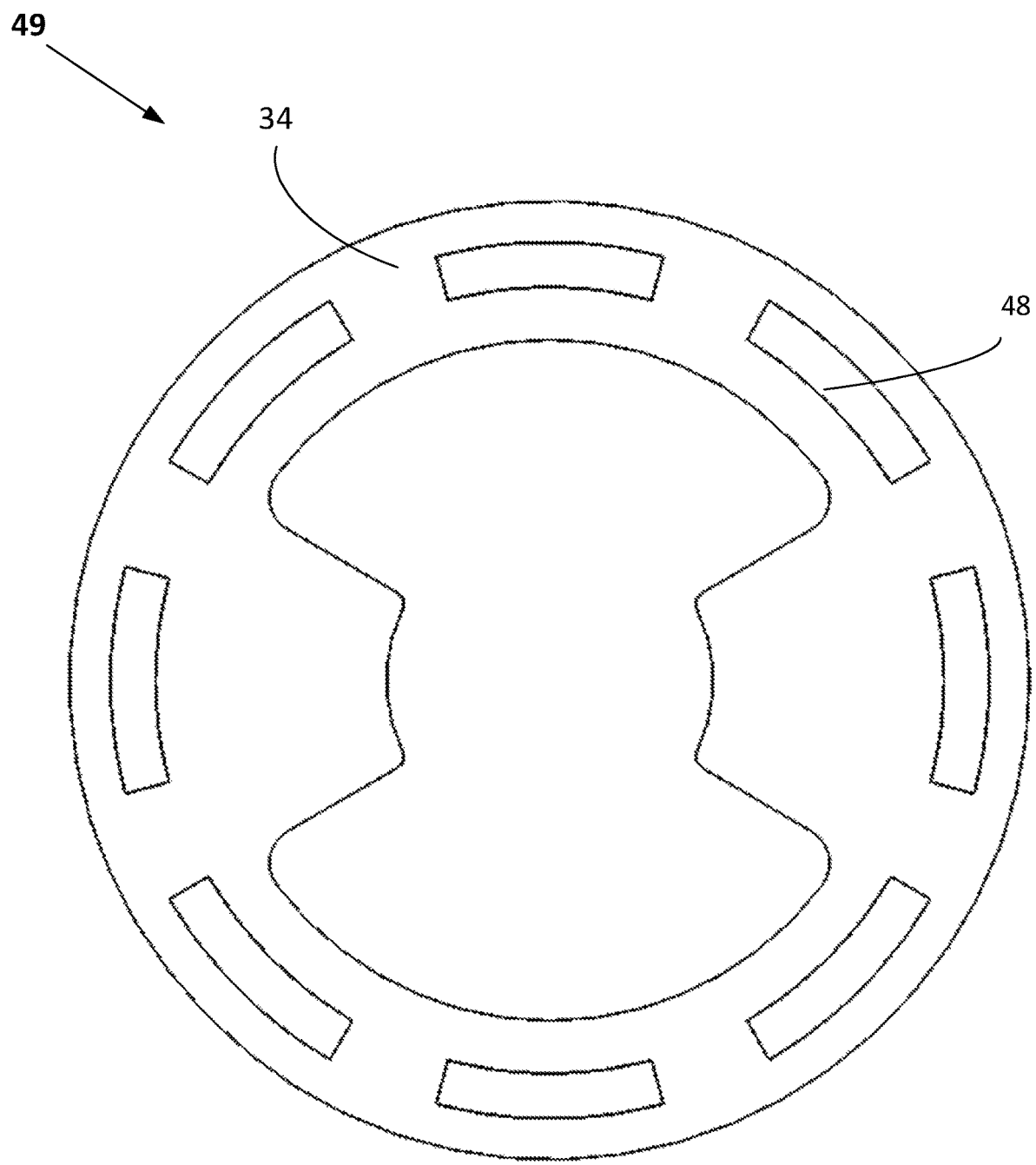
FIG. 37 is a rear view of a rotor assembly comprising a rotor with multiple separate ferromagnetic cores embedded inside, in accordance with an embodiment of the present disclosure.
Figure 38:
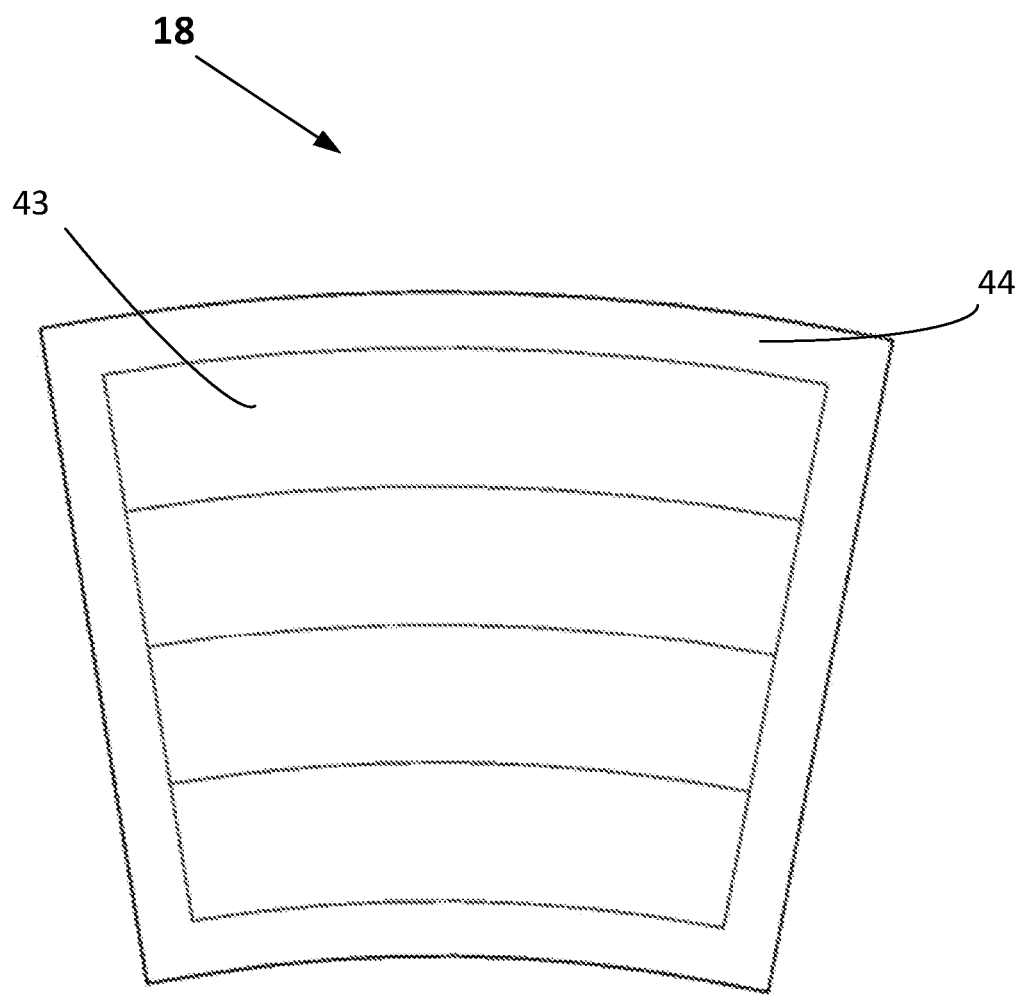
FIG. 38 is a front view of one example of a magnet assembly comprising multiple smaller arc magnets fixedly retained within a rigid holder, in accordance with some embodiments of the present disclosure.

34. In some embodiments of the present disclosure, the iron core may be made up of multiple separate parts 48 also placed around the core to form a rotor assembly 49, as shown in FIG. 37. Referring now to FIG. 37, in other embodiments of the present disclosure, the ferromagnetic core may be broken up into multiple separate cores 48, thus creating another rotor assembly 49.

In some embodiments of the present disclosure, the arrays of magnets 36 may be partially or fully replaced or supplemented by electromagnets. The electromagnets may be placed adjacent to, in front of, behind, opposite, or in place of the magnets 36. In this embodiment of the present disclosure, the electromagnets are controlled by the flow of electrical current to each unit. Varying the direction and strength of the current supplied to each electromagnet can adjust the strength of the overall magnetic field produced by both the magnets 36 and the electromagnets. Flow of electrical current in one direction through the electromagnet coils may increase the sum strength of the magnetic field while flow of current in the opposite direction through the coils may decrease the sum strength of the magnetic field. This may allow for the precise adjustment of the magnetic field strength and the magnetic flux through the rotor 34, and therefore the braking torque produced by the magnetic brake. It may also provide an alternate means to partially disengage the magnetic brake by cutting the flow of electrical current to one or more electromagnets.

In other embodiments of the present disclosure, a complementary friction brake may supplement braking performance at low angular velocities. In some embodiments of the present disclosure, friction braking may be achieved using the same actuator 31 used to control eddy current braking. The flat prongs of the rotor 34 carry a brake pad 39 comprising carbon ceramic material on the side facing the sleeve 41.

In one embodiment of the present disclosure, the actuator 31 pushes the sleeve 41 against the brake pad 39 on the rotor 34, which come into contact at the fully on position. This results in a contact pressure between the sleeve face 41 and the rotor brake pad 39, thereby creating a frictional force to slow the rotation of the wheel or to hold the wheel in place. FIGS. 29 and 34 illustrate the gap between the sleeve 41 and the brake pad 39 in the fully or partially disengaged (off) position and the uniform frictional contact between the sleeve 41 and the brake pad 39 in the fully engaged (on) position.

In yet other embodiments of the present disclosure, a complementary friction brake may be implemented using a separate disc or drum friction brake common in the art. In an example embodiment, the complementary friction brake may comprise conventional carbon disc brakes mounted on the nose landing gear.

The preferred embodiment of the complementary friction brake as shown in this embodiment of the present disclosure uses the same actuator both for controlling eddy current braking and for engaging the complementary friction brake at low angular velocities or as a parking brake when the aircraft is stopped. This embodiment of the present disclosure only engages the complementary friction brake at the point where eddy current braking is fully engaged, and may limit use of the friction brake and therefore minimize wear.

In some embodiments of the present disclosure, the friction brake is designed to engage at the point where the magnetic brake is in the fully engaged position. The friction brake can provide stopping force to keep the aircraft stationary when parked. In some embodiments of the present disclosure, the friction brake may be used to supplement the braking performance of the magnetic brake at low speeds. The present disclosure also comprises a physical arrangement of the magnetic brake and friction brake components within a compact design envelope, such as that found on aircraft.

In an example embodiment of the axially actuated permanent magnet or hybrid permanent magnet—electromagnetic eddy current brake, the magnetic brake may fit within the envelope of a wheel rim. The magnetic brake may be arranged in a manner similar to traditional multiple-disc carbon brakes.

The array structure of permanent magnets can directly influence the effective magnetic field distribution. A Halbach array arranges magnets such that the magnetic field is concentrated on a single side, while simultaneously canceling the opposing side. Accordingly, the effective magnetic flux seen on the rotor is increased and can increase the braking force produced per magnet. The inherent self-shielding property of the Halbach array can also eliminate the need for a back-iron to guide the path of magnetic flux. The orientation of magnets in a linear Halbach array is widely known. In an example embodiment of the present invention, the magnetic brake may fit within a vehicle's wheel rim. In order to fit within the wheel rim, the magnets can be rearranged radially but following the directional convention of the linear Halbach array. The resulting arrangement may produce a radial Halbach array which approximates a radial magnet arrangement as a linear Halbach array folded in and around itself. The preferred embodiment of the magnetic brake uses the aforementioned modified radial Halbach array to increase the magnetic flux experienced by the rotor. The radial Halbach array may concentrate and increase the strength of the resulting eddy currents in the rotor, which may increase the braking torque produced by the magnetic brake.

In other embodiments of the present disclosure, the mounting and attachment of the magnet-carrying stators and copper rotors may be reversed, such that the stators comprise the electrically conductive body and the rotors each support a magnetic array. In such case, a magnet-supporting rotor would be keyed to the inside of a wheel rim and spin at the same speed as the wheel, while the electrically conductive stators are keyed to a non-rotating base portion or other resistive element. In other embodiments of the present invention, the sliding motion between the stators and rotors may be achieved through any combination of moving stators and fixed rotors, moving rotors and fixed stators, or a mixture of both methods, regardless of which components are keyed into and spinning with a wheel and which components are attached to a non-rotating base portion or resistive element.

In other embodiments of the present disclosure, the magnetic brake may comprise non-ferromagnetic rotors and metal or composite stators. The non-ferromagnetic rotors may be attached to and spinning with a rotating shaft. The metal or composite stators may be keyed to a non-rotating support structure. In one embodiment of the present invention, the non-rotating support structure may envelop the rotating shaft. In another embodiment of the present invention, the non-rotating support structure may be external and fixed to a static anchor point. In example embodiments of the present invention, the non-rotating base portion, non-rotating support structure, or resistive element may be attached to a non-rotating part of a moving vehicle.

In some embodiments of the axially actuated permanent magnet eddy current brake, the braking torque produced by the magnetic brake may be controlled by varying the distance between magnet arrays and rotors. The distance may be varied through sliding on splines cut into the non-rotating base portion or resistive element, which may house the wheel axle. In an example embodiment of the present invention, the resistive element is a torque tube and is fixed to a static point on an aircraft's landing gear assembly. The stators may be configured to slide linearly along the splines to either increase or decrease the distance between the magnets and the associated rotor. The stators may also be configured to decrease the distance between the magnets and rotor using any suitable mechanism. In one embodiment of the present invention, linear motion is used and may be actuated using one or more small electric linear actuators. The stator may be configured to lock into a position along the spines, and when locked the stator can resist applied torque.

The strength of the magnetic flux through the rotor is inversely proportional to the distance between the magnets and rotor. In example embodiments, relatively little linear motion may be required to activate or deactivate the magnetic brakes. In example embodiments, the clearance required for each rotor can be accommodated within existing vehicle brake envelopes.

In some embodiments of the present disclosure, the magnetic brake may be configured to fail in a fully engaged position through the use of springs. The springs may be configured to pull one or more stators towards a corresponding rotor, and a mechanical stop may be used to ensure a minimum distance between them.

In an example embodiment of the radially actuated permanent magnet or hybrid permanent magnet—electromagnetic eddy current brake, the magnetic brake may fit between the wheel and the aircraft landing gear structure. The magnetic brake may be mounted on the landing gear structure in a manner similar to traditional single-disc friction brakes commonly found on light aircraft. In some embodiments of the present disclosure, the magnetic brake comprises a copper or aluminum rotor and a separate brake housing. The rotor can be attached to the inside face of the wheel rim, such that it spins at the same angular velocity as the wheel. The brake housing containing the magnetic brake components can be connected to the landing gear structure. The magnetic brake may comprise individual permanent arc magnets attached to cables and springs inside the housing. The cables can provide actuation and brake control while the springs can serve as a return mechanism to disengage the brake. In some embodiments of the present disclosure, the polarity of the magnets may be ordered in special arrays so as to concentrate the magnetic flux in particular regions of the rotor and in a direction substantially perpendicular to the face of the magnets.

In some embodiments of the present disclosure, the brake housing is rigidly attached to the aircraft landing gear structure through an integrated connector. In some embodiments of the present disclosure, the connector is welded to the brake housing and bolted to the landing gear structure. In other embodiments of the present disclosure, the connector is integral with the brake housing and bolted to the landing gear structure.

In other embodiments of the present disclosure, the sleeve has a helical spline on its inner diameter and the non-rotating base portion has a corresponding groove such that as the sleeve slides axially along the non-rotating base portion, the spline which sits in the groove forces the sleeve to rotate in a clockwise or counterclockwise direction. In some embodiments of the present disclosure, a track built into the brake housing ensures each magnet slides straight in the radial direction inside the brake housing.

In other embodiments of the radially actuated permanent magnet eddy current brake, the sliding of the sleeve over the non-rotating base portion is actuated by means of a linear hydraulic actuator with compression springs interspersed on the opposite side of the sleeve. The springs may contact the sleeve at one end and may be fixed to a non-moving part at the other end. The compression springs may exert a force opposing the extension of the hydraulic actuator, allowing for positioning of the sleeve by controlling the hydraulic pressure and therefore the force applied. In this embodiment of the present disclosure, the change in spring force as the compression spring is deflected in accordance with the spring constant results in a varying force on the sleeve. The magnets can then be positioned by changing the force applied by the hydraulic actuator to balance the spring force on the opposite side of the sleeve. Equilibrium between the spring force and actuator force will determine the resting position of the sleeve, and therefore the magnets, thus controlling the degree of brake actuation and how much braking torque is produced. In other embodiments, the hydraulic actuator force may be balanced by compression springs interspersed on the same side of the sleeve as the actuator rod. In such embodiment, the springs may also provide fail safe actuation of the magnetic brake to the engaged position in the event of actuator failure. In some embodiments of the present disclosure, tension springs may be used on either side of the sleeve to achieve a similar effect, either independently or in conjunction with compression springs also placed on one or both sides of the sleeve.

In some embodiments of the present disclosure, the actuator rod end carries at the end thereof a pin that sits in a groove cut around the circumference of the sleeve. The fit between the pin and the groove may be very tight in order to produce as little backlash as possible. The pin can engage either the near or far face of the groove, such that the linear actuator can be used to both push and pull the sleeve, respectively. The pin remains engaged with the sleeve even as it rotates around the wheel axle, allowing for linear displacement of the sleeve in both directions at any actuator stroke and rotation relative to the wheel axle.

In some embodiments of the present disclosure, the body of the sleeve may be configured with an undercut groove running around the circumference of the sleeve. The end of the actuator rod the linear actuator may be configured with a rotatable rectangular end that fits into the groove and is then rotated such that the undercut prevents the rod end from escaping the groove. The undercut groove allows the linear actuator to both push and pull the sleeve while facilitating the rotation of the sleeve due to the helical splines. In the aforementioned embodiments of the present disclosure, the linear actuator may be used in conjunction with the either the magnet springs or with separate springs connected to the body of the sleeve to return the sleeve to a disengaged position. The braking torque produced by the magnetic brake is proportional to the magnetic flux passing through the rotor.

In some embodiments of the radially actuated permanent magnet eddy current brake, the rotor has flanges at the inner radius projecting inwards towards the wheel axle. The flanges may comprise separate parts fixed to the rotor or they may be an integral part of the rotor. The rotor flanges may carry brake pads made of a conventional friction material. The friction material may comprise steel, carbon fiber pads, or other composite materials. In some embodiments, the sleeve has a large circular disc with a radius large enough to reach the location of the brake pads on the rotor and to overlap with them. The sleeve disc opposes and is significantly parallel to the rotor flanges. The distance between the sleeve disc and opposing rotor is such that when the linear actuator is in the fully extended position, the sleeve disc contacts and applies a pressure to the brake pads on the rotor flanges. In some embodiments of the present disclosure, this position also corresponds to the minimum radial position of the magnets, meaning that the friction brake is engaged at the point when the magnetic brake is already in the engaged position. This configuration of the brake may achieve greater braking torque at a given angular velocity by operating both the magnetic and friction components in parallel.

In some embodiments of the present disclosure, the brake housing containing the radially actuated magnetic brake components is positioned between the wheel and the landing gear structure. The placement of the brake housing is such that when the magnets are at the minimum radius (i.e. maximum spring extension), they are directly over the rotor attached to the inside face of the wheel rim. This corresponds to the engaged position of the magnetic brake, in which the braking torque produced is at a maximum. The brake housing cover between the magnets and rotor in the engaged position may be as thin as possible in order to minimize the distance between them. In some embodiments of the present disclosure, there is no cover in this area of the housing such that the magnets may be as close to the rotor as possible, thus providing greater magnetic flux through the rotor.

In some embodiments of the present disclosure, the braking torque produced by the integrated friction brake is proportional to the force applied by the linear actuator. The magnetic and friction components of the brake may be operated in parallel to produce greater braking torque. The friction brake can supplement the performance of the magnetic brake at low speeds. In some embodiments of the present disclosure, the friction brake is also used to keep the aircraft stationary when parked.

In some embodiments of the radially actuated permanent magnet eddy current brake, the strength of the magnetic flux through the rotor is directly proportional to the projected area of the magnets on the rotor. In example embodiments of the present disclosure, relatively little radial travel of the magnets may be required to increase or decrease the braking torque produced by the magnetic brake. In the engaged position with the magnets at the minimum radial position, the projected area of the magnets is entirely over the adjacent rotor and a substantial proportion of their magnetic flux passes through the rotor. In the disengaged position with the magnets at the maximum radial position (rest position), none of the projected area of the magnets is over the adjacent rotor and a minimal amount of magnetic flux passes through the rotor.

In one aspect of the present disclosure, there is provided a magnetic brake assembly for use with a wheel, the wheel rotatable about a rotational axis. The magnetic brake assembly comprises at least one rotor, at least one magnetic array, and at least one actuator. The at least one rotor is connected to the wheel and rotatable therewith about the rotational axis, the at least one rotor made of a high electric conductivity material. The at least one magnetic array comprises a plurality of magnets configured to generate a magnetic flux substantially perpendicular to the array and towards the at least one rotor. The at least one actuator causes the at least one magnetic array to move relative to the at least one rotor and induce sufficient eddy currents in the at least one rotor when rotor is rotating, thus producing a magnetic braking effect on the at least one rotor.

In one embodiment, the magnetic brake assembly further comprises a friction brake controlled by the actuator for applying a frictional braking force on the at least one rotor. In one embodiment, the friction brake is actuated for applying the frictional braking force after the magnetic braking effect is applied on the at least one rotor.

In one embodiment, the plurality of magnets comprises a plurality of permanent magnets, and the plurality of permanent magnets are polarized and arranged circumferentially such that the magnetic array is in a circular Halbach configuration and the magnetic flux of the magnetic array is substantially one-sided and in a direction substantially perpendicular to the array.

In another embodiment, the plurality of magnets comprises a plurality of permanent magnets and a plurality of electromagnets, and the at least one actuator closes an electrical relay to turn on the plurality of electromagnets. In one embodiment, the plurality of electromagnets and the plurality of permanent magnets are polarized and arranged circumferentially such that the magnetic array is in a circular Halbach configuration and the magnetic flux of the at least one magnetic array is substantially one-sided and in a direction substantially perpendicular to the magnetic array when at least some of the plurality of electromagnets are turned on, and wherein the polarity of at least some of the plurality of electromagnets when turned on determines which side of the magnetic array experiences a substantially greater magnetic flux.

In one embodiment, the at least one actuator is a mechanical actuator, and wherein causing the at least one magnetic array to induce sufficient eddy currents in the at least one rotor when the rotor is rotating at a sufficient rotational speed comprises axially moving along the rotational axis, by means of the at least one mechanical actuator, the at least one magnetic array towards the at least one rotor from a de-activated state to an activated state. In one embodiment, the magnetic brake assembly further comprises a non-rotating base and at least one stator. The at least one stator is slidably mounted on the non-rotating base, is supporting the at least one magnetic array, is configured to resist an applied torque against the non-rotating base, and is operably connected with the at least one mechanical actuator. In this embodiment, axially moving the at least one magnetic array towards the at least one rotor comprises the mechanical actuator moving the at least one stator axially along the non-rotating base from a deactivated state to an activated state. In the deactivated state, the at least one stator is positioned such that the at least one magnetic array does not induce sufficient eddy currents in the at least one rotor when the rotor is rotating to produce a non-negligible braking effect on the at least one rotor. In the activated state, the at least one stator is positioned such that the at least one magnetic array induces sufficient eddy currents in the at least one rotor when the rotor is rotating to produce the magnetic braking effect.

In one embodiment, the at least one mechanical actuator comprises a linear displacer operably connected with the at least one stator for axially moving the at least one stator along the non-rotating base.

In one embodiment, in the activated state an axial distance between the at least one stator and the at least one rotor is less than the axial distance between the at least one stator and the at least one rotor in the deactivated state.

In one embodiment, each of the plurality of magnets is a permanent magnet. In one embodiment, the permanent magnet is in the shape of one of: an arc magnet, a modified arc magnet with concave sides, and a modified arc magnet with convex sides. In this embodiment, the plurality of permanent magnets are arranged circumferentially such that the magnetic array is in a circular Halbach configuration and the magnetic flux of the magnetic array is substantially one-sided and in a direction substantially perpendicular to the array.

In another embodiment, the plurality of magnets comprises a plurality of electromagnets and a plurality of permanent magnets. In this embodiment, the plurality of electromagnets and the plurality of permanent magnets are arranged circumferentially such that the magnetic array is in a circular Halbach configuration when the electromagnets are turned on and such that the polarity of at least some of the plurality of electromagnets when turned on determines which side of the magnetic array experiences a substantially greater magnetic flux. In other words, the placement and configuration of the electromagnets within the magnetic array is such that turning them on completes the Halbach pattern of the array and substantially amplifies the magnetic flux on one side of the array. Turning the electromagnets off causes the Halbach pattern of the magnetic array to be incomplete and substantially decreases the amount of magnetic flux on the side of the array facing the at least one rotor.

In one embodiment, the non-rotating base comprises a tubular member. In one embodiment, the at least one stator has a central hole sized to fit on the tubular member of the non-rotating base. In one embodiment, the at least one stator is configured to resist a torque applied about the rotational axis. In one embodiment, the non-rotating base has at least one spline on an external surface thereof and the central hole of the stator has at least one spline sized and shaped to mate with the at least one spline of the non-rotating base such that the at least one stator resists the applied torque.

In one embodiment, the at least one rotor has a central hole sized to fit over the tubular member of the non-rotating base, with sufficient clearance to enable free rotation of the at least one rotor with respect to the non-rotating base. In one embodiment, the at least one rotor is embedded with one or more ferromagnetic cores or backed by one or more ferromagnetic plates.

In one embodiment, the at least one rotor is configured to be keyed to an inside of the wheel. In one embodiment, the at least one rotor is configured to be attached to a rim of the wheel. In one embodiment, the at least one rotor further comprises at least one sacrificial anode attached thereto. In one embodiment, the high electric conductivity material comprising the at least one rotor is selected from the group consisting of: copper, aluminum, beryllium, and alloys or composites thereof.

In one embodiment, the at least one linear displacer comprises an electric linear actuator configured to extend or retract an actuation rod which ends with a connection tip, and the at least one stator comprises a connection member connected with the connection tip of the at least one linear displacer for coupling the at least one linear displacer with the at least one stator.

In one embodiment, the at least one linear displacer is housed inside the non-rotating base, the non-rotating base member has at least one slot, and the connection member of the at least one stator is connected with the connection tip of the at least one displacer through the at least one slot.

In one embodiment, the magnetic brake assembly further comprises a friction rim placed between the at least one stator and the at least one rotor, connected with the wheel and rotatable therewith about the rotational axis, and frictionally engaging the stator in the activated state. In one embodiment, the at least one stator comprises a stator friction ring surrounding the magnetic array and facing the friction rim, the friction rim comprises friction material facing the stator, and in the activated state the stator friction ring engages the friction material of the friction rim, thus generating contact pressure and a resulting friction force for slowing the rotation of the at least one rotor. In one embodiment, the stator friction ring and the friction material of the friction rim comprise a brake pad material selected from the group consisting of: non-metallic brake pad material, semi-metallic brake pad material, fully metallic brake pad material, ceramic brake pad material, and carbon brake pad material.

In one embodiment, the magnetic brake assembly comprises a first stator and a second stator placed on opposite sides of the at least one rotor. In one embodiment, the magnetic array of the first stator and the magnetic array of the second stator have a similar Halbach array pattern such that the magnetic flux of the magnetic array of the first stator and the magnetic flux of the magnetic array of the second stator are similar. In some embodiments, the permanent or electromagnets in the magnetic array of the first stator and the permanent or electromagnets in the magnetic array of the second stator with a polarity perpendicular to the array have "like" polarities with respect to each other. In other words, the polarity of each magnet on the first stator with a polarity perpendicular to the array is the same as the polarity of the magnet directly opposite in the magnetic array of the second stator. The polarities of the remaining magnets in each magnetic array are such that the array is in a circular Halbach configuration and the magnetic flux of each magnetic array is substantially one-sided towards the at least one middle rotor.

In another embodiment, the at least one actuator is a mechanical actuator, and wherein causing the at least one magnetic array to induce sufficient eddy currents in the at least one rotor when the rotor is rotating at a sufficient rotational speed comprises radially moving each of the plurality of magnets from an outer radial position to an inner radial position, wherein the distance between each of the plurality of magnets and the rotational axis is greater at the outer radial position than at the inner radial position. In one embodiment, the plurality of magnets are flexibly biased in the outer radial position and are moved to the inner radial position by action of the mechanical actuator.

In one embodiment, the magnetic brake assembly further comprises a non-rotating base having an elongate portion, and a sleeve slidable along the elongate portion and configured to rotate around an axis of the elongate portion when sliding axially therelong. The plurality of magnets are connected with the sleeve and are movable between the outer radial position and the inner radial position with the rotation of the sleeve around the axis of the elongate portion. In one embodiment, the mechanical actuator is configured to slide the sleeve axially along the elongate portion between a deactivated state and an activated state. In one embodiment, the mechanical actuator is a linear actuator.

In one embodiment, the magnetic brake assembly further comprises a plurality of connecting members connecting the plurality of magnets to the sleeve. In one embodiment, in the deactivated state, the plurality of connecting members have enough length such that the magnets are in the outer radial position in which they form a circumferential magnetic array projecting a magnetic flux at an average radius larger than the radius of or the farthest edge of the at least one rotor, thus not inducing sufficient eddy currents in the rotor to produce a braking effect therein. When the mechanical actuator slides the sleeve axially along the elongate portion towards the rotor, the sleeve rotates, thus causing the connecting members to move the plurality of magnets towards an inner radial position. In the activated state, the plurality of connecting members have moved the plurality of magnets to the inner radial position in which the circumferential magnetic array is substantially aligned with the rotor and projects a magnetic flux on the face of the rotor, thus inducing sufficient eddy currents in the at least one rotor to produce a braking effect therein.

In one embodiment, the non-rotating base has an end plate. In one embodiment, the mechanical actuator is attached to the end plate.

In one embodiment, the circular rotor has at least one brake pad attached to a face thereof and the sleeve has a circular disc at an end thereof. In the activated state, the circular disc frictionally engages the at least one brake pad for producing a frictional braking effect therewith.

In one embodiment, the elongate portion is cylindrical and has a helical spline on a surface thereof, and the sleeve has an internal helical groove sized and shaped to mesh with the helical spline for causing the sleeve to rotate around an axis of the elongate portion when sliding axially therelong.

In one embodiment, the magnetic brake assembly further comprises an annular housing connected to the non-rotating base and disposed proximate and concentric with the at least one rotor, wherein the plurality of magnets are flexibly biased in the outer radial position by a plurality of springs connected with an inside part of the annular housing.

In one embodiment, the plurality of connecting members comprises a plurality of cables each having a first end connected to the sleeve and a second end connected to one of the plurality of magnets.

In another aspect of the present disclosure, there is provided an aircraft landing gear assembly comprising a nose gear and a main landing gear. The main landing gear comprises a wheel rotatable about a rotational axis, and the magnetic brake assembly as described herein.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

The invention claimed is:

1. A magnetic brake assembly for use with a wheel rim, the wheel rim rotatable about a rotational axis, the magnetic brake assembly comprising:
   a rotor secured to rotate with the wheel rim;
   a stator secured to be rotationally stationary relative to the rotor;
   one of the rotor and stator comprising an electrically conductive body and the other of the rotor and stator comprising a magnetic array comprising a plurality of permanent magnets and a plurality of electromagnets configured to generate a magnetic flux; and
   an actuator comprising an electrical relay that turns on the plurality of electromagnets to effect a brake mode and turns off the plurality of electromagnets to a non-brake mode, wherein in the brake mode the magnetic array induces eddy currents in the electrically conductive body to cause a magnetic braking force therein when the rotor rotates above a threshold speed and in the non-brake mode the induced eddy currents cause a negligible or no magnetic braking force as the rotor rotates above the threshold speed.

2. The magnetic brake assembly of claim 1, wherein:
   the plurality of electromagnets and the plurality of permanent magnets are arranged circumferentially in a circular Halbach array such that the magnetic flux of the magnetic array is substantially one-sided and in a direction substantially perpendicular to the magnetic array when at least some of the plurality of electromagnets are turned on; and
   the placement and configuration of the plurality of electromagnets within the magnetic array is such that the polarity of at least some of the plurality of electromagnets when turned on determines which side of the magnetic array experiences a substantially greater magnetic flux.

3. The magnetic brake assembly of claim 1, further comprising multiple sets of stators and rotors actuatable between the brake mode and the non-brake mode, wherein for each set, one of the rotor and stator comprises an electrically conductive body and the other of the rotor and stator comprises a magnetic array comprising a plurality of magnets configured to generate a magnetic flux.

4. The magnetic brake assembly of claim 1, wherein the electrically conductive body is embedded with one or more ferromagnetic cores configured to increase the magnetic flux through the electrically conductive body when the brake mode is effected.

5. An aircraft landing gear assembly, comprising:
   a nose gear;
   a main landing gear comprising a wheel rotatable about a rotational axis; and
   the wheel fitted with the magnetic brake assembly of claim 1.

6. The magnetic brake assembly of claim 1 wherein the plurality of electromagnets and the plurality of permanent magnets are arranged in groups of multiple adjacent permanent magnets interspaced by respective electromagnets at regular intervals.

7. A magnetic brake assembly for use with a wheel rim, the wheel rim rotatable about a rotational axis, the magnetic brake assembly comprising:
   a rotor secured to rotate with the wheel rim;
   a stator secured to be rotationally stationary relative to the rotor;
   one of the rotor and stator comprising an electrically conductive body and the other of the rotor and stator comprising a magnetic array comprising a plurality of magnets configured to generate a magnetic flux; and
   an actuator operably connected to at least one of the electrically conductive body and the magnetic array to selectively effect a brake mode and a non-brake mode, wherein in the brake mode the magnetic array induces eddy currents in the electrically conductive body to cause a magnetic braking force therein when the rotor rotates above a threshold speed and in the non-brake mode the induced eddy currents cause a negligible or no magnetic braking force as the rotor rotates above the threshold speed;
   wherein:
   the actuator comprises a mechanical actuator that is configured to effect the brake mode and the non-brake mode by changing a relative position of the magnetic array and the electrically conductive body;
   positioning the magnetic array and the electrically conductive body closer together increases an amount of the induced eddy currents to effect the brake mode and positioning the magnetic array and the electrically conductive body farther apart decreases an amount of the induced eddy currents to effect the non-brake mode; and the mechanical actuator is configured to move the stator axially towards the rotor along the rotational axis of the wheel rim to effect the brake mode and axially away from the rotor to effect the non-brake mode.

8. The magnetic brake assembly of claim 7, further comprising a friction brake that is actuatable to apply a friction braking force on the rotor.

9. The magnetic brake assembly of claim 8, wherein the friction brake is actuated by the actuator to apply the friction braking force after the magnetic braking force is applied on the rotor.

10. The magnetic brake assembly of claim 7 further comprising a non-rotating base, wherein:
the rotor comprises the electrically conductive body;
the stator comprises the magnetic array;
the stator is slidably mounted on the non-rotating base; and
the mechanical actuator being configured to move the stator relative to the rotor along the non-rotating base to vary the magnetic braking force effected on the rotor.

11. The magnetic brake assembly of claim 10, wherein the mechanical actuator comprises at least one linear displacer operably connected with the stator for axially moving the stator along the non-rotating base.

12. The magnetic brake assembly of claim 10, wherein the non-rotating base comprises a member having a circular cross-section and the stator has a central hole sized to fit on the member of the non-rotating base, the non-rotating base and the stator having mateable splines such that the stator is capable of resisting a torque applied about the rotational axis.

13. The magnetic brake assembly of claim 7, wherein:
the plurality of magnets comprises a plurality of permanent magnets; and
the plurality of permanent magnets are arranged circumferentially in a circular Halbach array such that the magnetic flux of the magnetic array is substantially one-sided and in a direction substantially perpendicular to the magnetic array.

14. The magnetic brake assembly of claim 7, further comprising a first friction element connected with the rotor and a second friction element connected with the stator and configured to mutually engage to effect a friction braking force on the rotor when the actuator moves the stator within a predetermined distance of the rotor.

15. A magnetic brake assembly for use with a wheel rim, the wheel rim rotatable about a rotational axis, the magnetic brake assembly comprising:
a rotor secured to rotate with the wheel rim;
a stator secured to be rotationally stationary relative to the rotor;
one of the rotor and stator comprising an electrically conductive body and the other of the rotor and stator comprising a magnetic array comprising a plurality of magnets configured to generate a magnetic flux; and
an actuator operably connected to at least one of the electrically conductive body and the magnetic array to selectively effect a brake mode and a non-brake mode, wherein in the brake mode the magnetic array induces eddy currents in the electrically conductive body to cause a magnetic braking force therein when the rotor rotates above a threshold speed and in the non-brake mode the induced eddy currents cause a negligible or no magnetic braking force as the rotor rotates above the threshold speed;
wherein:
the actuator comprises a mechanical actuator that is configured to effect the brake mode and the non-brake mode by changing a relative position of the magnetic array and the electrically conductive body;
positioning the magnetic array and the electrically conductive body closer together increases an amount of the induced eddy currents to effect the brake mode and positioning the magnetic array and the electrically conductive body farther apart decreases an amount of the induced eddy currents to effect the non-brake mode; and
the rotor comprises the electrically conductive body;
the stator comprises the magnetic array;
the magnetic array comprises a plurality of magnets that are movable in a radial direction with respect to the rotational axis of the wheel rim, and;
the mechanical actuator being configured to move each of the plurality of magnets radially from an outer radial position to an inner radial position to effect the brake mode, wherein a distance between each of the plurality of magnets and the rotor is greater at the outer radial position than at the inner radial position.

16. The magnetic brake assembly of claim 15, wherein each of the plurality of magnets is flexibly biased in the outer radial position and are moved to the inner radial position by action of the mechanical actuator.

17. The magnetic brake assembly of claim 16, further comprising:
a non-rotating base having an elongate portion;
the elongate portion being cylindrical and having a helical spline on a surface thereof;
a sleeve slidable along the elongate portion and having an internal helical groove sized and shaped to mate with the helical spline on the elongate portion for causing the sleeve to rotate around an axis of the elongate portion when sliding axially along the elongate portion; and
wherein:
the mechanical actuator is configured to move the sleeve axially along the elongate portion between a deactivated state and an activated state; and
the plurality of magnets are connected with the sleeve and are movable between the outer radial position and the inner radial position with the rotation of the sleeve around the axis of the elongate portion by means of a plurality of members connecting the plurality of magnets to the sleeve.

18. The magnetic brake assembly of claim 17, wherein:
the rotor has at least one brake pad attached thereto;
the sleeve has a circular disc at an end thereof; and
wherein in an activated state the circular disc frictionally engages the brake pad for producing a frictional braking effect therewith.

* * * * *

UNITED STATES PATENT AND TRADEMARK OFFICE
CERTIFICATE OF CORRECTION

| | |
|---|---|
| PATENT NO. | : 11,674,555 B2 |
| APPLICATION NO. | : 16/826260 |
| DATED | : June 13, 2023 |
| INVENTOR(S) | : Nikola Kostic |

It is certified that error appears in the above-identified patent and that said Letters Patent is hereby corrected as shown below:

In the Claims

Column 27, Line 63 "turns off the plurality of electromagnets to a non-brake" should read -- turns off the plurality of electromagnets to effect a non-brake --.

Signed and Sealed this
Fifteenth Day of August, 2023

Katherine Kelly Vidal
*Director of the United States Patent and Trademark Office*